(12) United States Patent
Morash et al.

(10) Patent No.: US 9,416,062 B2
(45) Date of Patent: Aug. 16, 2016

(54) NUTRIENT RICH COMPOSITIONS

(71) Applicant: CAL SAFE SOIL, LLC, West Sacramento, CA (US)

(72) Inventors: Daniel M. Morash, West Sacramento, CA (US); Mark LeJeune, West Sacramento, CA (US)

(73) Assignee: CAL SAFE SOIL, LLC, West Sacramento, CA (US)

( * ) Notice: Subject to any disclaimer, the term of this patent is extended or adjusted under 35 U.S.C. 154(b) by 0 days.

(21) Appl. No.: 14/869,737

(22) Filed: Sep. 29, 2015

(65) Prior Publication Data

US 2016/0017225 A1    Jan. 21, 2016

Related U.S. Application Data

(63) Continuation of application No. 14/704,856, filed on May 5, 2015.

(60) Provisional application No. 61/988,794, filed on May 5, 2014.

(51) Int. Cl.
| | |
|---|---|
| C12M 1/00 | (2006.01) |
| A01B 1/00 | (2006.01) |
| C05G 3/00 | (2006.01) |
| C05F 17/00 | (2006.01) |
| C09K 17/00 | (2006.01) |
| E02D 3/00 | (2006.01) |

(Continued)

(52) U.S. Cl.
CPC .............. *C05F 17/0036* (2013.01); *A01C 21/00* (2013.01); *A01G 1/001* (2013.01); *A23K 1/007* (2013.01); *A23K 1/10* (2013.01); *A23K 1/146* (2013.01); *A23K 10/12* (2016.05); *A23K 10/20* (2016.05); *A23K 10/37* (2016.05); *A23K 20/00* (2016.05); *C05F 9/04* (2013.01); *C05F 17/009* (2013.01); *C05G 3/0064* (2013.01); *C09K 17/00* (2013.01); *C09K 17/32* (2013.01); *E02D 3/00* (2013.01); *Y02P 60/877* (2015.11)

(58) Field of Classification Search
CPC ....... A01C 21/00; A01G 1/001; A23K 1/007; C09K 17/32
See application file for complete search history.

(56) References Cited

U.S. PATENT DOCUMENTS 5,162,129 A * 11/1992 Anderson ............... A23J 3/341
                                                                426/56
5,374,659 A    12/1994 Gowan, Jr.

(Continued)

FOREIGN PATENT DOCUMENTS

CN    101961120 A    2/2011
KR    100966158 B1   6/2010

(Continued)

OTHER PUBLICATIONS

International Search Report in International Patent Application No. PCT/US2015/029322, dated Jan. 14, 2016 in 5 pages.

(Continued)

*Primary Examiner* — Nathan Bowers
(74) *Attorney, Agent, or Firm* — Duane Morris LLP

(57) ABSTRACT

This invention relates to processes and systems for converting fresh food waste into nutrient rich hydrolysates and particulate compositions. The invention also relates to the hydrolysates and compositions useful, for example, as fertilizers, feedstock or other nutrient supplements.

10 Claims, 41 Drawing Sheets

(51) Int. Cl.
| | |
|---|---|
| *A01C 21/00* | (2006.01) |
| *A01G 1/00* | (2006.01) |
| *C09K 17/32* | (2006.01) |
| *A23K 1/00* | (2006.01) |
| *A23K 1/10* | (2006.01) |
| *A23K 1/14* | (2006.01) |
| *C05F 9/04* | (2006.01) |

(56) References Cited

U.S. PATENT DOCUMENTS

| | | | |
|---|---|---|---|
| 5,531,385 | A | 7/1996 | Witsken |
| 6,121,032 | A | 9/2000 | Cooney, Jr. |
| 2004/0167073 | A1 | 8/2004 | Sidelman |
| 2005/0252261 | A1 | 11/2005 | Lee |
| 2006/0194299 | A1 | 8/2006 | Brinch-Pedersen et al. |
| 2007/0212776 | A1* | 9/2007 | Darling .......... A23J 1/002 435/289.1 |
| 2008/0035561 | A1* | 2/2008 | Gray (Gabb) .......... B09B 3/00 210/603 |
| 2008/0308501 | A1* | 12/2008 | Irvine .......... B01D 21/0006 210/695 |
| 2009/0162923 | A1 | 6/2009 | Young et al. |
| 2010/0028485 | A1 | 2/2010 | Tuohy et al. |
| 2011/0177559 | A1 | 7/2011 | Medoff et al. |
| 2012/0084886 | A1 | 4/2012 | Lopez-Cervantes et al. |
| 2012/0131969 | A1 | 5/2012 | Chandratre |
| 2012/0201947 | A1 | 8/2012 | Stuart |
| 2014/0004573 | A1 | 1/2014 | Medoff et al. |
| 2014/0061106 | A1 | 3/2014 | Knoop |

FOREIGN PATENT DOCUMENTS

| | | |
|---|---|---|
| WO | WO 2008/084074 A2 | 7/2008 |
| WO | WO 2009/150455 A2 | 12/2009 |

OTHER PUBLICATIONS

New York State Department of Environmental Conservation, "Beyond Waste: A Sustainable Materials Management Strategy for New York State"; Dec. 27, 2010; Retrieved online: http://www.dec.ny.gov/docs/materials_minerals_pdf/frptbeyondwaste.pdf, in 36 pages.

Sew Eurodrive. Catalog Industrial Gear Units. Jan. 2014; Retrieved online: http://download.sew-eurodrive.com/download/pdf/200200145.pdf, in 2 pages.

Shrestha, K et al., Biodegradation of Sugarcane Trash Through Use of Microbially Enhanced Compost Extracts. Compost Science and Utilization. (2012) vol. 20, No. 1, in 10 pages.

Blanco-Canqui, H. et al. "Principes of Soil Conservation and Management," Springer Netherlands (2008) 617 pages.

Gunders, D., "Wasted: How America is Losing Up to 40 Percent of Its Food from Farm to Fork Landfill," NRDC Issue Paper (Aug. 2012) IP:12-06-B, 26 pages.

Gurol, "Facts and Myths about Irrigation Water," www.eco-web.com/edi/051201.html, Dec. 2005.

Hoondal et al., "Microbial alkaline pectinases and their industrial applications: a review," Appl. Microbiol. Biotechnol., Aug. 2002, 59(4-5):409-418. Epub Jul. 3, 2002.

Lal, R. *Review.* "Climate Strategic Soil Management," Challenges (2014) 5:43-74.

Zhu, Z. et al. "Impacts of Land Use, Fertilizer and Manure Application on the Stream Nutrient Loadings in the Salmon River Watershed, South-Central British Columbia, Canada," Journal of Environmental Protection (2012) 3:809-822.

* cited by examiner

FIG. 27A

ANALYTICAL REPORT

| | | | | |
|---|---|---|---|---|
| Sample ID: | 3/13/14 TANK #3 | | Matrix: | *LIQUID FERTILIZER* |
| Date Received: | *March 19, 2014* | | | |
| Lab ID #: | *AB68233* | | | |

Chemical Residue

| | Analyte | Result | Units | MDL |
|---|---|---|---|---|
| 1 | Abamectin | ND | ppm | 0.1 |
| 2 | Acephate | ND | ppm | 0.5 |
| 3 | Acetamiprid | ND | ppm | 0.1 |
| 4 | Alachlor | ND | ppm | 0.1 |
| 5 | Aldicarb | ND | ppm | 0.1 |
| 6 | Aldicarb Sulfone | ND | ppm | 0.2 |
| 7 | Aldicarb Sulfoxide | ND | ppm | 0.5 |
| 8 | Aldrin | ND | ppm | 0.1 |
| 9 | Ametryn | ND | ppm | 0.1 |
| 10 | Azamethiphos | ND | ppm | 0.1 |
| 11 | Azoxystrobin | ND | ppm | 0.2 |
| 12 | Bendiocarb | ND | ppm | 0.1 |
| 13 | Benfluralin | ND | ppm | 0.1 |
| 14 | Benomyl (as Carbendazim) | ND | ppm | 0.2 |
| 15 | Benoxacor | ND | ppm | 0.1 |
| 16 | Bensulide | ND | ppm | 0.2 |
| 17 | Benzobicyclon | ND | ppm | 0.2 |
| 18 | Benzofenap | ND | ppm | 0.1 |
| 19 | Benzyladenine | ND | ppm | 0.1 |
| 20 | BHC's | ND | ppm | 0.1 |
| 21 | Bifenox | ND | ppm | 0.1 |
| 22 | Bitertanol | ND | ppm | 0.1 |
| 23 | Boscalid | ND | ppm | 0.1 |
| 24 | Bromophos | ND | ppm | 0.1 |
| 25 | Bromophos-Ethyl | N/A | ppm | 0.1 |
| 26 | Butamifos | ND | ppm | 0.1 |
| 27 | Cadusafos | ND | ppm | 0.1 |
| 28 | Cafenstrole | ND | ppm | 0.1 |
| 29 | Carbaryl | ND | ppm | 0.1 |

Negative = < 10 CFU/g; CFU= Colony Forming Unit; ppb=parts per billion (mg/Kg or mg/L); ppm=parts per million (mg/Kg or mg/L) MDL= Minimum Detection Limit; ND=Not Detected; N/A=Not Applicable; * = Analysis subcontracted

| ANALYTICAL REPORT | | | | |
|---|---|---|---|---|
| 30 | Carbendazim | ND | ppm | 0.2 |
| 31 | Carbetamide | ND | ppm | 0.5 |
| 32 | Carbofuran | ND | ppm | 0.1 |
| 33 | Carbophenothion | ND | ppm | 0.1 |
| 34 | Carfentrazone-Ethyl | ND | ppm | 0.1 |
| 35 | Chlorantraniliprole | ND | ppm | 0.1 |
| 36 | Chlorbenside | ND | ppm | 0.1 |
| 37 | Chlordane | ND | ppm | 0.1 |
| 38 | Chlorfenapyr | ND | ppm | 0.1 |
| 39 | Chlorfenvinphos | ND | ppm | 0.1 |
| 40 | Chloridazon | ND | ppm | 1 |
| 41 | Chlornitrofen | ND | ppm | 0.1 |
| 42 | Chloroxuron | ND | ppm | 0.5 |
| 43 | Chlorpyrifos | ND | ppm | 0.1 |
| 44 | Chlorpyrifos Methyl | ND | ppm | 0.1 |
| 45 | Chlorthiofos | N/A | ppm | 0.5 |
| 46 | Chromafenozide | ND | ppm | 0.1 |
| 47 | Cinidon-Ethyl | ND | ppm | 0.1 |
| 48 | Clodinafop Propargyl | ND | ppm | 0.1 |
| 49 | Clofentezine | ND | ppm | 0.1 |
| 50 | Clomeprop | ND | ppm | 0.2 |
| 51 | Cloquintocet-Mexyl | ND | ppm | 0.1 |
| 52 | Clothianidin | ND | ppm | 0.1 |
| 53 | CPMC (Etrofol) | ND | ppm | 0.2 |
| 54 | Cumyluron | ND | ppm | 0.2 |
| 55 | Cyanazine | ND | ppm | 0.1 |
| 56 | Cyanophenphos | ND | ppm | 0.2 |
| 57 | Cyanophos | ND | ppm | 0.1 |
| 58 | Cylufenamid | ND | ppm | 0.1 |
| 59 | Cymoxanil | ND | ppm | 0.2 |
| 60 | Cypermethrin | ND | ppm | 0.5 |
| 61 | Cyprodinil | ND | ppm | 0.1 |
| 62 | D zimuron | ND | ppm | 0.1 |
| 63 | DDD | ND | ppm | 0.1 |
| 64 | DDE | ND | ppm | 0.1 |
| 65 | DDT | ND | ppm | 0.1 |
| 66 | Diafenthiuron | ND | ppm | 0.2 |
| 67 | Dialifos | ND | ppm | 0.5 |
| 68 | Diazinon | ND | ppm | 0.1 |
| 69 | Dichlofenthion (ECP) | ND | ppm | 0.1 |
| 70 | Dichlorvos | ND | ppm | 0.1 |
| 71 | Diclobuiraxol | ND | ppm | 0.1 |
| 72 | Diclomezine | ND | ppm | 0.2 |
| 73 | Dicrotophos | ND | ppm | 0.1 |
| 74 | Dieldrin | ND | ppm | 0.1 |
| 75 | Dhiuberxuron | ND | ppm | 0.1 |
| 76 | Dimethametryn | ND | ppm | 0.1 |
| 77 | Dimethoate | ND | ppm | 0.1 |
| 78 | Dimethomorph | ND | ppm | 1 |
| 79 | Dimethylvinphos | ND | ppm | 0.1 |

Negative = < 10 CFU/g; CFU= Colony Forming Unit; ppb=parts per billion (mg/Kg or mg/L); ppm=parts per million (mg/Kg or mg/L)
MDL= Minimum Detection Limit; ND=Not Detected; N/A=Not Applicable; * = Analysis subcontracted

FIG. 27C

ANALYTICAL REPORT

| | | | | |
|---|---|---|---|---|
| 80 | Diniconazole | ND | ppm | 0.1 |
| 81 | Diflufenican | ND | ppm | 0.1 |
| 82 | Diphenamid | ND | ppm | 0.1 |
| 83 | Diphenylamine | ND | ppm | 0.2 |
| 84 | Disulfoton | ND | ppm | 0.1 |
| 85 | Disulfoton Sulfone | ND | ppm | 0.1 |
| 86 | Diuron | ND | ppm | 0.1 |
| 87 | Edifenphos | ND | ppm | 0.1 |
| 88 | Endosulfan | ND | ppm | 0.1 |
| 89 | Endosulfan Sulfate | ND | ppm | 0.2 |
| 90 | Endrin | ND | ppm | 0.1 |
| 91 | EPN | N/A | ppm | 0.1 |
| 92 | Epoxiconazole | ND | ppm | 0.2 |
| 93 | Ethalfluralin | ND | ppm | 0.1 |
| 94 | Ethion | ND | ppm | 0.1 |
| 95 | Ethiprole | ND | ppm | 0.1 |
| 96 | Ethofumesate | ND | ppm | 0.1 |
| 97 | Ethoprophos | ND | ppm | 0.05 |
| 98 | Ethylchlorate | ND | ppm | 0.1 |
| 99 | Etofenprox | ND | ppm | 0.1 |
| 100 | Etridiazole | N/A | ppm | 0.5 |
| 101 | Etrimfos | ND | ppm | 0.1 |
| 102 | Fenamidone | ND | ppm | 0.1 |
| 103 | Fenamiphos | ND | ppm | 0.5 |
| 104 | Fenamiphos Sulfone | ND | ppm | 0.1 |
| 105 | Fenarimol | ND | ppm | 0.1 |
| 106 | Ferbuxroxole | ND | ppm | 0.1 |
| 107 | Fenchlorphos | ND | ppm | 0.1 |
| 108 | Fenhexamid | ND | ppm | 0.1 |
| 109 | Fenitrothion | ND | ppm | 0.1 |
| 110 | Fenobuzarb | ND | ppm | 0.1 |
| 111 | Fenolhiocarb | ND | ppm | 0.1 |
| 112 | Fenoxanil | ND | ppm | 0.1 |
| 113 | Fenoxycarb | ND | ppm | 0.2 |
| 114 | Fenpyroximate | ND | ppm | 0.2 |
| 115 | Fensulfothion | ND | ppm | 0.5 |
| 116 | Fenthion | ND | ppm | 0.1 |
| 117 | Fentrazamide | ND | ppm | 0.1 |
| 118 | Fenuslerale | ND | ppm | 0.2 |
| 119 | Ferimzone | ND | ppm | 0.1 |
| 120 | Fipronil | ND | ppm | 0.02 |
| 121 | Flamprop-Methyl | ND | ppm | 0.1 |
| 122 | Fluacrypyrim | ND | ppm | 0.2 |
| 123 | Fluazifop-Butyl | ND | ppm | 0.1 |
| 124 | Fludioxonil | ND | ppm | 0.1 |
| 125 | Flufenacet | ND | ppm | 0.1 |
| 126 | Fluridone | ND | ppm | 0.1 |
| 127 | Flutamide | ND | ppm | 0.2 |
| 128 | FluhiacelMerlhyl | ND | ppm | 0.3 |
| 129 | Fluirisnol | ND | ppm | 0.2 |

Negative = < 10 CFU/g; CFU= Colony Forming Unit; ppb=parts per billion (mg/Kg or mg/L);
ppm=parts per million (mg/Kg or mg/L)
MDL= Minimum Detection Limit; ND=Not Detected; N/A=Not Applicable; * = Analysis subcontracted

FIG. 27D

| | ANALYTICAL REPORT | | | |
|---|---|---|---|---|
| 130 | Fluxapyroxad | ND | ppm | 0.1 |
| 131 | Fonofos | ND | ppm | 0.1 |
| 132 | Forchlorfenuron | ND | ppm | 0.1 |
| 133 | Fthalide | N/A | ppm | 0.1 |
| 134 | Furathiocarb | ND | ppm | 0.1 |
| 135 | Furilazole | ND | ppm | 0.1 |
| 136 | Heptachlor | ND | ppm | 0.1 |
| 137 | Heptachlor Epoxide | ND | ppm | 0.1 |
| 138 | Hexachlorobenzene | N/A | ppm | 0.1 |
| 139 | Hexaconazole | ND | ppm | 0.1 |
| 140 | Hexythiazox | ND | ppm | 0.2 |
| 141 | Imazamethabenz Methyl Ester | ND | ppm | 0.1 |
| 142 | Imibenconazole | ND | ppm | 0.2 |
| 143 | Imidacloprid | ND | ppm | 0.2 |
| 144 | inabenfide | ND | ppm | 0.1 |
| 145 | Indoxacarb | ND | ppm | 0.2 |
| 146 | Iprobenfos | ND | ppm | 0.1 |
| 147 | Iprodione | ND | ppm | 0.5 |
| 148 | Iprovalicarb | ND | ppm | 0.2 |
| 149 | Isazophos | ND | ppm | 0.1 |
| 150 | Isocarbophos | ND | ppm | 0.1 |
| 151 | Isofenphos | ND | ppm | 0.1 |
| 152 | Isofenphos-Methyl | ND | ppm | 0.1 |
| 153 | Isoprocarb | ND | ppm | 0.1 |
| 154 | Isouron | ND | ppm | 0.2 |
| 155 | isoxaflutole | ND | ppm | 0.1 |
| 156 | Isoxathion | ND | ppm | 0.1 |
| 157 | Lenacil | ND | ppm | 0.5 |
| 158 | Lindane (gamma-BHC) | ND | ppm | 0.1 |
| 159 | Linuron | ND | ppm | 0.2 |
| 160 | Malathion | ND | ppm | 0.1 |
| 161 | Mandipropamid | ND | ppm | 0.1 |
| 162 | Mecarbam | ND | ppm | 0.1 |
| 163 | Mefenacet | ND | ppm | 0.1 |
| 164 | Mefenpyr-Diethyl | ND | ppm | 0.1 |
| 165 | Mephosfolan | ND | ppm | 0.5 |
| 166 | Mepronil | ND | ppm | 0.1 |
| 167 | Methacrifos | ND | ppm | 0.1 |
| 168 | Methamidophos | ND | ppm | 0.1 |
| 169 | Methidathion | ND | ppm | 0.1 |
| 170 | Methiocarb | ND | ppm | 0.1 |
| 171 | Methomyl | ND | ppm | 0.1 |
| 172 | Methoxyfenozide | ND | ppm | 0.1 |
| 173 | Metominostrobin | ND | ppm | 0.1 |
| 174 | Mevinphos | ND | ppm | 0.1 |
| 175 | Monolinuron | ND | ppm | 0.1 |
| 176 | Napropamide | ND | ppm | 0.1 |
| 177 | Novaluron | ND | ppm | 0.1 |
| 178 | Ofurace | ND | ppm | 0.1 |
| 179 | Oryzalin | ND | ppm | 0.1 |

Negative = < 10 CFU/g; CFU= Colony Forming Unit; ppb=parts per billion (mg/Kg or mg/L); ppm=parts per million (mg/Kg or mg/L)
MDL= Minimum Detection Limit; ND=Not Detected; N/A=Not Applicable; * = Analysis subcontracted

FIG. 27E

ANALYTICAL REPORT

| | | | | |
|---|---|---|---|---|
| 180 | Oxadixyl | ND | ppm | 1 |
| 181 | Oxamyl | ND | ppm | 0.1 |
| 182 | Oxaziclomefone | ND | ppm | 0.1 |
| 183 | Oxpoconazole Fumarate | ND | ppm | 0.3 |
| 184 | Oxycarboxin | ND | ppm | 0.5 |
| 185 | Parathion | ND | ppm | 0.1 |
| 186 | Parathion-Methyl | ND | ppm | 0.1 |
| 187 | Penconazole | ND | ppm | 0.1 |
| 188 | Pencycuron | ND | ppm | 0.1 |
| 189 | Pentoxazone | ND | ppm | 0.1 |
| 190 | Perthane | ND | ppm | 0.3 |
| 191 | Phenmedipham | ND | ppm | 0.5 |
| 192 | Phenthoate | ND | ppm | 0.1 |
| 193 | Phorate | ND | ppm | 0.1 |
| 194 | Phorate Sulfone | ND | ppm | 0.1 |
| 195 | Phosalone | N/A | ppm | 0.1 |
| 196 | Phosmel | N/A | ppm | 0.1 |
| 197 | Phoxim | ND | ppm | 0.2 |
| 198 | picolinafen | ND | ppm | 0.1 |
| 199 | Piperonyl Butoxide | ND | ppm | 0.2 |
| 200 | Piperophos | ND | ppm | 0.1 |
| 201 | Pirimioxyphos | ND | ppm | 0.1 |
| 202 | Pirimiphos Ethyl | N/A | ppm | 0.2 |
| 203 | Pirimiphos-Methyl | ND | ppm | 0. |
| 204 | Profenefos | ND | ppm | 0. |
| 205 | Prohydrojasmon | ND | ppm | 0. |
| 206 | Propaphos | ND | ppm | 0.1 |
| 207 | Propetamphos | ND | ppm | 0.1 |
| 208 | Propiconazole | ND | ppm | 0.3 |
| 209 | Propoxur | ND | ppm | 0.1 |
| 210 | Propyxamide | ND | ppm | 0.1 |
| 211 | Prothiofos | ND | ppm | 0.1 |
| 212 | Pyraclofos | N/A | ppm | 0.2 |
| 213 | Pyraclostrobin | ND | ppm | 0.1 |
| 214 | Pyraxolynate | ND | ppm | 0.1 |
| 215 | Pyrazophos | N/A | ppm | 0.1 |
| 216 | Pyrazoxyfen | ND | ppm | 0.5 |
| 217 | Pyridafenthion | ND | ppm | 0.1 |
| 218 | Pyrifenox | ND | ppm | 0.1 |
| 219 | Pyriftalid | ND | ppm | 0.1 |
| 220 | Pyroquilon | ND | ppm | 0.1 |
| 221 | Quinalphos | N/A | ppm | 0.1 |
| 222 | Quinodamine | ND | ppm | 0.1 |
| 223 | Salithion | ND | ppm | 0.1 |
| 224 | Sethoxydim | ND | ppm | 0.5 |
| 225 | Simeconazole | ND | ppm | 0.1 |
| 226 | Spinosad | ND | ppm | 0.1 |
| 227 | Sulfotep | ND | ppm | 0.1 |
| 228 | Sulprofos | ND | ppm | 0.1 |
| 229 | Tebufenozide | ND | ppm | 0.5 |

Negative = < 10 CFU/g; CFU= Colony Forming Unit; ppb=parts per billion (mg/Kg or mg/L); ppm=parts per million (mg/Kg or mg/L)
MDL= Minimum Detection Limit; ND=Not Detected; N/A=Not Applicable; * = Analysis subcontracted

FIG. 27F

| ANALYTICAL REPORT | | | | |
|---|---|---|---|---|
| 230 | Tebupirimfos | ND | ppm | 0.2 |
| 231 | Tebuthiuron | ND | ppm | 0.2 |
| 232 | Tecnazene | ND | ppm | 0.1 |
| 233 | Terbracil | ND | ppm | 0.5 |
| 234 | Terbufos | ND | ppm | 0.1 |
| 235 | Tetrachlorvinphos | ND | ppm | 0.1 |
| 236 | Tetraconazole | ND | ppm | 0.1 |
| 237 | Tetradifon | ND | ppm | 0.1 |
| 238 | Therylchlor | ND | ppm | 0.1 |
| 239 | Thiabendazole | ND | ppm | 0.5 |
| 240 | Thiacioprid | ND | ppm | 0.2 |
| 241 | Thiamethoxam | ND | ppm | 0.1 |
| 242 | Thiazopyr | ND | ppm | 0.1 |
| 243 | Thifluzamide | ND | ppm | 0.2 |
| 244 | Thimelon | ND | ppm | 0.1 |
| 245 | Tiadinil | ND | ppm | 0.1 |
| 256 | Toldofos-Methyl | ND | ppm | 0.1 |
| 247 | Triadimenol | ND | ppm | 0.1 |
| 248 | Tritallate | ND | ppm | 0.1 |
| 249 | Triazophos | ND | ppm | 0.1 |
| 250 | Tribuphos | ND | ppm | 0.1 |
| 251 | Trichlorton | ND | ppm | 0.1 |
| 252 | Tricyclazole | ND | ppm | 0.2 |
| 253 | Trifloxystrobin | ND | ppm | 0.2 |
| 254 | Triflumuron | ND | ppm | 0.2 |
| 255 | Triforine | ND | ppm | 0.1 |
| 256 | Triconazole | ND | ppm | 0.1 |
| 257 | XMC | ND | ppm | 0.1 |
| 258 | Xylylcarb | ND | ppm | 0.1 |
| 259 | Zoxamide | ND | ppm | 0.2 |

NUTRIENT RICH COMPOSITIONS

RELATED APPLICATION

The present application is a Continuation of U.S. patent application Ser. No. 14/704,856, filed on May 5, 2015, which claims the benefit of U.S. Provisional Patent Application No. 61/988,794, filed on May 5, 2014, each of which is incorporated herein in its entirety.

FIELD OF THE INVENTION

This invention relates to methods of, and systems for collecting and processing fresh food waste to obtain nutrient rich compositions, and the compositions produced thereby.

BACKGROUND

Ongoing excessive use of chemical fertilizers has lowered soil quality and leads to environmental degradation (Owamth, 2013; Zhu et al., 2012). For example, soil organic matter is negatively impacted by cultivation and/or extended periods without a vegetative cover, which can decrease the content of organic matter below the natural or virgin levels for a given locality. The exhaustion of organic matter in the soil is a serious threat to limited agricultural resources. Global food production relies on fertile soils (Lal, 2014; Blanco-Canqui and Lal, 2008), which are a finite resource, requiring protection and efficient use by farmers.

In the U.S., food production uses approximately 50% of the land, and utilizes 80% of the total fresh water consumed. About 40% of total food production, however, goes as waste (Gunders, 2012), which is equivalent to $165 billion each year. While maximizing the efficiencies in the U.S. food system from the farm-to-table draws much public attention, productive uses of food waste are poorly developed.

BRIEF SUMMARY

The inventions described and claimed herein have many attributes and aspects including, but not limited to, those set forth or described or referenced in this Brief Summary. It is not intended to be all-inclusive and the inventions described and claimed herein are not limited to or by the features or embodiments identified in this Brief Summary, which is included for purposes of illustration only and not restriction.

In one aspect this invention relates to methods of and systems for processing fresh food waste to obtain nutrient-rich compositions, e.g., hydrolysates or incubated fresh food waste particles that are useful, for example, as fertilizer and soil amendment and animal feed. This invention also relates to the compositions and hydrolysates obtained from those processes and systems. The methods of this invention permit recycling of fresh food waste which would otherwise be disposed of in landfills, or other similar facilities for treating and disposing of putrescent food.

Not only is food waste a waste of resources, it is also a large source of greenhouse gas emissions. Food waste quickly starts to decompose, creating a food safety and public nuisance problem and making it difficult, if not impossible to make valuable use of recycled food waste. This disclosure features an effective way to make use of food waste in agriculture, which not only reduces the greenhouse gas emissions associated with putrescent food, it also sequesters that carbon in the soil, cutting greenhouse gas emissions and improving the sustainability of farm practices. In some aspects, this invention relates to technology for collecting and processing food waste before it becomes putrescent—fresh food waste—and converting it into valuable nutrient rich compositions.

By recycling food that would otherwise rot and ferment, releasing prodigious amounts of greenhouse gases ($CO_2$ or carbon dioxide, and $CH_4$ or methane, which, according to the EPA, is 23 times as potent a greenhouse gas (GHG) as carbon dioxide), as well as toxic liquids and gases ($C_2H_5OH$ or ethanol, a plant pathogen, and $H_2S$, or hydrogen sulphide, also known as "swamp gas," a poisonous gas that collects in low lying areas) and other related effluent by-products of rotting and fermenting, the methods of this invention fully utilize the capabilities and benefits of fresh food waste and drastically reduce organic wastes and the potential risks of harboring pathogens, while providing significant benefits to the soil.

In one aspect, the collection system of this invention captures the fresh food waste using a highly efficient and effective system that does not allow food waste to become putrescent. Supermarket staff separate fresh food waste (produce, meat, fish, delicatessen, bakery and dairy) from other waste streams. The fresh food waste is then placed in insulated totes and/or buggies that keep cold the food that supermarkets no longer offer for sale. In some aspects the insulated totes and/or buggies used to collect the food can be double-walled. These insulated containers improve store hygiene, and are easy for store staff to use, which promotes a high compliance rate among store staff and a low rate of contaminants in the stream of fresh food waste. In some aspects of this disclosure, the collection system of this disclosure can include one or more of the following additional steps: collecting the fresh food waste frequently; collecting the fresh food waste in refrigerated trucks; minimizing the distance the fresh food waste must travel to arrive at the processing facility described in this patent; and immediately processing or refrigerating the fresh food waste at the processing facility. The processing technology in this invention is modular, allowing the efficient construction of facilities in urban areas and near sources of fresh food waste in addition to supermarkets, such as food processing facilities, fresh food distributors, fresh green waste from farms, or other viable sources of fresh food waste (the "collection system").

In another aspect, this process can be performed in a way that has no significant air emissions, no significant effluents, recycles essentially 100% of the fresh food waste which is processed, deploys a pathogen-free process, and generates no significant nuisance odors. The process takes place within commercially available warehouse space, in urban areas zoned for commercial and industrial activity, and out of view of the public. As a result of all of these environmentally favorable attributes, it is feasible to obtain all necessary government and regulatory permits and approvals for such facilities on a commercially reasonable basis in urban areas, near where the fresh food waste is located. It is known to be difficult, if not impossible to obtain government and regulatory permits and approvals to process putrescent food waste in urban areas on a commercially reasonable basis, if at all. As a result, most facilities that handle putrescent food waste are remotely located, in rural areas.

In another aspect, urban permitting facilitates the ability to co-locate processing facilities for this invention with supermarket distribution centers. Many supermarket companies stock their stores by sending trucks full of food to be offered for sale from their distribution centers to their supermarket stores. They then return empty to the distribution center, commonly referred to as a 'back haul.' At almost no additional cost, the supermarket staff places the totes and buggies containing the fresh food waste on the empty trucks for the back haul to the distribution center, which is typically centrally located among the supermarket company's stores, in an urban area in a warehouse district that is zoned for commercial and industrial activity. The totes and buggies can then be shuttled to the processing facilities described for this invention. Co-locating the processing facilities for this invention with the distribution center being served minimizes transportation distances, costs, time required, and related greenhouse gas emissions, to collect the fresh food waste. Co-location with the distribution center further helps to preserve the value of the fresh food waste for conversion into nutrient rich compositions.

When used as fertilizer and soil amendment, the nutrient rich hydrolysate of this invention provides higher crop yields by, for example, providing nutrients to plants and increasing organic matter in the soil by supporting the growth of beneficial soil organisms. In some aspects, the nutrient rich organic fertilizers of this invention increase crop yields while also permitting reduction of the use of nitrate fertilizers which lowers nitrate runoff into lakes and streams and lowers potent greenhouse emissions ($N_2O$, or nitrous oxide, given off from nitrate fertilizer, and, according to the EPA, is 300 times as powerful a GHG as carbon dioxide). Accordingly, the use of the hydrolysate fertilizers of this invention to replace some or all nitrate fertilizers can mitigate problems associated with the use of chemical fertilizers, such as nitrate run-off, GHG emissions, and/or reduction of organic matter in the soil. In addition, the fertilizers of this invention also increase plant vigor and root system growth, increasing uptake of nitrates by plants and thereby further reducing the runoff of nitrate fertilizers into the water supply and increasing water and fertilizer use efficiency for the farmer. Water use efficiency is of increasing concern, due to the impact of drought and climate change. The fertilizers of this invention can also increase water retention through the build-up of organic matter in the soil, and improve soil tilth (including the formation and stability of aggregated soil particles, moisture content, degree of aeration, rate of water infiltration, and drainage). In addition, the nutrient rich hydrolysates of this invention produce better yields at lower costs, improve the quality of crops, and promote resistance to pests and diseases.

In one aspect, the method of producing the nutrient rich composition comprises grinding the fresh food waste, heating and incubating the ground fresh food waste slurry with a combination of enzymes with constant agitation, and pasteurizing the incubated mixture, resulting in the conversion of fresh food waste into the nutrient rich composition. During incubation the combination of enzymes releases nutritional components from the fresh organic waste by digesting proteins, carbohydrates (such as sugars, starches and/or cellulosic materials), and fats and oils in fresh food waste to produce, in one aspect, a liquid hydrolysate rich in nutrients, comprising, for example, amino acids, simple sugars, fatty acids and minerals. An emulsification/homogenization step using an ultra-high shear grinder can also be used to produce a stably emulsified hydrolysate, useful as a fertilizer and soil amendment.

In some aspects, the method for producing a nutrient rich composition from fresh food waste comprising the steps of:
(a) providing fresh food waste using a highly efficient and effective collection system;
(b) grinding the fresh food waste to produce a fresh food waste particle slurry;
(c) incubating the fresh food waste particle slurry under constant agitation by adding to the fresh food waste particle slurry a combination of enzymes comprising at least one enzyme to digest proteins, at least one enzyme to digest fats and lipids, at least one enzyme to digest cellulosic material, and at least one enzyme to digest other carbohydrates and incubating the mixture at two or more temperatures ranging between about 100° F. and 130° F., to match the temperature performance curves of the enzymes, wherein an in-line grinder is used to create shear during at least part of the incubating, whereby a hydrolysate comprising incubated fresh food waste particles is produced;
(d) pasteurizing the hydrolysate to eliminate pathogens;
(e) separating the hydrolysate into a liquid hydrolysate and incubated fresh food particles;
(f) stabilizing and preserving the hydrolysate;
(g) emulsifying the stabilized hydrolysate using an ultra-high-shear mixer to produce an emulsified hydrolysate; and
(h) blending the emulsified hydrolysate in large storage tanks with circulation pumps, to assure the consistency of the finished product.

In one aspect, fresh food waste is provided by obtaining fresh food waste collected from, for example, one or more of fresh food waste providers, for example, supermarkets, food processing facilities, fresh food distributors, fresh green waste from farms, or other viable sources of fresh food waste. In some aspects, providing fresh food waste comprises collecting fresh food waste from for example, supermarkets, food processing facilities, fresh food distributors, fresh green waste from farms, or other viable sources of fresh food waste. In some aspects, fresh food waste is provided by collecting produce, meat, fish, delicatessen, and bakery organics culled by supermarket staff members from food offered for sale by supermarkets. The fresh food waste may be collected in special totes and buggies designed to improve store hygiene and preserve freshness of such food waste, for frequent transportation to a processing facility utilizing the technology described herein. In some instances the totes and buggies used to collect the fresh food waste can be double-walled. In one aspect, the fresh food waste is provided as fresh food waste feedstock using a highly efficient and effective collection system that makes urban permitting and co-location with the supermarket distribution centers feasible, and eliminates the long distance haul of organic wastes to remotely located landfills, while preserving the fresh quality of the food waste for fertilizer and soil amendment production and animal feed production.

In one aspect this invention relates to methods to collect food wastes in a manner of handling and timing that does not allow the food waste to become putrescent. Putrescent food waste is typically hauled off to distant landfills, where it emits greenhouse gases, noxious odors and toxic effluent. In the business methods described in this invention, food wastes are kept fresh, so that there are no emissions, no effluent, no nuisance odors, and essentially no waste. The processing described in this method takes place in a warehouse, in an urban area. Supermarket companies served in this method typically distribute food supplies to their supermarkets from a centrally located distribution center, in a warehouse in an urban area. Their trucks typically return to the distribution center empty. In this method, the supermarkets use specially made, double walled, insulated and sealed totes and buggies to collect food waste, which is then returned to the distribution center on a frequent basis. Due to its environmental advantages, the processing facility described in this method can qualify to receive all necessary permits and approvals to locate in a warehouse that is at or near the supermarket distribution center. In that way, rather than hauling the food waste from the supermarket distribution center to the remotely located landfill, it is simply shuttled from the distribution center to the processing facility described in this invention, thereby eliminating the haul to the landfill. Eliminating the haul saves money, reduces greenhouse gas emissions, and helps preserve the quality of the fresh food waste for processing into fertilizer and soil amendment and animal feed, as described herein.

In one aspect, grinding of the fresh food waste may be carried out using a rotary knife grinder. Optionally a low RPM/high torque grinder with shredding action may also be used in one aspect, to further grind the fresh food waste slurry.

In some aspects a high shear grinder with shearing action, which can comprise, for example, a high shear mixer with a disintegrating head, may be used to grind the incubating fresh food waste particle slurry during all or a part of the incubating and pasteurizing steps.

In another aspect, the at least one combination of enzymes comprises at least one protease, at least one cellulase, at least one pectinase, at least one lipase, and α-amylase. In some aspects a combination of enzymes comprises at least one protease, at least one cellulase, at least one pectinase, at least one lipase, and α-amylase. The at least one combination of enzymes may be added as individual enzymes or enzyme combinations to the slurry at various times, and incubated at selected temperatures. In one aspect, the combination of enzymes is added to the fresh food waste slurry in a first enzyme combination comprising at least two of the enzymes in the combination of enzymes, and incubated at a first temperature, followed by addition of a second enzyme combination comprising all or part of the remaining enzymes, and incubation at a second temperature. Any remaining enzymes from the combination of enzymes may be added in a third or more enzyme combination and incubated at a temperature suitable for, or optimized for the activity of the enzymes in the enzyme combination.

For example, in one aspect, a first enzyme combination of the at least one combination of enzymes is added during a first incubation step at a first temperature between about 100° F. and 130° F., to form an incubating mixture. In this aspect incubation with the first enzyme combination at the first temperature may be carried out for about 30 minutes to about 1.5 hours, preferably 30 minutes to 1 hour. The first enzyme combination may in some aspects of this invention comprise at least one cellulase and at least one lipase. Preferably the first enzyme combination comprises endocellulase, exocellulase (or another cellulase formulation) and lipase. The first temperature may in some embodiments, preferably be about 100° F. to about 130° F. In some embodiments, the incubating mixture is incubated at the first temperature for about 30 minutes. In some embodiments, an organic or inorganic chemical with a pH above 7.0 may be added to the incubating mixture to increase the pH of the mixture and increase the effectiveness of the first enzyme combination.

In one aspect, at least a second combination of enzymes may be added to the incubating mixture, and a second incubation step may be carried out at a second temperature between about 100° F. to 130° F. The time of the second incubation may be, in some aspects, between about 1.5 to about 3 hours or more, preferably about 1.5 hours to 2 hours. In some aspects, the second enzyme combination may comprise at least one pectinase, at least one protease, and α-amylase. In some aspects, one protease may be added after one pectinase and α-amylase in a third enzyme combination.

The temperature and pH of an incubation with an enzyme combination can be selected in order to optimize, or be suitable, for the activity of the enzymes in the enzyme combination. For example, in some aspects, the first temperature and pH may be selected in order to optimize, or be suitable, for the activity of the enzymes in the first enzyme combination, while the second temperature and pH may be selected in order to optimize, or be suitable, for the activity of the enzymes in the second enzyme combination. In other aspects, the timing of an enzyme combination may be selected in order to minimize the impact of enzymes on each other.

After incubating, the incubated hydrolysate is heated to between about 160-170° F. for about 30 minutes to about 2 hours to further pasteurize the hydrolysate. While the incubation and constant agitation steps are highly likely to reduce pathogen concentrations to non-detectable levels, a pasteurization step at a temperature range and duration commonly used in pasteurization processes further reduces the risk of pathogen contamination to levels that are undetectable under current pathogen detection technology. In some embodiments, the pasteurization is performed for about 30 minutes to about 1 hour. In some embodiments, the pasteurization step may be performed at various combinations of temperature and duration, as commonly used in pasteurization processes. In these aspects, the pasteurization may be performed, for example, from about 15 minutes to about 12 hours, for any length of time at 15 minute intervals between 15 minutes to 12 hours (e.g., 15 minutes, 30 minutes, 45 minutes, etc.). In some aspects, the temperature can be from about 120, 125, 130, 135, 140, 145, 150, 155, 160, 165, 170, 175, or 180 degrees F., or more, or any temperature falling between any two of those temperatures.

In some aspects, the processes of this invention inactivate pathogens in the fresh food waste or the environment. The methods of this invention are therefore useful in eliminating pathogens present in fresh food waste during the production of compositions that can safely be used as fertilizers for the production of produce, other crops, fruits, nuts, flowers and turf, or as animal feed.

In some aspects, the grinder used to grind fresh food waste is a rotary knife grinder, which produces particles in the particulate fresh food waste with an average size of about ½ of an inch. Optionally the fresh food waste particle slurry is then pumped to an in-line low RPM/high torque grinder with shredding action to further ensure that the fresh food waste slurry has an average particle size of about ½ of an inch or less. The optional low RPM/high torque grinder may be used in any process for any system with even low levels of throughput, but is particularly suitable for use in a high throughput processing system, for example, a system capable of processing more than over 50 tons per day, e.g., more than 90 tons/day, or up to 95 or 100 tons per day or more. The fresh food waste slurry produced by the first grinder, or the first grinder and the optional second grinder, is then pumped into a temperature controlled incubation vessel, where it undergoes constant mixing and incubation with enzyme combination(s) at desired temperatures.

In addition, the incubation vessel may contain a recirculating line connected to an in-line grinder with shearing action which is used during all or a part of the incubation and pasteurization. This may be the third grinder in aspects of the invention where an optional in-line grinder with shredding action is used to further grind the fresh food particle slurry, but it is the second grinder in aspects of the invention where the optional grinder is not used. In some aspects, the in-line grinder used during all or a part of the incubation with the enzyme combination comprises a high shear mixer. In some aspects the in-line grinder comprises a high shear mixer with a disintegrating head. In some aspects, the high shear in-line grinder is used beginning at about 30 minutes to about 1 hour after incubation begins and continues through the pasteurization step. In some aspects, the start and run times may vary, and still achieve the same particle size reduction objectives. The particles in the resulting hydrolysate may be less than $1/16^{th}$ and about $1/32^{nd}$ of an inch.

In some aspects, screening or filtering of the pasteurized hydrolysate through one or more mesh screens may be used to separate the hydrolysate from particles that do not pass through the mesh. In some embodiments, the hydrolysate produced by incubating is then separated using a 30 mesh screen with an opening of 590 µm. In some embodiments, the 30 mesh screen is a vibrating screen. This separates the hydrolysate from particles too large to pass through the mesh, for example, particles having an average diameter larger than 590 µm. The hydrolysate passing through the first screen may then be further separated by filtering through a 200 mesh screen with an opening size of 74 µm. In some aspects, the incubated fresh food particles removed from the hydrolysate by screening through the 200 mesh screen have a diameter of greater than 74 µm. In some aspects the screen may be a vibrating screen. In some embodiments, a mesh screen having 18-60 mesh may be used in a first screening step, for example 18 mesh screen with 1000 micron openings, 20 mesh screen with 841 micron openings, 25 mesh screen with 707 micron openings, 30 mesh screen with 590-595 micron openings, 35 mesh screen with 500 micron openings, 40 mesh screen with 400 micron openings, 45 mesh screen with 354 micron openings, 50 mesh screen with 297 micron openings, or 60 mesh screen with 250 micron openings, or other commercially available coarse screening technologies. The purpose of this screen is to separate pasteurized solids, which can be used to produce animal feed, from the liquid pasteurized hydrolysate, and can be accomplished through a variety of known screening techniques ("coarse screen"). In some embodiments a mesh screen having 35 to 400 mesh may be used in the second screening step, for example, 35 mesh screen with 500 micron openings, 40 mesh screen with 400 micron openings, 45 mesh screen with 354 micron openings, 50 mesh screen with 297 micron openings, or 60 mesh screen with 250 micron openings, 70 mesh screen with 210 micron openings, 80 mesh screen with 177 micron openings, 100 mesh screen with 149 micron openings, 120 mesh screen with 125 micron openings, 140 mesh screen with 105 micron openings, 170 mesh screen with 88 micron openings, 200 mesh screen with 74 micron openings, 230 mesh screen with 63 micron openings, 270 mesh screen with 53 micron openings, 325 mesh screen with 44 micron openings or 400 mesh screen with 37 micron openings, or other commercially available fine screening technologies. The purpose of this screen is: i) to increase particle surface area, thereby increasing the effectiveness of the enzymes used to produce the hydrolysate; ii) to assure the ability of the pasteurized hydrolysate to pass easily through the farmer's drip lines, or other similar equipment; and iii) so that the pasteurized hydrolysate is readily available for metabolism by soil organisms, once it is delivered to the root zone. This purpose can be accomplished through a variety of known screening techniques ("fine screen"). The solid particles separated by the fine screen, having a diameter between about 74 µm and about 590 µm, may be recycled as a feedstock to be digested in the next batch. This material will digest in the next batch, without accumulating.

The incubated fresh food waste particles which are filtered out by the coarse screen, having an average diameter of greater than 590 µm may be suitable for use as a feedstock and/or as a food supplement or other sources of nutrients for carnivorous or omnivorous mammals, such as pigs, chickens or pets. The incubated fresh food waste compositions are easily digestible, and have a high conversion rate of food to livestock weights, and/or high pet nutritional value. The particles filtered out by the fine screen can be added to the next batch for additional processing.

It has been determined, for example, that feeding the incubated fresh food waste particle composition to pigs and/or chickens that were usually fed a diet of corn & soy meal, resulted in the animals gaining weight with increased food use efficiency (i.e., an increased conversion rate of food into animal weight). Such animals also required fewer weight gain supplements such as steroid supplements to achieve that weight gain. In addition, the animals produced less manure when fed the easily digestible composition. Accordingly, approximately 100% of the fresh food waste processed according to the methods of this invention can be efficiently utilized.

When the first grinder and the in-line grinder with shearing action are used, the incubating and pasteurizing steps produce a liquid hydrolysate after separation that is about 85% to about 95%, or about 90% to about 95% by weight relative to the weight of the input incubating fresh food waste. In some aspects, the separated hydrolysate will be greater than about 85%, 86%, 87%, 88%, 89%, 90%, 91%, or 92% by weight relative to the weight of the input incubating fresh food waste, or any range between any two recited percentages. In some aspects, the separated hydrolysate will preferably be greater than about 90% by weight relative to the weight of the input incubating fresh food waste.

The separated liquid hydrolysate may contain small incubated fresh food waste particles, having an average diameter of less than about 74 µm, for the reasons provided herein. In some embodiments, the fine screen separating of step (d) produces a liquid hydrolysate that is about 90% to about 95% by weight relative to the weight of the input incubating fresh food waste.

The separated liquid pasteurized hydrolysate is then emulsified/homogenized using an ultra-high shear grinder. The ultra-high shear grinder may be designed for maximum shear and low flow. In some embodiments the ultra-high shear grinder may be, for example, a grinder suitable for polishing catchup. In some aspects, the ultra-high shear grinder may be, for example, an ultra-high shear multi stage mixer with maximum shear and low flow. In one aspect, the emulsified hydrolysate produced using an ultra-high shear mixer has an average particle size of less than about 70, 65, 60, 55, 50, 45, 40, 35, 30, 29, 28, 27, 26 or about 25 µm or less, or 24, 23, 22, 21, 20, 19, 18, 17, 16, 15, 14, 13, 12, 11 or 10 µm or less, or any range between any two recited sizes, preferably about 26 µm or less, or any emulsion mechanically created or created through the use of emulsifying agents. The size of the particles may be measured, for example, with laser diffraction.

In one aspect, the process includes a stabilization step following incubation of the fresh food waste with the enzyme mixture. In some aspects, the stabilizing step can also include a preserving step, for example, by using acid and/or preservatives, which can be, in some aspects organic acids and/or organic preservatives allowed for use in the production of a certified organic hydrolysate. In some aspects, the stabilizing step of the processes of this invention comprises the addition and mixing of the liquid hydrolysate with an acid source consisting of hydrochloric, sulfuric, phosphoric, acetic, stearic, propionic, tartaric, maleic, benzoic, succinic acids, lactic, or citric acid, preferably phosphoric acid. Lactic acid, acetic acid, citric acid or other organic certified acids may also be preferably used to make certified organic fertilizer. For example, phosphoric acid or lactic acid may be added to lower the pH of the composition to inhibit microbial and/or pathogenic activity during the storage and transport of the composition which protects the nutrients from further digestion and/or degradation by microbes or pathogens. Phosphoric acid may be tri-calcium phosphate. In some aspects, the pH of the stabilized liquid hydrolysate is less than about 3.5. In some aspects, the pH of the stabilized liquid hydrolysate is from about 2.5 to about 3.5, preferably about 3.0. The stabilized product may be quarantined overnight, while the contents are tested to assure the elimination of pathogens. The purpose of the stabilization step is to produce a finished product that is shelf stable for at least two years, which can be accomplished through any of a variety of stabilization steps.

In one aspect, although the pasteurization step inactivates any bacteria or other pathogens present in the fresh food waste or the processing plant, the stabilization prevents growth of pathogens from environmental sources after the pasteurization step. Without stabilization, microbes and pathogens could contaminate and degrade a liquid hydrolysate even after sterilizing the hydrolysate. The stabilized product is readily buffered in the soil to a pH similar to the soil pH, which, under normal circumstances, will cause the liquid pasteurized hydrolysate to become biologically active, which is the desired mode of action for the product.

A preservative such as potassium sorbate, tocopherol, D-α tocopherol acetate, or any other suitable food additive preservative may also optionally be added as a preservative during the stabilization step. For organic fertilizer, tocopherol, D-α tocopherol acetate, natamycin, or any other food preservative certified for organic use may be added as a preservative. Potassium sorbate may be added, for example, at about 0.1 to about 1.0%, preferably 0.25%. Tocopherol or D-α tocopherol acetate may added, in some embodiments, at levels from 10 to 150 mg/kg. Natamycin may be added, in some embodiments, at levels, for example of 0.1 to 100 mg/mL. In another aspect, other preservatives may be added (together with the preservatives listed above, "preservatives") and/or those preservatives approved for use in certified organic products ("organic preservatives"). In another aspect, this invention relates to nutrient rich emulsified hydrolysates made from fresh food waste, comprising nutrients released by grinding, shearing, homogenization and enzymatic digestion, and an acid stabilizer, wherein the emulsified hydrolysate has an average particle size of less than about 26 μm and a pH of between about 2.5 and about 3.5, preferably about 3.0.

As described herein, in some aspects, this invention relates to a method for producing a nutrient rich feedstock or nutrient supplement from fresh food waste, comprising the steps of:
(a) providing fresh food waste feedstock using a highly efficient and effective collection system that makes urban permitting and co-location with the supermarket distribution center (or other major source of fresh food waste) feasible, eliminating the long distance haul of organic wastes to remotely located landfills, while preserving the fresh quality of the food waste for fertilizer and soil amendment production and animal feed production;
(b) grinding the fresh food, and optionally a low RPM/high torque grinder, to produce a fresh food waste particle slurry;
(c) incubating the fresh food waste particle slurry under constant agitation by adding to the fresh food waste particle slurry a combination of enzymes comprising at least one enzyme to digest proteins, at least one enzyme to digest fats and lipids, at least one enzyme to digest cellulosic material, and at least one enzyme to digest other carbohydrates and incubating the mixture at two or more temperatures ranging between about 100° F. and about 130° F., to match the temperature performance curves of the enzymes, wherein an in-line grinder comprising a high shear mixer is used to create shear during at least part of the incubating, whereby a hydrolysate comprising incubated fresh food waste particles is produced;
(d) pasteurizing the hydrolysate to kill pathogens;
(e) separating the hydrolysate into a liquid hydrolysate and incubated fresh food particles using a coarse screen and a fine screen;
(f) stabilizing and optionally preserving the hydrolysate;
(g) emulsifying the stabilized hydrolysate; and
(h) blending the emulsified hydrolysate in large storage tanks with circulation pumps, to assure the consistency of the finished product.

In some aspects, the blended product may be tested for pathogens from time to time to provide quality assurance.

In one aspect, fresh food waste is provided by obtaining fresh food waste collected from, for example, one or more of fresh food waste providers, for example, supermarkets, food processing facilities, fresh food distributors, fresh green waste from farms, or other viable sources of fresh food waste. In some aspects, providing fresh food waste comprises collecting fresh food waste from for example, supermarkets, food processing facilities, fresh food distributors, fresh green waste from farms, or other viable sources of fresh food waste. In some aspects, fresh food waste is provided by collecting produce, meat, fish, delicatessen, and bakery organics culled by supermarket staff members from food offered for sale by supermarkets. The fresh food waste may be collected in special totes and buggies designed to improve store hygiene and preserve freshness of such food waste, for frequent transportation to a processing facility utilizing the technology described herein. In some aspects the totes and buggies may be insulated. In some aspects, frequent transportation may be every one, two or three days, or multiple times per day.

In one aspect this invention relates to methods to collect food wastes in a manner of handling and timing that does not allow the food waste to become putrescent. Putrescent food waste is typically hauled off to distant landfills, where it emits greenhouse gases, noxious odors and toxic effluent. In the business methods described in this invention, food wastes are kept fresh, so that there are no emissions, no effluent, no nuisance odors, and essentially no waste. The processing described in this method takes place in a warehouse, in an urban area. Supermarket companies served in this method typically distribute food supplies to their supermarkets from a centrally located distribution center, in a warehouse in an urban area. Their trucks typically return to the distribution center empty. In this method, the supermarkets use specially made, insulated and sealed totes and buggies to collect food waste, which is then returned to the distribution center on a frequent basis. In another aspect, the totes and buggies are double walled. Due to its environmental advantages, the processing facility described in this method can qualify to receive all necessary government and regulatory permits and approvals to locate in a warehouse that is at or near the supermarket distribution center. In that way, rather than hauling the food waste from the supermarket distribution center to the remotely located landfill, it is simply shuttled from the distribution center to the processing facility described in this invention, thereby eliminating the haul to the landfill. Eliminating the haul saves money, reduces greenhouse gas emissions, and helps preserve the quality of the fresh food waste for processing into fertilizer and soil amendment and animal feed, as described herein.

In some aspects, the fresh food particles produced in step (e) may be used as animal feedstock or as a nutrient supplement.

In some aspects, the stabilized hydrolysate is emulsified using an ultra-high-shear mixer to produce an emulsified hydrolysate and/or by addition of an emulsifying agent.

In one aspect, the nutrient rich compositions of this invention are suitable for use as fertilizer and soil amendment. When used as fertilizer and soil amendment, the high nutrient composition not only provides nutrients directly to the plants (including amino acids) but also increases the organic matter in the soil by providing nutrients for soil organisms. These soil organisms which obtain nutrients from the nutrient rich compositions of this invention grow and promote plant growth, through nitrogen fixation or by providing additional organic nutrients for plants and otherwise improving soil quality. For example, liquid hydrolysates comprising amino acids, fatty acids, sugars, and minerals not only make nutrients directly available to plants, but also improve the soil by sustaining soil organisms including earthworms and microorganisms, including, for example, nitrogen fixing organisms (e.g., bacteria and archaea) and aerobic bacteria and fungi and a range of invertebrates.

When the soil organisms obtaining nutrients from the hydrolysates of this invention die they decay and in turn provide more organic nutrients for the soil organisms and the plants, providing additional organic matter and nutrients for plants over a sustained period of time and increasing soil organic matter. The increase in organic matter in the soil stimulates plant root growth, flowering, and fruiting, and increases crop yields. In one aspect, the compositions of this invention may more than double soil organic matter or more. In another aspect, the compositions of this invention may increase soil organic matter by up to 140% or 150% or more, preferably increasing soil organic matter by between about 40% and about 150%, depending on the initial level of soil organic matter.

Nutrient rich hydrolysates produced from fresh food waste contain more nutrients than compost mixtures obtained using standard composting processes which take up to 3 months, and result in degradation of organic nutrients resulting in reduction of the carbon content through conversion to $CO_2$, $CH_4$, $C_2H_5OH$ and other related effluent by-products of rotting and fermenting. The methods described herein are performed under aerobic conditions, with little decomposition. In some aspects, the methods described herein are performed, for example, in less than about 3 to about 12 hours or more, for example, about 3 to about 4 hours, preferably about 3 hours.

In another aspect application of the nutrient rich compositions of this invention as fertilizer permits elimination or a reduction in the use of conventional nitrate fertilizers such as urea nitrate, ammonium nitrate, calcium ammonium nitrate, or other nitrate fertilizers, while also improving crop yields. The nutrient rich compositions of this invention may promote faster initial growth after germination, increase root growth, increase canopy growth, increase field and/or greenhouse crop yields and/or increase the quality or flavor of the produce, for example by increasing the levels of sugar and/or other flavor components. Moreover, when the fertilizers of this invention are used in combination with nitrate fertilizers, plant growth is improved, including, for example, more vigorous root growth to form more extensive root systems. This results in uptake of a higher percentage of nitrate fertilizers by more extensive root systems of the treated plants, thereby further decreasing the amount of nitrate run off beyond the reduction in the amount of nitrate fertilizer applied and increasing water and nitrate use efficiency.

In one aspect the fertilizers of this invention may be applied using irrigation drip lines. In some aspects, the stock emulsified hydrolysate fertilizers of this invention are diluted prior to use. For example, the emulsified hydrolysate may be diluted with water to 1/5, 1/6, 1/7, 1/8, 1/9, 1/10 or in some applications, to as little as 5%, 4%, 3%, 2%, or 1% or less prior to use. Preferably the emulsified hydrolysate is diluted to 1/10 or as low as 1% or less prior to use. In some aspects the suitability of the hydrolysates of this invention for use with drip irrigation without clogging drip lines results from grinding and emulsification of water and oil soluble particles in the hydrolysates. Flushing of drip lines with water following may also be desirable to avoid microbe growth in drip lines following application of the hydrolysates of this invention.

In another aspect, this invention relates to a method of increasing the yield of produce, the method comprising applying by drip line irrigation a composition comprising a nutrient rich emulsified hydrolysate made from fresh food waste, the nutrient rich emulsified hydrolysate comprising nutrients released by grinding, shearing, homogenization and enzymatic digestion, and an acid stabilizer, wherein the emulsified hydrolysate has an average particle size of less than about 30 μm and a pH of between about 2.5 and 3.5, wherein the yield of produce is increased by at least 10% in some crops, and over 40% in other crops compared to treatment with nitrate fertilizer alone. In some aspects, the (diluted) emulsified hydrolysate is applied in combination with nitrate fertilizer, either through separate application on the same or different schedules, or by combining the hydrolysate and nitrate fertilizer in a mixture. For example, the emulsified hydrolysate may be applied in a 90:10, 85:15, 80:20, 75:25, 70:30, 65:35, 60:40, 55:45 or 50:50 mixture (v/v), or in that ratio in combination with nitrate fertilizer.

In some aspects, application of the fertilizers of this invention increase crop yield as described herein, even when the amount of nitrate fertilizer is decreased. Preferably the use of the fertilizers of this invention increase crop yield by at least 10%, 15%, 20%, 25%, 30%, 35% 40%, 45%, 50%, or at least 10% over a growing season.

BRIEF DESCRIPTION OF THE DRAWINGS

In FIG. 26 the y-axis shows *Listeria monocytogen* levels (CFU/mL) and the x-axis indicates durations of the each process (in minutes). The levels of *Listeria monocytogen* in growth media were $6.0 \times 10^8$, $2.1 \times 10^9$, and $1.2 \times 10^9$ CFU/mL in Run 1, Run 2, and Run 3, respectively (shown as red circles in FIG. 5). Mixing of *Listeria monocytogen* pallets into the hydrolysate resulted *Listeria monocytogen* levels of $5.0 \times 10^6$, $4.3 \times 10^8$, and $3.0 \times 10^6$ CFU/mL in feedstock in Run 1, Run 2, and Run 3, respectively (shown as green triangles in FIG. 26). ND means that no pathogens were detected at a given stage.

FIGS. 27A-27F show results from a test for the presence of pesticides conducted by OMIC USA, Inc., a highly regarded agronomic testing laboratory which performed analytical testing for pesticides on a sample of H2H. It lists 259 separate pesticides. None are detectable in the large, combined sample of H2H that was tested. Due to the length of the results the table is continuous throughout five sheets. The description for FIGS. 27A, 27B, 27C, 27D, 27E and 27F are each the continuous results from the referenced test.

DETAILED DESCRIPTION

Figure 1:
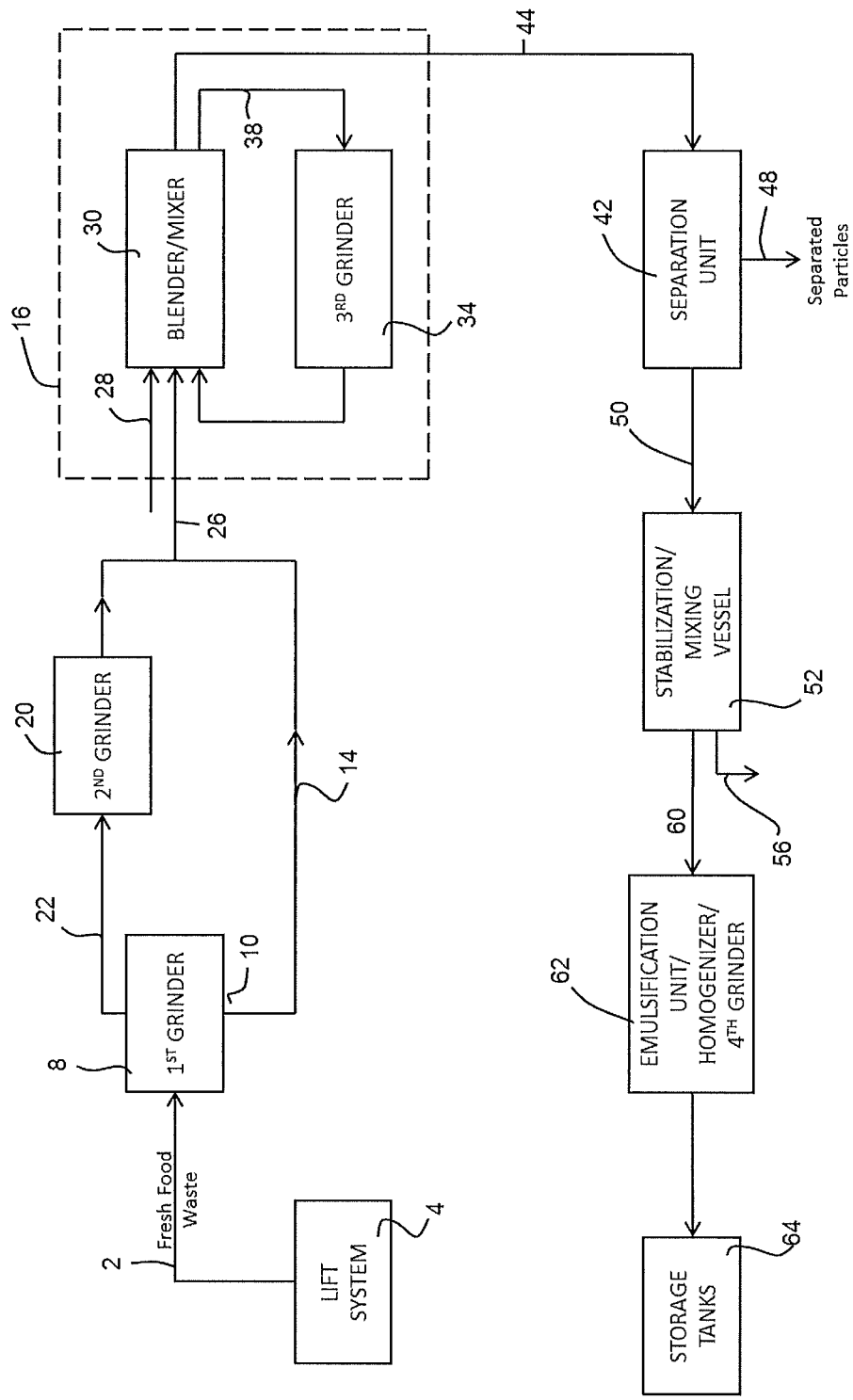
FIG. 1 is a schematic diagram showing an overview of the system according to embodiments of the disclosure.

In one embodiment, this invention relates to methods of producing nutrient-rich compositions from fresh food waste, the steps comprising some or all of mechanical grinding, enzymatic digestion, heating, pasteurization, screening, stabilization, in some instances, emulsification and blending. In some embodiments, the methods of this invention comprise grinding, heating and incubating the ground mixture with a combination of enzymes, and pasteurization, resulting in the conversion of fresh food waste into nutrient rich compositions. The pasteurized composition may be separated into a liquid hydrolysate and incubated fresh food waste particles by, for example, separating the liquid hydrolysate from fresh food waste particles using, for example, one or more mesh screens. In some embodiments, the methods comprise a plurality of grinding steps, for example, at least three or four grinding steps. The grinders may comprise grinders with grinding, shredding, shearing, and ultra-high shear (homogenization/emulsification) action. The one or more combination of enzymes releases nutritional components from the fresh organic waste by digesting proteins, carbohydrates, and fats and oils in fresh food waste to produce a liquid hydrolysate fertilizer which contains, for example, amino acids, simple sugars, fatty acids and minerals.

In some aspects, the method for producing a nutrient rich composition from fresh food waste comprising the steps of:

(a) providing fresh food waste using a highly efficient and effective collection system;

(b) grinding the fresh food waste to produce a fresh food waste particle slurry;

(c) incubating the fresh food waste particle slurry under constant agitation by adding to said particulate fresh food waste particle slurry a combination of enzymes comprising at least one enzyme to digest proteins, at least one enzyme to digest fats and lipids, at least one enzyme to digest cellulosic material, and at least one enzyme to digest other carbohydrates and incubating the mixture at two or more temperatures ranging between about 100° F. and 130° F., to match the temperature performance curves of the enzymes, wherein an in-line grinder is used to create shear during at least part of the incubating, whereby a hydrolysate comprising incubated fresh food waste particles is produced;

(d) pasteurizing the hydrolysate to kill pathogens;

(e) separating the hydrolysate into a liquid hydrolysate and incubated fresh food particles optionally using a coarse screen and a fine screen;

(f) stabilizing and optionally preserving the hydrolysate;

(g) emulsifying the stabilized hydrolysate optionally using an ultra-high-shear mixer to produce an emulsified hydrolysate or an emulsifying agent; and (h) blending the emulsified hydrolysate in large storage tanks with circulation pumps, to assure the consistency of the finished product.

The highly efficient and effective collection system is a system that makes urban permitting and co-location with the supermarket distribution center (or other major source of fresh food waste) feasible, and eliminates the long distance haul of organic wastes to remotely located landfills, while preserving the fresh quality of the food waste for fertilizer and soil amendment and feed production. In some embodiments, the fresh food waste is provided by obtaining fresh food waste collected from, for example, one or more of fresh food waste providers, for example, supermarkets, food processing facilities, fresh food distributors, fresh green waste from farms, or other viable sources of fresh food waste. In some embodiments, providing fresh food waste comprises collecting fresh waste from fresh food waste from for example, supermarkets, food processing facilities, fresh food distributors, fresh green waste from farms, or other viable sources of fresh food waste. Fresh food waste may also be provided, in some embodiments, by collecting produce, meat, fish, delicatessen, dairy and bakery organics culled by supermarket staff members from food offered for sale by supermarkets. The fresh food waste may be collected in special totes and buggies designed to improve store hygiene and preserve freshness of such food waste, for frequent transportation to a processing facility utilizing the technology described herein. In some embodiments, the totes and buggies may be double-walled. In some embodiments, the totes and buggies may be made of plastic having a low heat transfer rate or other materials having a low heat transfer rate.

In one aspect this invention relates to methods to collect food wastes in a manner of handling and timing that does not allow the food waste to become putrescent. Putrescent food waste is typically hauled off to distant landfills, where it emits greenhouse gases, noxious odors and toxic effluent. In the business methods described in this invention, food wastes are kept fresh, so that there are no emissions, no effluent, no nuisance odors, and essentially no waste. The processing described in this method takes place in a warehouse, in an urban area. Supermarket companies served in this method typically distribute food supplies to their supermarkets from a centrally located distribution center, in a warehouse in an urban area. Their trucks typically return to the distribution center empty. In this method, the supermarkets use specially made, double walled, insulated and sealed totes and buggies to collect food waste, which is then returned to the distribution center on a frequent basis. Due to its environmental advantages, the processing facility described in this method can qualify to receive all necessary permits and approvals to locate in a warehouse that is at or near the supermarket distribution center. In that way, rather than hauling the food waste from the supermarket distribution center to the remotely located landfill, it is simply shuttled from the distribution center to the processing facility described in this invention, thereby eliminating the haul to the landfill. Eliminating the haul saves money, reduces greenhouse gas emissions, and helps preserve the quality of the fresh food waste for processing into fertilizer and soil amendment and feed, as described herein.

Figure 36:
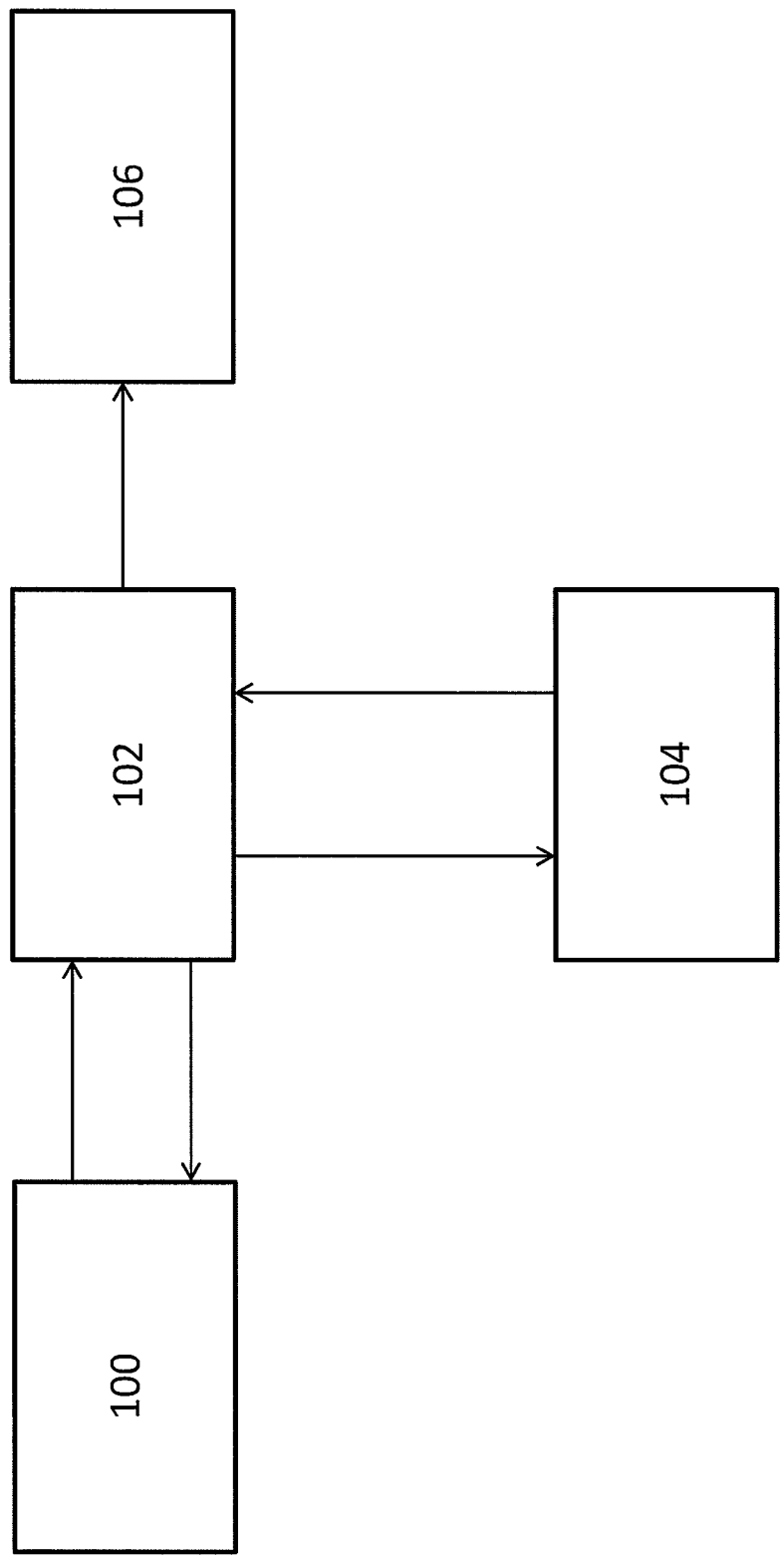
FIG. 36 shows the schematic of one embodiment of the collection system method.

One embodiment of the method to collect food waste in a manner with respect to handling and timing that does not allow the food waste to become putrescent is depicted in FIG. 36. Sealable totes are sent from the processing facility 100 to the distribution center 102. The empty sealable totes are sent from the distribution center 102 to the supermarket 104 ("urban consumer market"). Food wastes are collected in the sealable totes at the supermarket 104. The filled sealable totes are then sealed. The filled sealable totes are sent from the supermarket 104 to the distribution center 102. The sealable totes can optionally remain sealed at the distribution center 102. The sealable totes are sent from the distribution center 102 to the processing facility 100. The processing facility 100 can perform the methods described in this disclosure for processing the fresh food waste into nutrient rich hydrolysate and nutrient particles for feed. The food waste processing at the processing facility 100 reduces the requirement to transfer food waste from the distribution center 102 to a remote rural landfill 106. The need for reduced transfer of food waste from the distribution center 102 to a remote rural landfill 106 results in reduced transportation costs and/or reduced emissions (e.g., $N_2O$, carbon dioxide) from the reduced transportation process. The processing facility 100 can also apply a pasteurization step to the food waste. In addition, as a result of reduced emissions, the processing facility 100 can obtain all necessary government and regulatory permits and approvals for location within a warehouse in a commercial and/or industrial zoned area.

In some embodiments, the grinding of the fresh food waste into a fresh food waste particle slurry is performed using a rotary knife grinder, as further described herein. In some embodiments, a low RPM/high torque grinder may optionally be used to further grind the initial fresh food waste slurry to form the fresh food waste particle slurry. In some embodiments, the in-line grinder used to create shear during incubation comprises a high shear mixer with a disintegrating head, as further described herein.

In some embodiments, the incubated fresh food particles separated in step (e) can be used as feedstock for animals, and/or as food supplements.

Accordingly, in some embodiments, the compositions of this invention are nutrient rich emulsified hydrolysates made from fresh food waste, comprising nutrients released by grinding, shearing, homogenization and enzymatic digestion, and an acid and preservative stabilizer, wherein the emulsified hydrolysate has an average particle size of less than about 26 μm and a pH of between about 2.5 and about 3.5, preferably about 3.0.

The use of fresh food waste with minimal decomposition prevents the loss of organic carbon nutrients through degradation or consumption by microbes such as bacteria or fungi, which converts carbon containing nutrients into $CO_2$ and/or methane. In contrast, compositions made from putrescent food waste and/or by composting or anaerobic digestion have a lower carbon nutrient content as a result of breakdown into $CO_2$ and/or methane. Rapid processing performed under aerobic conditions minimizes this loss. Moreover, the amine-containing compounds in the compositions of this invention are more easily absorbed by plants than inorganic amines in traditional or standard fertilizers such as ammonium or nitrate fertilizers. Traditional fertilizers are often measured in terms of nitrogen, phosphorus and potassium (N—P—K) content.

In some embodiments, the methods of this invention process fresh food waste into a nutrient rich hydrolysate in about eight hours or less. In some embodiments, the fresh food waste may be processed in less than about 12, 7.5, 7, 6.5, 6, 5.5, 5, 4.5, 4, 3.5, 3, 2.5, or about 2 hours, preferably less than 4 hours. In some embodiments, the fresh food waste may be processed in less than about 3 hours. A stabilization step also helps to ensure that the nutrients in the hydrolysate do not decompose.

In one aspect, the nutrient rich compositions of this invention are suitable for use as fertilizer and soil amendment. The emulsified hydrolysates of this invention are nutrient rich, comprising sugars, fatty acids and amino acids or peptides. When used as fertilizer, the high nutrient composition not only provides nutrients directly to the plants (including amino acids) but also increases the organic matter in the soil by providing nutrients for soil organisms.

For example, the nutrients comprising amino acids, fatty acids, minerals and sugars, not only make nutrients directly available to plants, but also improves the soil by sustaining soil organisms including earthworms and microorganisms, including, for example, nitrogen fixing organisms (e.g., bacteria and archaea) and aerobic bacteria and fungi and invertebrates, which in turn provide additional organic matter and nutrients for plants over a sustained period of time. The soil organisms which obtain nutrients from the nutrient rich compositions of this invention grow and promote plant growth, either through nitrogen fixation or by providing additional organic nutrients for plants. When the soil organisms that utilize nutrients in the hydrolysates of this invention die, they decay and in turn provide more organic nutrients for the soil organisms and the plants. Accordingly, the emulsified hydrolysates of this invention also increase organic matter in the soil by promoting the growth of soil organisms to provide an additional nutrient source to plants.

The increase in organic matter in the soil stimulates root growth, flowering, and fruiting, and increases crop yields. In one aspect, the compositions of this invention more than double soil organic matter by up to about 140% or 150% or more. In one aspect, the compositions of this invention may increase soil organic matter by up to 40%, 50%, 60%, 70%, 80%, 90%, 100%, 110%, 120%, 130%, 140%, 150% or more, depending on the initial level of soil organic matter.

By stimulating and supporting the growth of soil organisms, the emulsified hydrolysates of this invention can increase soil organic matter in excess of the organic matter content of the hydrolysate. The hydrolysates are approximately 75% water and 25% organic matter; so all of the organic matter in the hydrolysates can advantageously be applied to the soil in the root zone by drip line irrigation. This is a much easier application than adding compost, which has to be spread mechanically and tilled into the soil. In addition the nutrient and pathogen content of compost is inconsistent, and does little to increase soil organic matter because many nutrients are degraded during the lengthy composting process and/or utilized during breakdown of the organic matter into compost by microbes. Moreover, compost often contains manure, and pathogens from the manure or other sources, such as *E. coli, salmonella*, and *listeria* pose a safety risk.

In one aspect the fertilizers of this invention may be applied using irrigation drip lines. In some aspects the suitability of the hydrolysates of this invention for use with drip irrigation results from fine grinding and emulsification of particles and oil droplets in the hydrolysates. The small size of particles and oil droplets in the emulsified hydrolysates of this invention permit their application as fertilizer through drip lines without clogging drip lines, which also results in water conservation. In addition, where the hydrolysate is administered by drip irrigation, a column of soil with enhanced organic content can be found below each drip emitter. In this aspect, the fertilizers of this invention not only enhance crop yield but also promote the sustainable use of limited agricultural resources. The hydrolysates of this invention can therefore be administered by drip irrigation to increase soil organic matter. This may particularly useful for crops which have horizontally growing roots where topically applied organic matter cannot be worked into the soil, such as almonds, which are planted on approximately 800,000 acres in California. In contrast, other hydrolysate fertilizers such as fish hydrolysate, or other hydrolysates with larger particle sizes, tend to clog irrigation drip lines.

The methods of this invention are further useful in reducing or eliminating pathogens present in fresh food waste during the processing, so the hydrolysates can safely be used as fertilizers for the production of produce. H2H has also been tested negative for the presence of pesticides.

The source of over 95% of nitrate pollution in groundwater is the use of nitrate fertilizers in farming, and from dairies. See "Addressing Nitrate in California's Drinking Water," (UC Davis Report for the SWRCB SBX2 1 Report to the Legislature). Direct methods for removing nitrate from large groundwater basins are costly and not technically feasible.

It has been found that substitution of the nutrient rich fertilizers of this invention for all or a part of traditional nitrate fertilizers lowers nitrate runoff into groundwater basins, lakes and streams, which can help address the growing problem of nitrate pollution in groundwater. Thus, in another embodiment, the application of the nutrient rich compositions of this invention as fertilizer permits elimination or a reduction in the use of conventional nitrate fertilizers such as urea nitrate, or other nitrate or ammonium fertilizers, while sustaining or improving crop yields. H2H stimulates activity in soil organic matter, which in turn, stimulates plant root growth, flowering and fruiting. Increased root growth leads to more efficient plant uptake of water and plant nutrients. In some aspects, application of the fertilizers of this invention increase crop yield as described herein, even when the amount of nitrate fertilizer is decreased. Preferably the use of the fertilizers of this invention increase crop yield by at least 10% and possibly over 40% over a growing season. Moreover, the fertilizers of this invention provide comparable or better yields at lower costs.

It has been surprisingly found that application of a mixture of nutrient rich fertilizer alone or nutrient-rich fertilizer and nitrate fertilizers in, for example at 50:50 mixture, can sustain or increase crop yields compared to application of nitrate fertilizer alone. In some embodiments the ratio of nutrient rich fertilizer to nitrate fertilizer may be, for example, 90:10, 85:15, 80:20, 70:30, 60:50, 50:50, 40:60, or 25:75. In the 50:50 mixture, half of the nitrate fertilizer applied is replaced by the nutrient-rich fertilizer. In some embodiments, the nutrient rich fertilizer can be applied with a 25% to 50% decrease in chemical nitrogen fertilizer, to optimize yield.

In one embodiment, this invention relates to a method of increasing the yield of produce, the method comprising applying by drip line irrigation a composition comprising a nutrient rich emulsified hydrolysate made from fresh food waste, the nutrient rich emulsified hydrolysate comprising nutrients released by grinding (whether by knife mill or low speed, high torque in-line grinder or both), shearing, homogenization and enzymatic digestion, and an acid stabilizer and a preservative, wherein the emulsified hydrolysate has an average particle size of less than about 30 µm and a pH of between about 2.8 and 3.2, wherein the yield of produce is increased by at least 10% compared to treatment with nitrate fertilizer alone. In some aspects, the (diluted) emulsified hydrolysate is applied in combination with nitrate fertilizer, either through separate application on the same or different schedules, or by combining the hydrolysate and nitrate fertilizer in a mixture. For example, the emulsified hydrolysate may be applied in a 90:10, 85:15, 80:20, 70:30, 75:25, 70:30, 65:35, 60:40, 55:45, 50:50, 45:55, 40:60, 35:65, 30:70, 25:75, 20:80, 15:85, 10:90, 7.5:92.5, 5:95, 4:96, 3:97, 2:98, or 1:99 mixture (v/v), or in that ratio in combination with nitrate fertilizer. The emulsified hydrolysate may be present in as little as 25%, 20%, 15%, 10%, 5%, 4%, 3%, 2% or 1% or less in the irrigation water.

The nutrient rich compositions of this invention promote faster initial growth after germination, increase root growth, increase canopy growth, flowering and/or fruiting, increase yields of crops in the field and/or greenhouse and/or increase flavor of the produce, for example by increasing the levels of sugar and/or other flavor components. The nutrient rich fertilizers of this invention may also be useful for increasing vigor of crop plants, including fruits, vegetables, vines, such as grape vines, and trees, including fruit or nut trees. The increased vigor also provides resistance to pests and diseases. In an aspect where the fertilizers of this invention are useful for increasing plant canopy, the bigger canopy also, for example, helps to keep soil temperatures lower, reduce water evaporation from the soil, increase capture of sunlight, and reduce weeds.

Moreover, when the fertilizer and soil amendment of this invention are used in combination with nitrate fertilizers, plant growth is improved, including, for example, more vigorous root growth to form more extensive root systems. This results in uptake of a higher percentage of water and nitrate fertilizers by more extensive root systems of the treated plants, thereby further decreasing the amount of nitrate run off beyond the reduction in the amount of nitrate fertilizer applied and greater water use efficiency.

In addition, the methods of this invention also permit recycling of fresh food waste which would otherwise be disposed of in landfills, thereby having an additional positive impact on the environment. By recycling food that would otherwise rot or ferment, the methods of this invention fully utilize the capabilities and benefits of fresh food waste and drastically reduce the potential risks of harboring pathogens while providing significant benefits to the soil.

In some embodiments, the emulsified hydrolysates of this invention may contain nitrogen, phosphorous and potassium (1-1-0), 18 amino acids (5-7%), lipids (6-8%), carbohydrates (8-10%), and organic matter (20-25%). In some embodiments, the emulsified hydrolysates of this invention may also contain small amounts of aluminum, calcium, copper, iron, magnesium, manganese, sodium, sulfur, and zinc.

Incubation and Pasteurization

A combination of enzymes is used in the methods of this invention to produce nutrient-rich compositions of this invention. In some embodiments, the combination of enzymes for use with this invention may comprise one or more enzymes to digest proteins in the fresh food waste, one or more enzymes to digest fats and lipids, and one or more enzymes to digest carbohydrates in the fresh food waste. The enzymes to digest carbohydrates may include, for example one or more enzymes to digest cellulose, pectin, and the alpha bonds of large, alpha-linked polysaccharides (for example, starch and/or glycogen), to yield sugars such as glucose and maltose. In some embodiments, the combination of enzymes useful in this invention may comprise, for example, one or more proteases, one or more lipases, one or more cellulases, one or more pectinases, and/or one or more $\alpha$-amylases. In one embodiment, the combination of enzymes for use in this invention may comprise at least one protease, cellulase, pectinase, lipase, and $\alpha$-amylase. One or more enzymes or enzyme combinations that comprise the combination of enzymes may be added at various stages of the incubation, depending upon the temperatures that are suitable or optimal for the activity of each enzyme or enzyme combination. The enzyme digestion is carried out with constant movement, such as mixing, recirculating and/or grinding with shearing action. When the process is carried out under conditions of constant agitation and shear during all or part of the incubation, the yield of hydrolysate increases from around 70 to over 90%.

Other enzymes useful in the methods of this invention may include, for example, exo-peptidase, endo-peptidase, xylanase, asparaginase, cellulase, hemicellulase, glucanase, beta-glucanase (endo-1,3(4)-), urease, phytase, phosphatase, aminopeptidase, carboxypeptidase, catalase, chitinase, cutinase, cyclodextrin glycosyltransferase, deoxyribonuclease, esterase, alpha-galactosidase, beta-galactosidase, glucoamylase, alpha-amylase, alpha-glucosidase, beta-glucosidase, haloperoxidase, invertase, lactase, mannosidase, oxidase, glucose oxidase, pectinesterase, peptidoglutaminase, peroxidase, polyphenoloxidaseribonuclease, transglutaminase, papain, pepsin, trypsin, and/or chymotrypsin.

The combination of enzymes may be added one at a time, or as two or more enzyme combinations, for example, in a first, second or more enzyme combinations, and incubated at a temperature suitable for the enzyme combination added. Enzymes comprising the combination of enzymes may be added one at a time and/or in combinations, which may be pre-mixed or not, prior to adding to the fresh food waste mixture. One or more of the enzymes in enzyme combinations useful in the methods of this invention may be selected to have compatible activity temperature ranges, and the enzymatic digestion may be carried out at one or more temperatures. For example, in some embodiments, a first enzyme combination may be added, and the temperature of the mixture increased to a temperature of around 100° F. to 130° F. for at least 30 minutes (e.g., for about 30, 40, 50, 60, 70, 80, 90, 100, 110, or 120 minutes). Alternatively the mixture may be heated to the first temperature before adding the first enzyme combination. The mixture may be agitated by blending or mixing. In some embodiments, for example, a ribbon blender or paddle mixer may be used to blend the mixture during incubation with the enzymes. The enzymes added in this first stage may be, for example, enzymes to digest cellulose and/or lipids. In some embodiments, the enzymes added at this stage may be endo and exocellulase and a lipase.

A second enzyme combination may be added and the mixture heated to a second or intermediate temperature, for example, from about 100° F. to about 130° F. Alternatively the mixture may be heated to the intermediate temperature before adding the second enzyme combination. For example, enzymes for digesting pectin, the alpha bonds of large, alpha-linked polysaccharides and for digesting protein may be added and the incubating mixture heated to about 130° F. or higher. The mixture may be incubated at that temperature for about 1 hour to about 3 hours or more. In some embodiments, the incubated mixture may be heated at the second temperature for about 1.5 to about 2 hours, preferably 1.5 hours. The enzymes added at this step in some embodiments may be, for example, pectinase, $\alpha$-amylase and protease. Any remaining enzymes from the combination of enzymes may be added in a third or more enzyme combination and incubated at a temperature suitable for, or optimized for the activity of the enzymes in the enzyme combination. In some aspects, one protease may be added after one pectinase and $\alpha$-amylase.

In some embodiments, the in-line grinder with shearing action may be turned on after the slurry has been incubated with the first enzyme combination for about 30 minutes to about 1 hour, although the start and run times may vary, and still achieve the same particle size reduction objectives. The in-line grinder further reduces the size of the particles present in the incubated mixture to $\frac{1}{16}$ to $\frac{1}{32}$ of an inch.

After the incubation step at the second temperature, the mixture is heated to between about 160-170° F. for about 30 minutes to about 2 hours to pasteurize the hydrolysate and further inactivate any pathogens. In some embodiments, the pasteurization is performed for about 30 minutes, 40 minutes, 45 minutes, 50 minutes, or about 1 hour or more, preferably for about 30 minutes. In some embodiments, the pasteurization step may be performed at various combinations of temperature and duration, as commonly used in pasteurization processes.

Grinding

In one embodiment, the method of making high nutrient organic compositions comprises two, three, four or more grinding steps for particle reduction. The at least two, three, or four or more different grinders have different grinding mechanisms which, when combined with enzymatic digestion, serve to reduce fresh food waste to particles small enough to form a stable emulsion. Small particle size is critical to the efficacy of H2H in the soil. Smaller particles have a larger surface area to volume ratio than larger particles, maximizing the efficacy of the digest (i.e., the process of enzymes cleaving long chain nutrient molecules into short chain, "building block" molecules). Increasing the surface area to volume ratio also makes H2H readily available to be metabolized by diverse soil organisms, to maximize its impact in the soil. That, in turn, creates the desired stimulation of plant root and canopy growth, flowering and fruiting, and the resulting increase in plant uptake of water and nutrients. Reducing particle size has the related benefits of improving emulsification (the stable mixing of oil and water based particles), improving the flow of H2H through farm drip irrigation systems without clogging, and the even dispersal of H2H throughout the irrigation/dilution water. In some embodiments, the method comprises 4 grinding steps, for example, a rotary blade grinder, a high torque, low speed grinder, an inline grinder with shearing action, and an ultra-high shear grinder with homogenizing action to emulsify the hydrolysate.

It has been further determined that use of the grinders as disclosed herein can grind the variety and mixture of materials commonly found in fresh food waste. For example, fibrous material such as celery stalks or corn husks will pass through the high torque shredding grinder as a long, fibrous piece, while a high speed, high shear grinder, will chop up the fibrous material. As another example, the optional high torque grinder with a shredding action will shred and further reduce the size of dense material present in the fresh food waste particle slurry, such as bone fragments or other dense materials present in the fresh food waste particle slurry. In addition, the high shear grinder with shearing action will also help to further reduce the size of bone fragments or other dense materials in the fresh food waste particle slurry or sheared fresh food waste slurry. With or without the optional shredding step, the high shear grinding ensures that larger bone fragments do not reach the ultra-high shear mixer and damage the fast spinning blade.

In some embodiments, the first grinding step preferably reduces the particle size to an average size of about ½ inch in diameter. The first grinding step may comprise grinding fresh food waste using a rotary knife grinder to convert the fresh food waste into small particles. In some embodiments, the rotary knife grinder has a pump head. In one embodiment, the blade of the blade grinder rotates against a screen plate, cutting the fresh food waste into particles. In other embodiments, the blade of the blade grinder rotates against a plate that includes holes, cutting the fresh food waste into particles. The size of the particles produced by the blade grinder is fixed to the size of the holes in the screen or other plate. The rotary knife grinder of the first grinding step is a low RPM, high torque grinder in various embodiments. Preferably, the blade grinder will have laser machined tolerances between the blade and screen to produce particles of about ½ inch but other particle sizes are produced in other embodiments. In one embodiment, the first grinder is an in-line Grinder with a pump and may have a 5" to 12" plate, for example, a 8⅝" plate, a 40-60 HP motor, for example, a 50 HP motor and a capacity of 10,000 to 20,000 lbs/hour, for example, 15,000 lbs/hour in some embodiments. In other embodiments, the plate may include other dimensions and the motor may include an HP within the range of 20-200 HP and still other powers are used in other embodiments. The size of the plate, the horsepower and the capacity of the rotary blade grinder can be selected according to the desired throughput and particle size of fresh food waste.

In one embodiment a second grinding step may follow the rotary blade grinding step. In this step, for example, in higher capacity systems and processes, the second grinder will be a slow-medium speed/high torque grinder with shredding action which further shreds and reduces the size of particles in the fresh food waste particle slurry, including dense particles such as bone. In some embodiments, the shredding is done by counter knives. The grinder used in this optional step may be, for example, a low to medium RPM/high torque grinder. In some embodiments, the low RPM, high torque grinder has a speed of about 1200-1700 RPM and in other embodiments, the grinder may have a speed in the range of 1000 to 2000 RPM and in still other embodiments, other speeds may be used. The low-medium RPM, high torque grinder may have a torque of about 5000-7000 foot-lbs. in some embodiments and it may have a torque of 2500-10000 foot-lbs. in other embodiments. In some embodiments, the low-medium RPM, high torque grinder runs at about 1450 to 1500 RPM, with about 6,000 to about 6,500 foot lbs of torque. This slow speed/high torque grinder grinds, for example, dense materials, thereby protecting the second in-line grinder from wear. In some embodiments, the shredding action of this in-line grinder is achieved by the use of two rows of sharp, steel cutters which rotate slowly and with high-torque to turn large dense fragments such as bone fragments into smaller particles that flow smoothly through pumps and pipelines. This high torque rotation pulls solids through the blades, and helps to further shred and reduce the particle size of solid particles in the mixture. Various grinders made by various manufacturers are used in various embodiments. In some embodiments, the grinders may use extremely energy efficient 2-10 hp motors so they are more efficient to operate. In one embodiment, this optional in-line grinder will be, for example, an energy efficient 2-10 hp motor high torque rotation grinder.

In addition, in one embodiment the incubation vessel contains a recirculating line connected to an in-line grinder with shearing action which is used during all or a part of the incubation and pasteurization. When the optional second grinder is used, this in-line grinder in the incubation vessel will be the third grinder in various embodiments of the invention. In some aspects, the in-line grinder with shearing action is used during all or a part of the incubation with the combination of enzymes and pasteurization. In one embodiment, the in-line grinder with shearing action comprises a high shear mixer with medium torque and is a mechanical shearer with rotating blades but other mixers are used in other embodiments. In some embodiments, the high shear mixing pump is used with a general disintegrating head and/or a fine screen head for further disintegrating the particles in the mixture. In some aspects the in-line grinder comprises a high shear mixer with a disintegrating head. In some aspects, the high shear in-line grinder is used beginning at about 15, 30, 40, 45, 50, or about 55 minutes to about 1 hour after incubation begins and continue through the pasteurization step, preferably about 30 minutes after incubation begins. In some aspects, the start and run times may vary, and still achieve similar particle size reduction objectives. The particles in the resulting hydrolysate may be less than about $1/16^{th}$ and about $1/32^{nd}$ of an inch but other sizes are achieved in other embodiments.

High shear action between the high-speed rotor blades and the stator shears particles and droplets in the mixture, expelling the sheared material at high velocity into the surrounding mix, creating intense hydraulic shear. The rpm of the high shear mixing pump is greater than about 3500 to about 4500 rpm, preferably greater than about 4000 rpm in some embodiments, but other speeds are used in other embodiments. This in-line grinder with shearing action further reduces the size of particles in the mixture, including shearing bone fragments, which helps to prevent wear on the ultra-high shear mixing pump through expansion of the tolerances by passage of large particles between the blade and the stator.

This in-line grinder can be bolted into a pipeline, which in some embodiments, may help to recirculate the incubating mixture, and reduce the size of the particles or any remaining solids in a liquid solution. The flow rate may be up to about 350 gallons per minute. The in-line grinding step may also help to protect downstream equipment, such as pumps, valves, centrifuges and heat exchangers. In one embodiment, the in-line grinding step may reduce the wear on the ultra-high shear mixer. This in-line grinder can be used during all or part of the incubating of the fresh food waste particles with the enzyme combination(s). In this grinding step, the size of the particles in the mixture may be reduced to a size from less than about $1/16^{th}$ to about $1/32^{nd}$ of an inch but other sizes are achieved in other embodiments. In one embodiment, this in-line grinder is a high shear mixer comprising an in-line mixer, driven by a 20-40 HP or 20-30 HP motor, for example, a 25 HP motor. In other embodiments, motors with greater or lesser horsepower ratings are used. The system includes a stainless steel tank used as the incubation vessel, which is attached to the in-line high shear mixer. This in-line grinder has a flow through rate of about 300-500 US gallons per minute, for example, 350 USGPM based on water, although various combinations of motor horsepower and flow rates may be used to achieve the desired particle size reduction. The incubating mixture may be circulated through the incubation vessel and high-shear mixer in a loop and the resulting hydrolysate can then be directed away from the loop and into the ultra-high shear grinder.

The fourth grinding step (when the optional second grinding step is used) is an ultra-high shear mixing pump. The ultra-high-shear mixer is useful in some embodiments for homogenizing and/or emulsifying the separated nutrient rich hydrolysate and/or dispersing small particles in the nutrient rich composition. The ultra-high shear mixer may be rotated at high rpm, against a fixed screen, further disintegrating and homogenizing any solid particulate matter remaining after the third grinding step and separation. The homogenizing grinder is selected, in some embodiments, to have maximum shear and low flow. The ultra-high shear mixing pump preferably uses multi-stage rotor/stator generators which impart intense shear and produce materials with particle/droplet sizes. In some embodiments, the ultra-high shear mixing pump includes intermeshing teeth. In some embodiments, the spin rate of the ultra-high shear mixer may between about 10,000 to about 18,000 feet per minute (fpm) feet per minute, in order to emulsify oil soluble particles in the aqueous solution. In some embodiments, the ultra-high shear grinder may be a high shear multi stage mixer with a 2.5" to 6" rotor, e.g., a 3" rotor, and tip speeds in excess of about 10,000 to about 20,000 feet per minute (fpm), for example, about 18,000 fpm, and thousands of intense shearing events with each revolution. In other embodiments, other speeds and rotor sizes are used to achieve the desired particle size reduction and emulsification. In some embodiments, where the optional second grinding step is omitted this will be the third grinding step.

This homogenization/emulsification step reduces the average size of particles in the emulsified hydrolysate to less than about 70, 65, 60, 55, 50, 45, 40, 35, 30, 29, 28, 27, 26, 25, 24, 23, 22, 21, or 20 µm or less, or 19, 18, 17, 16, 15, 14, 13, 12, 11 or 10 µm or less, preferably less than about 26 µm, or any range of average size of particles between any two of the recited sizes. In some embodiments, more than about 60, 65, 70, 75, 80, or 85% of the particles will have a diameter of less than about 30, 29, 28, 27, 26, 25, 24, 23, 22, 21, 20, 19, 18, 17, 16, 15, 14, 13, 12, 11 or 10 µm, or any range of percentages of particles between any two of the recited percentages. In one embodiment, 70 to 80% of the particles after homogenization have a diameter of 26 µm or less. Various methods, including laser diffraction, may be used to determine the size distribution of particles. Other suitable methods such as light scattering or imaging may also be used.

In contrast to the emulsified hydrolysates of this invention, the size range of particles in compositions produced by other methods, for example the method disclosed in U.S. application Ser. No. 12/338,446, is significantly larger, since that composition is passed through a 120 mesh screen (around 125 microns). The very small size of the particles in the hydrolysate produced by the high-shear mixer results in a homogeneous nutrient rich hydrolysate comprising oil soluble particles that are emulsified and/or suspended in an aqueous liquid. To achieve a uniform product which will be stable on the shelf, equilibrium mixing is used to obtain an equilibrium particle size and/or equilibrium droplet size. Once the oil particles are reduced to a small enough size, the surface tension is high enough in each particle that two particles that come into contact will not coalesce to form one larger oil particle. This avoids separation of the product into immiscible aqueous and oil layers, and settling of an aqueous layer containing sugars. In some instances, for example, an ultra-high shear mixing pump used to polish catchup or homogenize milk may be used for this step. The emulsified product disperses easily in water and is compatible for application to farm acreage through drip line irrigation, without clogging drip lines, which are susceptible to clogging by, for example, larger oil droplets and particles. As a result of the small particle and oil droplet size in the emulsified hydrolysate, it can be applied to farm acreage by a variety of methods, including drip lines, irrigation (fertilization), spray tank, foliar spray or by watering can.

The amount of mixing required to achieve equilibrium emulsification mixing is measured in tank turnover—the number of times the volume of material must pass through the high-shear zone. The ultra-high shear mixer can turn the contents of the emulsification tank over 3 times per minute. The emulsification step is carried out for about 1 hour, 60, 70, 75, 80, 85, 90, 100, 105, 110 120, 130, 135, 140, 150, 160, 165, 170, or about 180 minutes. Preferably the emulsification/homogenization step is carried out for about 2 hours, although the start and run times may vary, and still achieve similar emulsification objectives. In some embodiments, this step can take as long as 12 hours, as it may take place while the emulsified hydrolysates of this invention are quarantined in the stabilization tank while the batch pathogen test is proceeding in the lab.

Separating

In some embodiments, after incubation, the hydrolysate is separated from particles by filtering. In one embodiment, the filtering may performed using one or more mesh screens which may optionally be vibrating screens. For example, in one embodiment, the incubated hydrolysate is filtered using a coarse screen. The hydrolysate passing through that screen may then be filtered through a fine screen. The particulate material which is filtered out by the coarse screen may be suitable for use as an animal feedstock and/or as other sources of nutrients. The material which is filtered out by the fine screen may be added to the next batch.

When an in-line grinder comprising a high shear mixer with a disintegrating head is used, the incubating and pasteurization steps produce a liquid hydrolysate after separation that is about 85% to about 95%, or about 90% to about 95% by weight relative to the weight of the input incubating fresh food waste. In some aspects, the separated hydrolysate will be greater than about 85%, 86%, 87%, 88%, 89%, 90%, 91%, or 92% by weight relative to the weight of the input incubating fresh food waste, preferably greater than about 90% by weight relative to the weight of the input incubating fresh food waste.

Testing

In one embodiment of this invention, testing of the fresh food waste conversion may be conducted at various times throughout, and after the process. In some embodiments, testing may be automated.

In some embodiments, pH measurements may be taken during or after the process, in order to monitor the conversion. In addition, the size of particles in the emulsified hydrolysate may be determined, for example, with laser diffraction or any other detection system useful for measuring particle sizes, such as light scattering or imaging.

The carbon content and nitrogen content may also be analyzed. In one embodiment the emulsified hydrolysates are also tested, to assure that the contents are free of pathogens (e.g., *E. coli, salmonella, listeria* or other pathogens), heavy metals and other undesirable materials. In some embodiments, the process of this invention reduces or eliminates pathogens present in the fresh food waste. For example, in some embodiments, the methods of this invention can reduce the amount of *salmonella, E. coli, listeria, colibacillosis, campylobacter*, fecal coliform bacteria, and/or other pathogens present in the fresh food waste by a greater than a log reduction. For example, the process may inactivate and/or reduce any pathogen present by at least $10^8$, $10^7$, $10^6$, $10^5$, $10^4$, $10^3$, $10^2$, or a log reduction, to undetectable levels. Testing of pathogens may be conducted to monitor the hydrolysates of the invention, and the effectiveness of pathogen reduction during conversion.

In addition, testing of nitrate, phosphate, potassium and other trace elements may also be carried out. For example, $NO_3$, $PO_4$, % K % C, % N, % K, % Ca, % Mg, % S, % Na, % Cl, B, Zn, Mn Fe, and/or Cu may be determined.

ration unit, a stabilization unit, and an emulsification unit that serves as a homogenizer. Other components are used in other system embodiments.

In one embodiment, the first grinder 8 may be, for example, the rotary blade/knife grinder of the first grinding step, as described in further detail above. Other grinders are used as first grinder 8 in other embodiments. First grinder 8 receives the fresh food waste 2 and is directly coupled to incubation vessel 16, i.e. the rotary blade first grinder 8 includes an outlet port 10 directly coupled to line 14 which is coupled to an inlet port of incubation vessel 16 and for delivering fresh food waste particulates to incubation vessel 16.

In another embodiment, the second grinder 20 which may be, for example, a low to medium RPM, high torque grinder with shredding action is interposed between first grinder 8 and incubation vessel 16, as described in further detail above. In some embodiments, the second grinder 20 may be, e.g., the rotary blade grinder 8 includes an outlet port coupled, via line 22, to the low RPM, high torque grinder, i.e. second grinder 20 that includes an outlet port coupled to the temperature controlled incubation vessel 16. In some embodiments, second grinder 20 is a low RPM, high torque grinder that operates at an RPM in the range of about 1200-1700 RPM and with a torque of about 5000-7000 foot-lbs. of torque but other RPM values and other torques are used in other embodiments as described in conjunction with the optional second grinding step, above. In some embodiments, the fresh food waste par-

TABLE 8

Representative Analysis

| | % N | % P | % K | % Ca | % Mg | % S | % Na | % Cl | B | Zn | Mn | Fe | Cu | $NO_3$—N | $PO_4$—P | % K |
|---|---|---|---|---|---|---|---|---|---|---|---|---|---|---|---|---|
| GS | 4.06 | 0.29 | 1.32 | 2.87 | 0.64 | 0.82 | 0.19 | 1.03 | 52 | 17 | 73 | 165 | 12 | 2024 | 1255 | 3.93 |
| H2H | 4.72 | 0.39 | 1.70 | 2.40 | 0.53 | 0.66 | 0.08 | 0.88 | 43 | 20 | 52 | 167 | 13 | 3899 | 1640 | 5.40 |

System

In some embodiments, this invention relates to a system for carrying out the conversion of fresh food waste to nutrient rich compositions. Various systems capable of processing more than over 50 tons per day, e.g., more than 90 tons/day, or up to 95 or 100 tons or more per day, are used in various embodiments. The system may comprise a plurality of grinders in various embodiments. In some embodiments, four grinding steps are used as described above and in some embodiments, the optional second grinding step described above, is not used.

FIG. 1 shows a schematic of a system according to some embodiments of the disclosure and the various components and the various processes carried out in the various components are described in further details above, and below.

In some embodiments, fresh food waste 2 is received in special bins, totes or buggies received from a fresh food waste source, such as a supermarket, a food processing plant, a fresh food distributor, green waste from a farm, or other viable sources of fresh food waste. The special bins are designed in conjunction with a waste receiving mechanism of the system. In some embodiments, the waste receiving mechanism includes a lift system 4 and lifts the bin up so that the fresh food waste 2 is delivered into a hopper from which the fresh food waste is delivered to a first grinder 8. In some embodiments, the system includes four or more grinders including a rotary blade grinder, an optional low RPM, high torque grinder, an in-line grinder with shearing action, and a homogenizing grinder. In some embodiments, the system includes an incubation vessel that includes a pasteurizing unit, a sepaticle slurry from first grinder 8 is delivered directly to the temperature controlled incubation vessel 16, while in another embodiment, effluent from the rotary blade first grinder 8 comprising fresh food waste particles and liquid is delivered to second grinder 20 (which may be optionally included), and the resulting fresh food waste particle slurry is delivered to the temperature controlled incubation vessel 16.

In some embodiments, the rotary blade grinder is a rotary knife grinder with a pump head, but other suitable rotary blade grinders are used in other embodiments.

The temperature controlled incubation vessel 16 includes an incubator unit that maintains a desired and constant temperature in some embodiments. In other embodiments, the incubator vessel includes multiple temperature zones and/or can heat the incoming fresh food waste particulates to multiple temperatures in multiple stages while in the incubation vessel 16. The incubation vessel 16 includes one or more inlet ports that receive the fresh food waste particle slurry 26 from one or more of the previously discussed grinders and one or more additional inlet ports for receiving various enzymes 28 that are mixed with the fresh food waste particulates prior to and/or during the incubation process. In some embodiments, included within incubator vessel 16 is blender/mixer 30 which includes various mechanical mixing blades or other mixing devices in various embodiments. In some embodiments, blender/mixer 30 is a ribbon blender or paddle mixer but other suitable blenders and mixers are used for blending or mixing in the enzymes, in other embodiments. Alternatively, the enzymes may be added manually to the incubation vessel. Various mechanical and other mixing devices are used. The incubation vessel 16 includes an agitator (not shown) that agitates the fresh food waste particle slurry 26 prior to or after mixing with enzymes, on a continuous, regular or intermittent basis in various embodiments. In some embodiments, the agitator may be a blender or mixer, such as a ribbon blender or a paddle mixer.

In some embodiments, incubation vessel 16 includes the incubator unit coupled with an in-line grinder with shearing action. This in-line grinder will be the third grinder in embodiments where the optional second grinder is used, as described above. In some embodiments, the third grinder 34 is present as an in-line grinder with shearing action, as described above. Third grinder 34 is fixed in a recirculating pipeline 38 in which the incubating mixture is recirculated, and third grinder 34 with shearing action further reduces the size of the particles or any remaining solids in a liquid solution. In some embodiments, third grinder 34 is an in-line grinder with shearing action that is a mechanical shearing grinder with high speed rotating blades and includes a disintegrating head. The flow rate of fresh food waste may be up to about 350 gallons per minute in various embodiments, but other flow rates are used and produced in other embodiments.

Various sequences of heating steps may take place in the incubation vessel 16 to pasteurize the hydrolysate and further inactivate any pathogens. In some embodiments, the incubator unit within incubation vessel 16 is coupled to or includes a pasteurizing unit that is capable of heating the components to a temperature that may range from 150° F. to about 170° F. in various embodiments, although various other suitable temperatures are used in other embodiments. The pasteurizing unit may be the same or a different unit from the heating unit of the incubation unit.

Incubation vessel 16 is also coupled, directly or indirectly, to a separation unit 42. The separation unit 42 receives the effluent product 44 from the incubation vessel 16 and/or a separate pasteurizing unit (not shown) and separation unit 42 includes a separation member. In some embodiments, the separation member may comprise one or more mesh screens. In some embodiments at least one screen is a vibrating screen. In some embodiments at least one screen is a fine screen, for example, a 200 mesh screen, but other screens and other separation members are used in other embodiments to separate a fluid hydrolysate from particles too large to pass through the mesh or other separation member. The separated particles 48, which are too large to pass through the coarse screen or other separation member may be used as an animal feedstock, or particles small enough for the coarse screen, but too large for the fine screen may be recycled into the next batch.

The fluid hydrolysate 50 separated from particles too large to pass through the coarse screen and fine screen or other separation member, may then be pumped through an ultra-high shear emulsification unit/homogenizer after stabilization in a stabilization vessel.

The separated fluid hydrolysate 50 is stabilized in stabilization/mixing vessel 52 where stabilization takes place via the addition and mixing of the emulsified hydrolysate with an acid source and one or more preservatives received in the stabilization/mixing vessel. Various pH levels are used for stabilization in various embodiments, as described herein. Various inlet ports or other methods for adding the acids and/or preservatives to the emulsified hydrolysate are used in various stabilization unit embodiments. In some embodiments, stabilization/mixing vessel 52 includes a mixing device therein. In some embodiments, the mixer is utilized in the vessel to disperse and mix the stabilization chemicals. In some embodiments, mixing takes place using a mixer that operates at about 250-500 RPM, and in one embodiment, at 350 RPM. The mixer is a propeller-type mixer in some embodiments. Various mixing times are used. Various stabilizing additives and stabilization times may be used, as described above. After stabilization, the stably emulsified hydrolysate may be tested for quality and allotted into containers. Sample port 56 enables a sample to be withdrawn.

The stabilized product 60 is delivered to emulsification unit/homogenizer 62 which is described in conjunction with the fourth grinding step (when the optional second grinding step is used), as above. In some embodiments, emulsification unit/homogenizer 62 is an ultra-high shear emulsification unit/homogenizer that is a homogenizing grinder that emulsifies the hydrolysate, as described in further detail above. In some embodiments, the ultra-high shear mixer is rotated at high rpm, against a fixed screen, further disintegrating and homogenizing any solid particulate matter remaining. In some embodiments, the ultra-high shear mixer is a multi-stage mechanical shearing apparatus with low tolerance intermeshing teeth. Various high shear grinders such as but not limited to a grinder with a 2-4" rotor and tip speeds in excess of about 10,000 to about 20,000 feet per minute (fpm), for example, 1800 fpm or more, are used in some embodiments, but other suitable mixers, emulsifiers or grinders are used in other embodiments.

The emulsified product 64 is then delivered to hydrolysate storage tanks 66.

In some aspects, the system can be logic controlled and/or automated on site or remotely. Various computers and other computer processors can be used. In some embodiments, the system is programmed by a computer or other processor carrying out instructions stored in a tangible, non-transitory computer readable storage medium. Various programming local and remote methods may be used. Testing methods for monitoring the course of the processing and/or for performing testing for quality control purposes or to characterize the hydrolysates and separated particles may also be controlled and/or automated.

In some embodiments, individual batches of the hydrolysates may be blended, to assure that the product is consistent, from one purchase to the next.

In some embodiments, the nutrient rich emulsions produced in two or more batches are mixed to reduce batch to batch variability in the composition of the fresh food input. This permits production of a homogeneous product from a heterogeneous supply.

In some embodiments, the emulsion yield is at least 90% of the fresh food input. The emulsified product has a high nutrient content. The nutrient rich hydrolysates contain sugars, fatty acids, amino acids or peptides, and minerals that provide a balanced mix of nutrients suitable for promoting the growth of soil organisms to provide plant nutrients. In addition, when used as a fertilizer and soil amendment, the liquid hydrolysate provides nutrients for soil organisms and microbes which in turn provide nutrients to plants.

The remaining solid particles obtained during the separating step of the process can be used as feedstock or as a supplemental source of nutrients for omnivorous mammals, such as pigs, chickens or pets. For example, the solid particles obtained during the separating step using the coarse screen may be used as pig feed.

Stabilization

In one embodiment, the process includes a stabilization step following incubation of the fresh food waste with the enzyme mixture. The pH of the un-stabilized hydrolysate ranges from 4.0 to 7.0, depending on the fresh food waste used to produce that batch. In some instances, the pH of the hydrolysate prior to the stabilization step may serve as a measure of quality control. The hydrolysates of this invention may be stabilized, for example, by adding acid, for example to adjust the pH to about 2.5 to about 3.5 to minimize further decomposition of the nutrients obtained by enzymatic digestion, so that the nutrients in the hydrolysate are still intact when the hydrolysate is applied to the soil. Without stabilization microbes and pathogens could contaminate and degrade a liquid hydrolysate even after pasteurization.

In some embodiments, phosphoric acid, carbonic acid, or lactic acid may be added to titrate the pH of the hydrolysate to inhibit microbial and/or pathogenic activity during the storage and transport of the hydrolysate which protects the nutrients from further digestion and/or degradation by microbes or pathogens. In some aspects, the stabilizing step of the processes of this invention comprises the addition and mixing of the liquid hydrolysate with an acid source consisting of hydrochloric, sulfuric, carbonic, phosphoric, acetic, stearic, propionic, tartaric, maleic, benzoic, succinic acids, lactic, or citric acid. In one embodiment, the acid may be phosphoric acid. The phosphoric acid may be in the form of tri-calcium phosphate, for example, or any other suitable salt form. In embodiments where a certified organic hydrolysate is desired, the acid added during the stabilization step will be selected from lactic or citric acid, or any other acid certified for use with organic products.

In some aspects, the pH of the stabilized liquid hydrolysate is less than about 4.0. In some aspects, the pH of the stabilized liquid hydrolysate is from about pH 2.6, 2.7, 2.8, 2.9, 3.0, 3.1 or about 3.5, or any range between any two of the recited pH values. Preferably the pH of the stabilized liquid hydrolysate is about pH 2.5 or about pH 3.0. In one aspect, although the pasteurization step inactivates any bacteria or other pathogens present in the fresh food waste or the processing plant, the stabilization prevents growth of pathogens from environmental sources after the pasteurization step.

A preservative may also optionally be added. In some embodiments the preservative may be potassium sorbate, tocopherol, natamycin, or D-alpha tocopherol acetate. In some embodiments, potassium sorbate may be used. In some embodiments where a certified organic hydrolysate is desired, the preservative may be, for example, tocopherol, natamycin, D-alpha tocopherol acetate or any other preservative certified for use with organic products.

Increase in Soil Organic Matter

In one embodiment, when the nutrient rich organic compositions of this invention are used as fertilizer and soil amendment, they increase soil organic matter, by up to at least 150%, depending on the initial level of soil organic matter. In one embodiments, the compositions of this invention more than double soil organic matter by up to about 140% or 150% or more. In one aspect, the compositions of this invention may increase soil organic matter by up to 40%, 50%, 60%, 70%, 80%, 90%, 100%, 110%, 120%, 130%, 140%, 150% or more, depending on the initial level of soil organic matter.

The nutrient rich fertilizer and soil amendment of this invention can therefore increase soil organic matter far in excess of the amount of organic matter contained in the applied fertilizer. In some embodiments, the nutrient rich emulsified hydrolysates of this invention increase soil organic matter by about 40% to about 150% or more.

In one embodiment, the fertilizer and soil amendment of this invention obtained from fresh food waste also have beneficially reduced levels of sodium compared to traditional fertilizers or fertilizers obtained with non-fresh food waste, and may also help to reduce levels of sodium in the soil. The reduced levels of sodium compared to other fertilizers so helps to promote more vigorous plant growth.

DEFINITIONS

The use of fresh food waste as the starting material provides as high a content of nutrients as possible from the waste by minimizing decomposition. In one embodiment, the processes of the invention involves the use of fresh food waste, collected, stored, transported and processed in a way that minimizes degradation, decomposition, and/or breakdown of carbon compounds or release of nutrients.

In one embodiment, the fresh food waste may be provided from fresh food waste holding facilities, e.g. facilities for holding, storage or treatment of fresh food waste, including supermarket facilities for storing outdated food, or at central facilities where fresh food waste is collected from a plurality of supermarkets. For example, pre-weighed containers may be filled with fresh food waste such that the weight of the fresh food waste contents is known and tracked (e.g., by a barcode, RFID and/or computer tracking system). Fresh food waste may also be collected from food processing facilities, fresh food distributors, green waste from farms, or other viable sources of fresh food waste.

The containers may be cleaned and sterilized prior to being used to collect the fresh food waste to avoid contamination with bacteria and prevent putrefaction. In another embodiment, the containers may be insulated to help maintain appropriate temperatures for freshness. In addition, the containers may hold relatively small volumes of fresh food waste (e.g., 1,000 pounds or less), and/or have sealable lids to help ensure freshness.

In still other embodiments, the containers may be collected frequently (e.g., three or more days per week) and transported to a processing facility, optionally, using refrigerated conditions during transport (e.g., refrigerated trucks). Trash components (e.g., paper, plastic, cardboard, glass, newspaper, "rubbish", and aluminum and steel mays) may be separated from the food waste at the supermarket or other source facility or central location. The fresh food waste may optionally be separated into separate categories of waste, e.g., vegetable waste versus animal meat waste, or into bakery, deli, seafood, produce, and packaged goods.

Produce can be defined as agricultural products and especially fresh fruits and vegetables as distinguished from grain and other staple crops. However, it has been determined that batch to batch variation in fresh food waste can be accounted for, by combining the nutrient rich compositions produced in two or more batches, in order to obtain a uniform and reproducible product.

As used herein, the term "coarse screen" refers to a screen to separate pasteurized solids, which can be used to produce animal feed, from the liquid pasteurized hydrolysate, and can include a variety of screening techniques. In some embodiments, the course screen may be a mesh screen having, for example, about 18-60 mesh, for example 18 mesh screen with 1000 micron openings, 20 mesh screen with 841 micron openings, 25 mesh screen with 707 micron openings, 30 mesh screen with 590-595 micron openings, 35 mesh screen with 500 micron openings, 40 mesh screen with 400 micron openings, 45 mesh screen with 354 micron openings, 50 mesh screen with 297 micron openings, or 60 mesh screen with 250 micron openings, or other commercially available coarse screening technologies.

As used herein, the term "fine screen" refers to a screen i) to increase particle surface area, thereby increasing the effectiveness of the enzymes used to produce the hydrolysate; ii) to assure the ability of the pasteurized hydrolysate to pass easily through the farmer's drip lines, or other similar equipment; and iii) so that the pasteurized hydrolysate is readily available for metabolism by soil organisms, once it is delivered to the root zone. In some embodiments, the 30 mesh screen is a vibrating screen. This separates the hydrolysate from particles too large to pass through the mesh, for example, particles having an average diameter larger than 590 µm. The hydrolysate passing through the first screen may then be further separated by filtering through a 200 mesh screen with an opening size of 74 µm. In some aspects, the incubated fresh food particles removed from the hydrolysate by screening through the 200 mesh screen have a diameter of greater than 74 µm. In some aspects the screen may be a vibrating screen. In some embodiments the fine screen can be a mesh screen having 35 to 400 mesh may be used in the second screening step, for example, 35 mesh screen with 500 micron openings, 40 mesh screen with 400 micron openings, 45 mesh screen with 354 micron openings, 50 mesh screen with 297 micron openings, or 60 mesh screen with 250 micron openings, 70 mesh screen with 210 micron openings, 80 mesh screen with 177 micron openings, 100 mesh screen with 149 micron openings, 120 mesh screen with 125 micron openings, 140 mesh screen with 105 micron openings, 170 mesh screen with 88 micron openings, 200 mesh screen with 74 micron openings, 230 mesh screen with 63 micron openings, 270 mesh screen with 53 micron openings, 325 mesh screen with 44 micron openings or 400 mesh screen with 37 micron openings, or other commercially available fine screening technologies. The solid particles separated by the fine screen, having a diameter between about 74 µm and about 590 µm, may be recycled as a feedstock to be digested in the next batch.

As used herein, the term "grower's standard" refers to a nitrate fertilizer and other fertilizing regime with nutrient requirements standardized for a given crop, in current use by the grower.

As used herein, the term "hydrolysate" refers to a product of the digestion of fresh food waste with enzymes. The liquid may contain small particles and/or oil droplets depending on the grinders used and the mesh screen used to separate larger particles from the hydrolysate, as described herein.

As used herein, the term "nutrient rich composition" refers to the composition comprising nutritional components released from the fresh organic waste by digesting proteins, carbohydrates (such as sugars, starches and/or cellulosic materials), and fats and oils in fresh food waste to produce a composition which contains, for example, amino acids, simple sugars, fatty acids and minerals, where the composition produced by the process comprises at least about 90% by weight relative to the weight of the starting material fresh food waste. In some embodiments, the composition may comprise at least about 90%, 91%, 92%, 93%, 94%, or about 95% or greater fresh food waste.

By "particulate fresh food waste" is meant the mixture that is formed after the first grinding step, which may be a mixture of particles and liquid.

An "enzyme combination" is two or more enzymes added to particulate fresh food waste and/or the incubating mixture. The enzymes in an enzyme combination may be mixed together before addition to the particulate fresh food waste and/or the incubating mixture, or they may be added separately to the particulate fresh food waste and/or the incubating mixture.

Example 1

Increasing Yield of Produce

Figure 2:
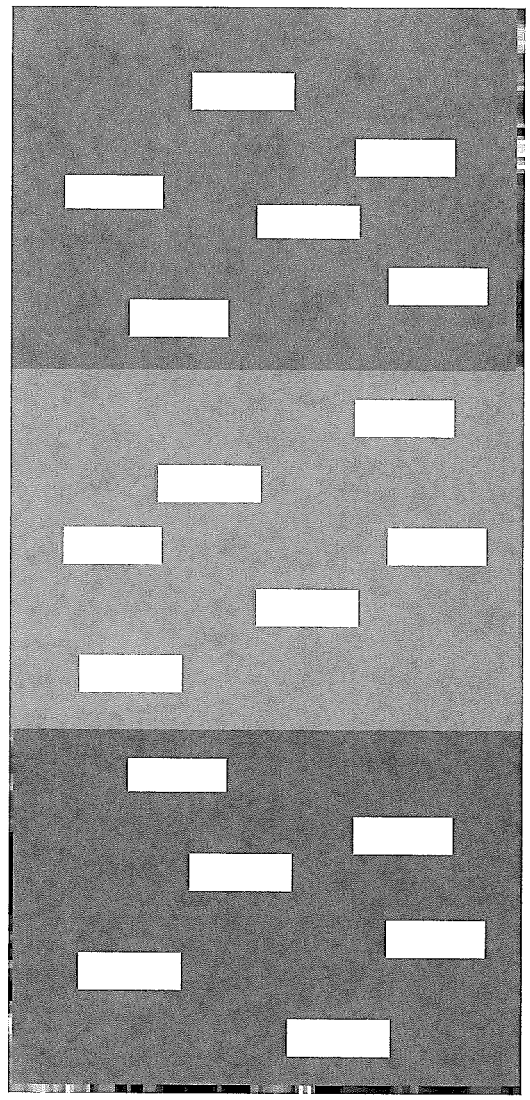
FIG. 2 shows the arrangement of test plots used in a strawberry field trial, comparing the yield of marketable fruit and culled fruit obtained after treating strawberry plants with growers standard (nitrate) fertilizer (GS), an emulsified hydrolysate of this invention (H2H), and 50:50: mix of the H2H and GS (H2H:GS). Eighteen plots totaling 1.2 acres, within three strawberry fields were designated for one of the three treatments (6 replications per treatment), as shown in FIG. 2. This trial was conducted by an agronomic expert, Dr. Surendra Dara, the strawberry expert at the University of California Cooperative Extension office for Santa Barbara and San Luis Obispo counties.

As an exemplary example of the increase produce yield increase obtained by application of the compositions of this invention, the effect of treating strawberry plants with (1) grower's standard fertilizer (a nitrate fertilizer and other commonly used fertilizers) was compared to treatment with (2) an emulsified hydrolysate of this invention (H2H) at 73 gallons per acre (gpa); and (3) a 50:50 blend of H2H and growers standard fertilizer, together with foliar application of calcium. 18 plots totaling 1.2 acres, within three strawberry fields were designated for one of the three treatments (6 replications per treatment), as shown in FIG. 2. Stock solution of the emulsified hydrolysate is diluted 10:1 before application to crop.

Treatments were applied by drip line irrigation on March 28, April 9, and April 18. Strawberries were harvested on April 4, 8, 11, 15, 18, 22, 25, and 29. The yield response for culled fruit is shown in FIG. 3.

Figure 3:
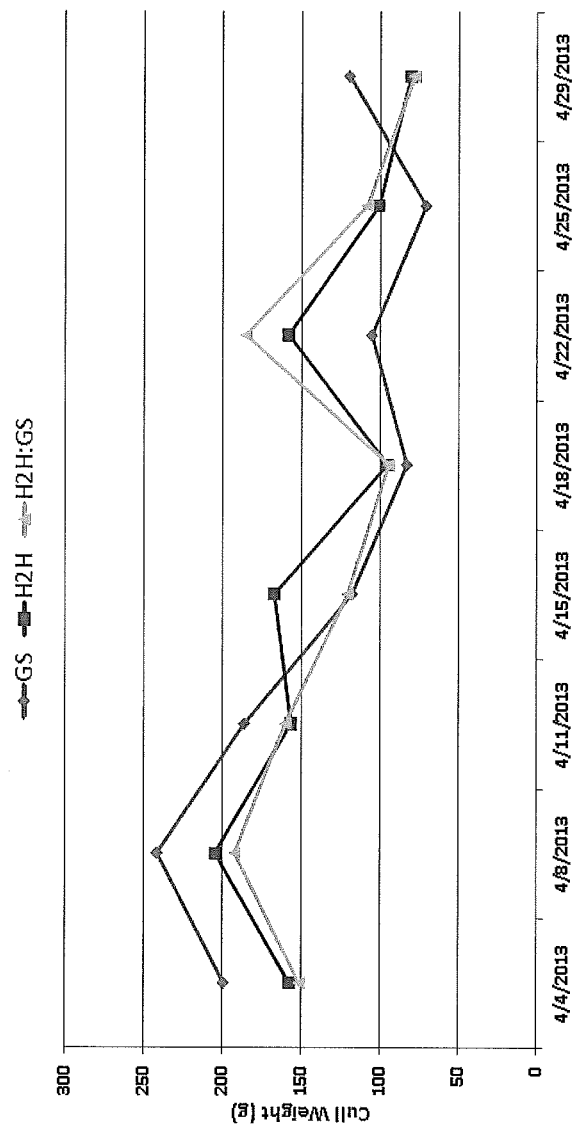
FIG. 3 shows a graph of the yield response (cull weight vs. time) for unmarketable (culled) strawberries obtained in the strawberry trial.

FIG. 3 shows a graph of the yield response (cull weight vs. time) for unmarketable (culled) strawberries obtained in the strawberry trial.

Figure 4:
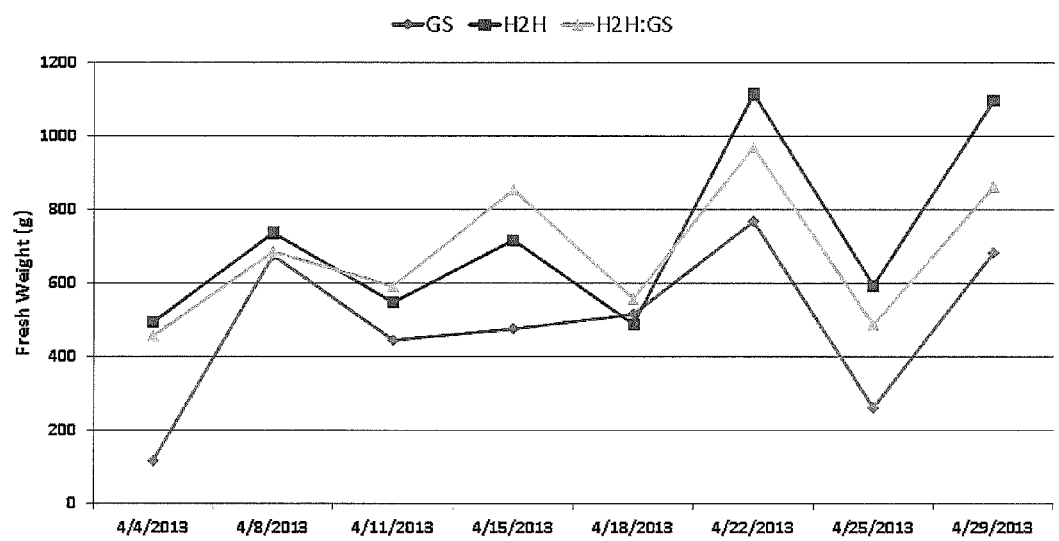
FIG. 4 shows a graph of the yield response (fresh weight vs. time) of marketable strawberries obtained in the strawberry trial.

FIG. 4 shows a graph of the yield response (fresh weight vs. time) the yield response of marketable strawberries obtained in the strawberry trial.

Figure 5:
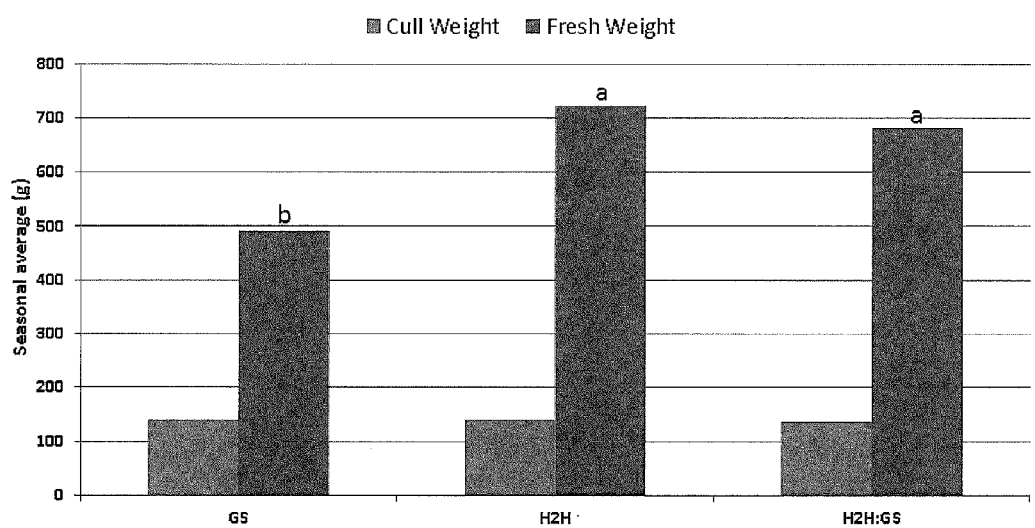
FIG. 5 shows a bar graph of the cull weight (smaller bars on the left of each set of two bars) and fresh weight (bars on the right) of strawberries obtained over one growing season, for each of the three treatments.

FIG. 5 shows a bar graph of the cull weight and fresh weight of strawberries obtained over one growing season, for each of the three treatments.

As can be seen in FIGS. 3-4, and in Table 1, below, treatment with either the emulsified hydrolysates of this invention or a 50:50 mix of the emulsified hydrolysates of this invention with GS significantly increases the yield of strawberries, while not increasing the amount of culled fruit. FIG. 4 further shows, that the increase in yield is especially striking at the end of the growing season, when the price of strawberries is higher.

TABLE 1

|  | Cull ratio to GS treatment | Fresh Ratio to GS treatment |
| --- | --- | --- |
| GS |  |  |
| H2H | 1.04 | 1.40 |
| H2H:GS | 1.01 | 1.32 |

This demonstrates that application of either H2H or H2H:GS significantly increases yield while reducing the amount of nitrate fertilizers applied. The increased yield results in a significant economic benefit to farmers.

Example 2

Increasing Yield of Produce and Effect on Plant and Root Growth

A nursery trial of strawberries grown in the fall was conducted to study the effect of treatment with Growers Standard (GS) compared to treatment with H2H and a 50:50 mix of H2H:GS on yield, and plant and root growth. Portola strawberry plants were transplanted from winter storage to 8" pots on Jul. 15, 2013. The plants were treated at planting (Aug. 13, 2013) and every two to three weeks starting on Aug. 12, 2013. The plants were also treated on Aug. 12, Aug. 26, Sep. 12, Sep. 30 and Oct. 14, 2013.

Destructive sampling of three to four plants for each treatment was completed on Sep. 7, 2013 to look at root development and to measure mass increase. The weights obtained are shown in Table 2.

TABLE 2

| Treatment | Whole Plant Weight (grams) | Root Weight (grams) | Shoot Weight (grams) |
|---|---|---|---|
| Growers Standard | 81 g | 29 g | 52 g |
| H2H Full Rate | 78 g | 35 g | 43 g |
| H2H:GS 50:50 | 101 g | 47 g | 54 g |

Figure 6:
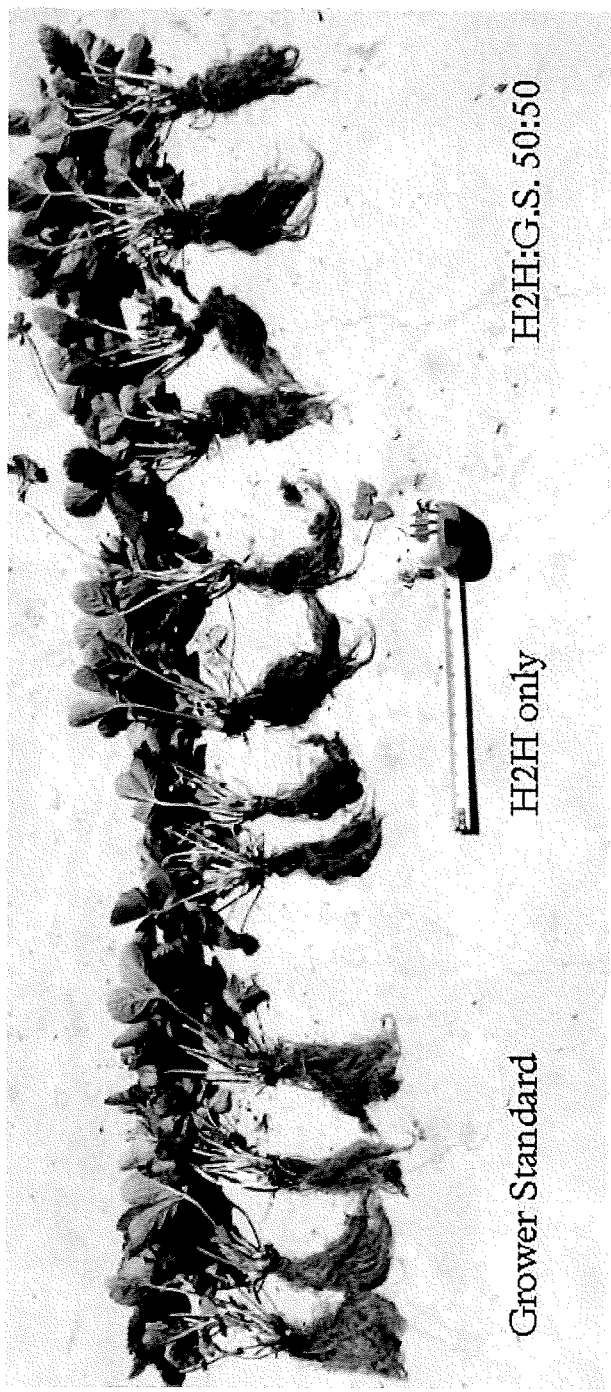
FIG. 6 shows a photo of nursery strawberry plants sampled approximately 7 weeks after planting, treated with GS, H2H, and 50:50: mix of the H2H and GS (H2H:GS). This trial was conducted by an agronomic expert, David Holden, a private agronomic researcher in Oxnard, Calif. Mr. Holden's trials replicated and expand on Dr. Dara's study, and confirmed Dr. Dara's highly favorable results.
Figure 7:
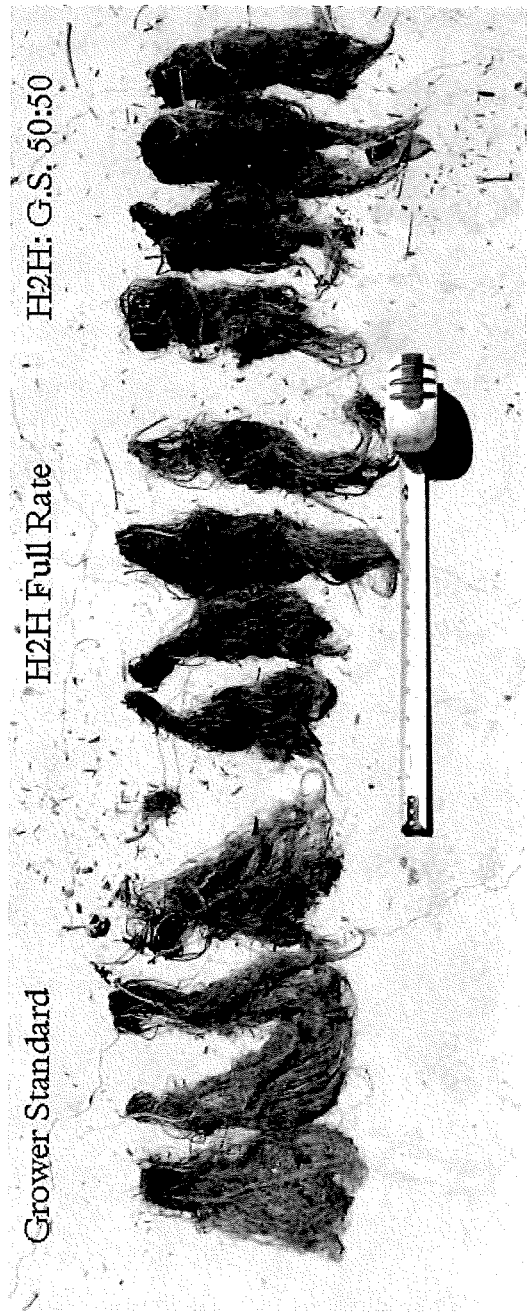
FIG. 7 shows a photo of strawberry plant roots sampled approximately 7 weeks after planting, treated with GS, H2H, and H2H:GS, from left to right.

This indicates that treatment with H2H or H2H:GS appeared to increase root and whole plant growth, with H2H: GS giving the best results for whole plant and root growth. This is further illustrated by the photos of the sampled plants and roots. FIG. 6 shows a photo of whole strawberry plants sampled approximately 7 weeks after planting, treated with GS, H2H, and H2H:GS, from left to right. The plants treated with H2H:GS (and H2H) look larger than the plants treated with GS, as reflected by the difference in weights. FIG. 7 shows a photo of strawberry plant roots sampled approximately 7 weeks after planting, treated with GS, H2H, and H2H:GS, from left to right. The roots of plants treated with emulsified hydrolysates of this invention or a 50:50 (v/v) mix of the emulsified hydrolysates of this invention with GS look darker (more dense and vigorous) than the roots of plants treated with GS.

Figure 8:
FIG. 8 shows a photo of strawberry plant roots sampled approximately 7 weeks after planting, comparing the roots of plants treated with GS and H2H, from left to right.
Figure 9:
FIG. 9 shows a photo of strawberry plant roots sampled approximately 7 weeks after planting, comparing the roots of plants treated with GS and H2H:GS, from left to right.

FIG. 8 shows a close-up photo of strawberry plant roots sampled approximately 7 weeks after planting, comparing the roots of plants treated with GS and H2H, from left to right. FIG. 9 shows a close-up photo of strawberry plant roots sampled approximately 7 weeks after planting, comparing the roots of plants treated with GS and H2H:GS, from left to right.

Six replicates of 4 plants each were harvested twice a week, for eleven weeks (21 pick days), and the results are shown in FIGS. 10-15.

Figure 10:
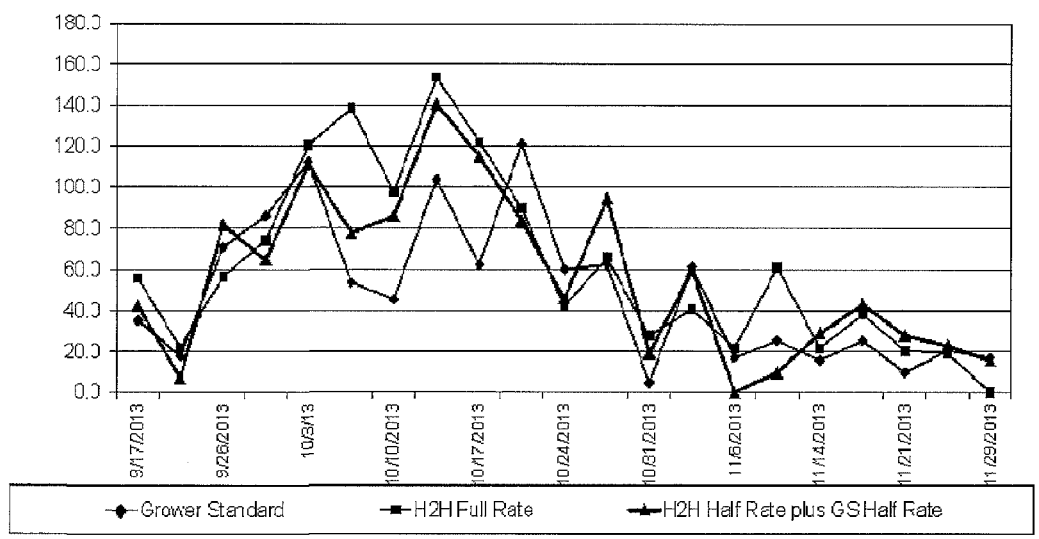
FIG. 10 shows a graph of number of trays of nursery strawberries obtained per acre vs. time, in the nursery trial of the effect of treatment with Growers Standard (GS) compared to treatment with H2H and a 50:50 mix of H2H:GS.
Figure 11:
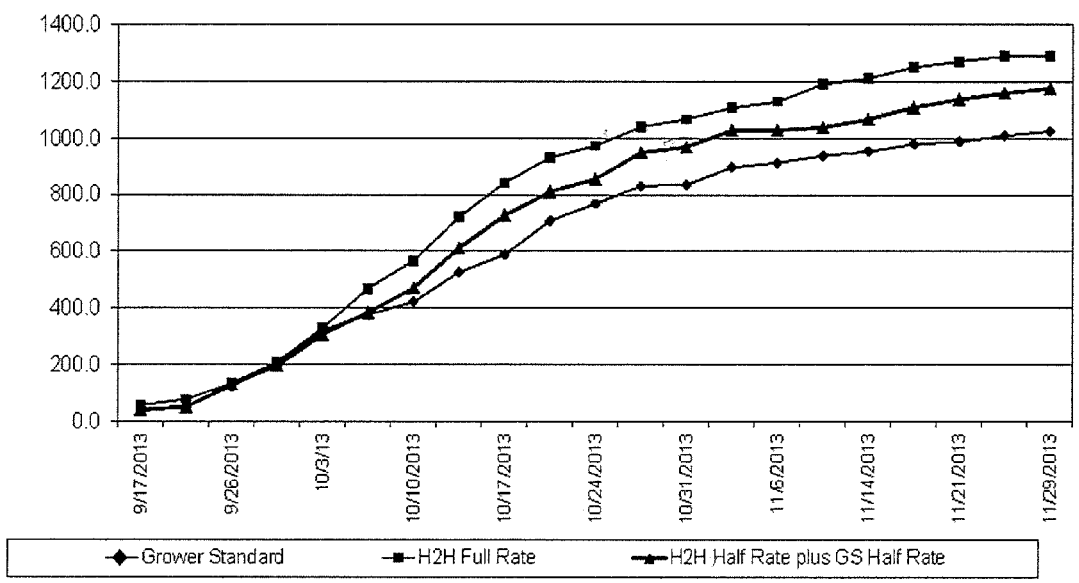
FIG. 11 shows a graph of the cumulative production of trays of nursery strawberries obtained per acre vs. time, in the nursery trial of the effect of treatment with Growers Standard (GS) compared to treatment with H2H and a 50:50 mix of H2H:GS.

FIG. 10 shows a graph of number of trays of nursery strawberries obtained per acre vs. time, in the nursery trial of the effect of treatment with Growers Standard (GS) compared to treatment with H2H and a 50:50 mix of H2H:GS. FIG. 11 shows a graph of the cumulative production of trays of nursery strawberries obtained per acre vs. time, in the nursery trial of the effect of treatment with Growers Standard (GS) compared to treatment with H2H and a 50:50 mix of H2H:GS. This further illustrates that treatment of strawberry plants with emulsified hydrolysates of this invention or a 50:50 mix of the emulsified hydrolysates of this invention with GS resulted in higher cumulative production of strawberries.

Figure 12:
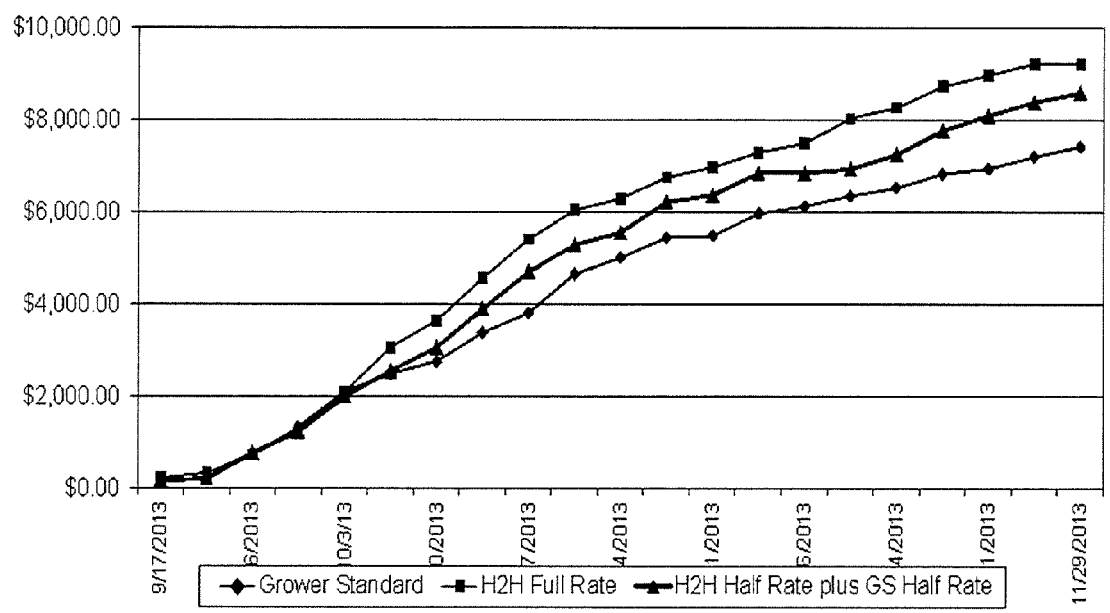
FIG. 12 shows a graph of the calculated cumulative net return (dollars per acre vs. time) for the nursery trial of the effect of treatment with Growers Standard (GS) compared to treatment with H2H and a 50:50 mix of H2H:GS.
Figure 13:
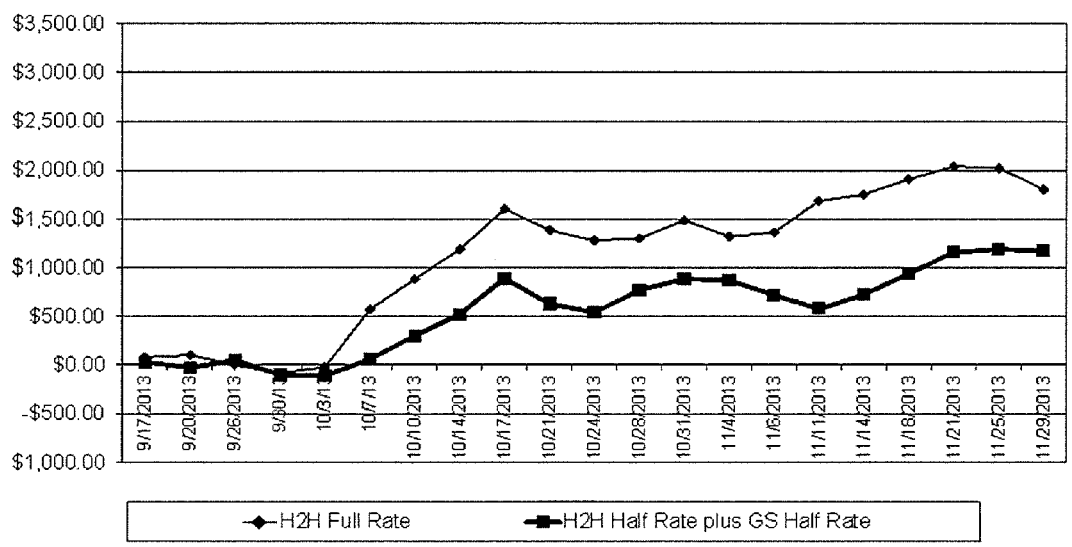
FIG. 13 shows a graph of the calculated cumulative net increase in returns that a grower would realize over time by using H2H or H2H:GS compared to Growers Standard (GS) (dollars per acre).

FIG. 12 shows a graph of the calculated cumulative net return (dollars per acre vs. time) for the nursery trial of the effect of treatment with Growers Standard (GS) compared to treatment with H2H and a 50:50 mix of H2H:GS. This shows that farmers would realize economic benefits by replacing some or all of environmentally hazardous nitrate fertilizers (GS) with the emulsified hydrolysates of this invention. FIG. 13 shows a graph of the calculated cumulative net increase in returns that a grower would realize over time by using H2H or H2H:GS compared to GS (dollars per acre).

Example 3

Increasing Yield of Produce

A field trial of proprietary strawberries grown in the fall was conducted to study the effect on yield of treatment with Growers Standard (GS) compared to treatment with proprietary strawberry plants that were transplanted from winter storage on Jul. 17, 2013. The plants were treated with Growers Standard practices with the exception that part of the field received five applications of 10 gallons per acre of H2H per application. The plants were also treated on Aug. 28, Sep. 18, Oct. 2, Oct. 16 and Oct. 30, 2013.

Figure 14:
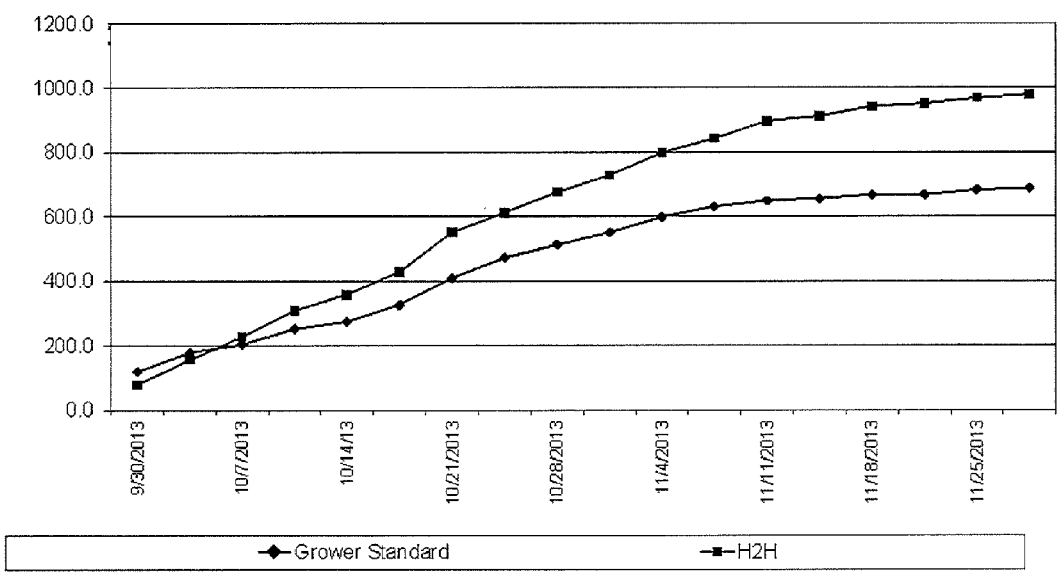
FIG. 14 shows a graph of cumulative production (number of trays of strawberries obtained per acre vs. time), in a field trial of the effect of treatment with Growers Standard (GS) compared to treatment with H2H on proprietary strawberries grown in the fall.

Six replicates of 4 plants each were harvested twice a week, for nine weeks (18 pick days). FIG. 14 shows a graph of the cumulative production (number of trays of strawberries obtained per acre vs. time), in a field trial of the effect of treatment with Growers Standard (GS) compared to treatment with H2H on proprietary strawberries grown in the fall. This illustrates that the cumulative net production obtained with treatment of an emulsified hydrolysate of this invention in the absence of applying nitrate fertilizers increases cumulative production of produce (yield).

Figure 15:
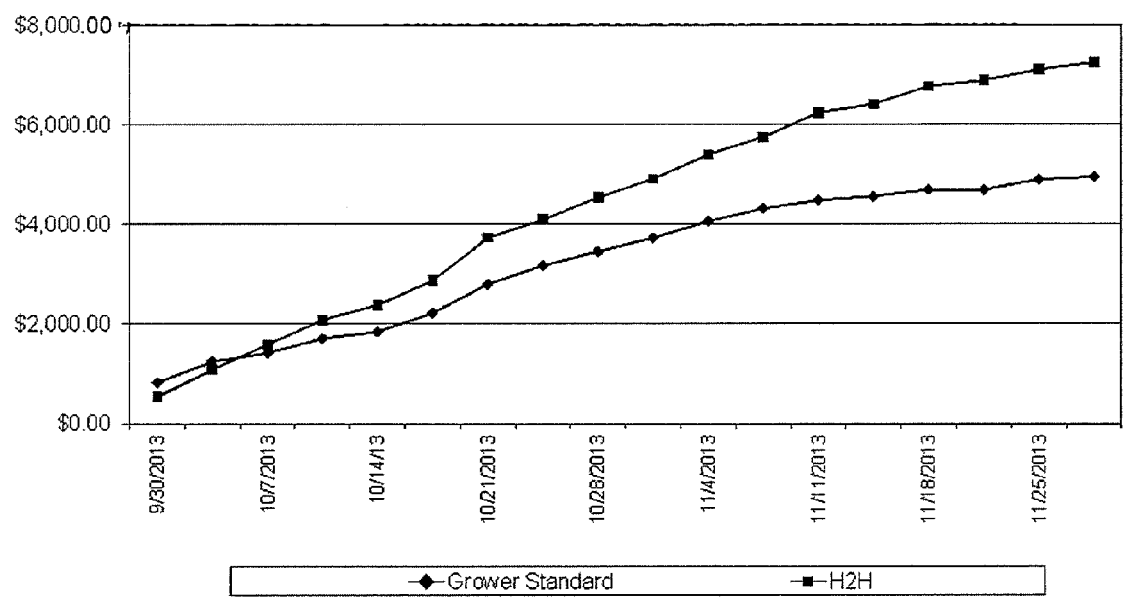
FIG. 15 shows a graph of the calculated cumulative net return for a grower (dollars per acre vs. time) for the nursery trial of the effect of treatment with Growers Standard (GS) compared to treatment with H2H.
Figure 16:
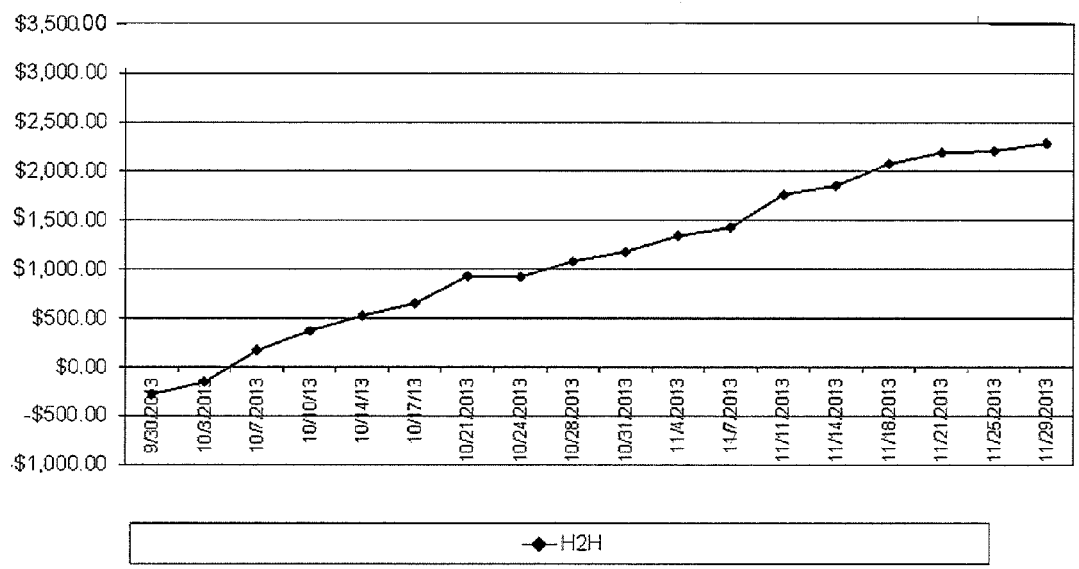
FIG. 16 shows a graph of the calculated cumulative net increase in returns to the grower using H2H compared to use of Grower Standard (GS) based on the returns shown in FIG. 15.

FIG. 15 shows a graph of the calculated cumulative net return for a grower (dollars per acre vs. time) for the nursery trial of the effect of treatment with Growers Standard (GS) compared to treatment with H2H. This further demonstrates that farmers would realize economic benefits by replacing environmentally hazardous nitrate fertilizers (GS) with the emulsified hydrolysates of this invention. FIG. 16 shows a graph of the calculated cumulative net increase in returns to the grower using H2H compared to use of Growers Standard based on the returns shown in FIG. 15.

FIG. 16 shows a graph of the calculated cumulative net increase in returns to the grower using H2H compared to use of Growers Standard based on the returns shown in FIG. 15.

Example 4

Increasing Size and Yield of Produce

A field trial was conducted to study the effect of application of the compositions of this invention, on the growth and yield of vegetables. Collard green plants were treated with (1) control; (2) Growers Standard fertilizer (a nitrate fertilizer) (3) an emulsified hydrolysate of this invention (H2H—100%); and (4) a 50:50 blend of H2H and Growers Standard fertilizer (H2H:GS). The yield data is shown in Table 3:

TABLE 3

| Treatment | Fresh Weight (lbs) Total 3 Replicates | Fresh Weight (Kgs) Total 3 Replicates | Dry Weight (lbs) Total 3 Replicates |
|---|---|---|---|
| Control | 5.28 | 2.40 | 0.50 |
| GS | 9.90 | 4.50 | 1.00 |
| H2H | 7.04 | 3.20 | 1.00 |
| H2H:GS | 11.0 | 5.00 | 2.00 |

Figure 17:
FIG. 17 shows a photograph of collard green plants treated with H2H:GS (bottom row) compared to plants treated with GS (top row). This illustrates that plants treated with H2H:GS are larger than plants treated with GS alone. This study was conducted by an agronomic expert, Dr. Miguel Duarte, the proprietor of Duarte & Associates, Inc. of Fresno, Calif.

This demonstrates that higher yields are obtained by treatment of vegetables with a 50:50 mixture of H2H and GS. In addition, in FIG. 17, the photograph of plants treated with H2H:GS (bottom row) compared to plants treated with GS alone (top row) illustrates that plants treated with a 50:50 mixture of the emulsified hydrolysate of this invention+ Growers Standard (H2H:GS) grow larger than plants treated with GS alone.

Similar increases in yield of 13 to 15% percent over treatment with GS have been observed for other vegetables and for avocados.

Example 5

Increasing Size and Yield of Produce

Another field trial was conducted to study the effect of application of the compositions of this invention, on the growth and yield of vegetables. Cabbage plants were treated with (1) control; (2) Growers Standard fertilizer (a nitrate fertilizer) (3) an emulsified hydrolysate of this invention (H2H—100%); and (4) a 50:50 blend of H2H and Growers Standard fertilizer (H2H:GS). The results are shown in Table 4.

TABLE 4

| | Field 1 | | Field 2 | |
| --- | --- | --- | --- | --- |
| Treatment | Total Weight (lbs) 3 replicates | Total Weight (lbs) (Average/plant) | Total Weight (lbs) 3 replicates | Total Weight (lbs) (Average/plant) |
| H2H:GS (50:50) | 23.1 | 7.7 | 13.1 | 4.7 |
| H2H | 13.0 | 4.3 | 6.6 | 2.2 |
| GS | 13.1 | 4.4 | 7.8 | 2.6 |
| Control | 9.2 | 3.0 | 6.3 | 2.1 |

Figure 18:
FIG. 18 shows a photograph of a cabbage head from a plant treated with an the emulsified hydrolysate of this invention+ growers standard (H2H:GS) (on the right) compared to a cabbage head from a plant treated with Growers Standard (GS) (on the left). The cabbage head from the plant treated with H2H:GS is double the size of the cabbage head from the plant treated with GS and of at least comparable quality. This study was conducted by an agronomic expert, Dr. Miguel Duarte, the proprietor of Duarte & Associates, Inc. of Fresno, Calif.

These results demonstrate that treatment of cabbage plants with a 50:50 mixture of an emulsified hydrolysate of this invention+Growers Standard (H2H:GS) increases the yield. FIG. 18, a photograph of a cabbage head from a plant treated with an the emulsified hydrolysate of this invention+Growers Standard (H2H:GS) (on the right) compared to a cabbage head from a plant treated with GS only (on the left) shows that the cabbage head from the plant treated with HSH:GS is double the size of the cabbage head from the GS treated plant, while maintaining the same quality.

Example 6

Increasing % Soil Organic Matter

The effect of treatment with an emulsified hydrolysate of this invention was determined following treatment in a tree crop orchard. Sixteen blocks in an almond orchard totaling 1,230 acres were treated with an emulsified hydrolysate of this invention (H2H), at 50 gallon per acre for the season. This study was conducted by an agronomic expert, Dr. Miguel Duarte, the proprietor of Duarte & Associates, Inc. of Fresno, Calif. The % soil organic matter was measured before and after treatment. The results are shown in Table 5.

TABLE 5

| Treated Acres | After H2H Treatment 2014 % Soil Organic Matter | Before H2H Treatment 2013 % Soil Organic Matter |
| --- | --- | --- |
| 80 | | 0.66 |
| 80 | 1.75 | 0.80 |
| 75 | 1.85 | 0.92 |
| 75 | 1.73 | 0.92 |
| 80 | 1.76 | 0.95 |
| 80 | 1.79 | 0.95 |
| 75 | 1.70 | 0.86 |
| 75 | 1.74 | 0.93 |
| 75 | 2.51 | 1.00 |
| 75 | 1.72 | 0.37 |
| 75 | 1.90 | 0.78 |
| 75 | 1.98 | 0.75 |
| 80 | 2.72 | 0.80 |
| 80 | 2.10 | 0.97 |
| 75 | 2.12 | 0.59 |
| 75 | 1.90 | 0.78 |
| Total Acres: 1,230 | Average: 1.956 | Average: 0.814 |

The average % soil organic matter increased from 0.814% to 1.956%, a statistically significant increase. The t-test value was $1.237 \times 10^{-14}$, with a confidence interval of 99.999999999999%. This demonstrated that use of the compositions of this invention as fertilizers results in a surprisingly high 140% increase in the % soil organic matter following treatment of the soil. This demonstrated that the compositions of this invention increase soil organic matter beyond the amount attributable to the organic content of the composition that was applied to the soil.

The ability to increase soil organic matter in turf was also determined. In that study, treatment with H2H resulted in a 40% increase in soil organic matter.

In addition, a control almond tree had a trunk cross section area of 3.3 square inches, and a height of 83.1" while an almond tree treated with H2H had a trunk cross section area of 11.3 square inches and a height of 118.1."

Example 7

Treatment with H2H Permits Reduced Water Use

The effect of reduced watering on crop trees grown using H2H as the sole nutrient was determined. An almond orchard was treated with H2H as the sole nutrient input using ¾ of the Grower Standard available water following water restrictions.

H2H was added at a rate of 8 gallons/acre to trees transplanted 1 year before. The trees were watered with approximately 13.5 inch/acre compared to the standard amount of water of 18 inch/acre. The grower chose H2H as a sole nutrient source because H2H does not require additional water input to prevent damage to trees caused by use of chemical fertilizers when insufficient dilution water is available. The change in the tree diameter was measured from June to August for H2H treated trees, and for control trees. The grower yields on mature acres grown with GS and reduced water had decreased 40% compared to the prior year due to decreased water availability.

| Average Size, August | 2.214 | 240% |
| --- | --- | --- |
| Average Size, June | 0.923 | |
| Growth, June to August | 1.291 | |
| Control | | % Change vs. Treated |
| Average Size, August | 1.880 | 85% |
| Average Size, June | 0.716 | 78% |
| Growth, June to August | 1.165 | 90% |

This demonstrated that application of H2H stimulated growth of crop trees.

Example 8

Increasing Yield and Sugar Content of Produce

As another example of the increase in produce yield increase obtained by application of the compositions of this invention, the effect of treating tomato plants with (1) growers standard fertilizer (a nitrate fertilizer) was compared to treatment with (2) an emulsified hydrolysate of this invention (H2H) at 73 gallons per acre (gpa); and (3) a 50:50 blend of H2H and growers standard fertilizer. The effect of the treatments on the sugar content of tomatoes was also determined.

The tomato plants received five applications of fertilizer over the course of the season. The treatments were applied during planting and by direct injection into a ⅝" drip line at 10 PSI. Two rows of plants in a 35 acre field were treated with H2H, two rows were treated with H2H:GS, and one row was treated with GS. Growers Standard was UN32, also known as UAN 32.0.0 (32% N), which consists of 45% ammonium nitrate, 35% urea and 20% water. The application rates and timing are shown in Table 6.

TABLE 6

| Date | Grower Standard | H2H | ½ H2H + ½ Grower Standard |
|---|---|---|---|
| 3/15 (at planting; material applied in transplant water) | A total of 62.8 gallon per acre of UN32 was applied throughout the season | 79 GPA | 79 GPA |
| 5/14 (drip irrigation) | | 10 GPA | 5 GPA + 2 GPA UN32 (injected together) |
| 5/30 (drip irrigation) | | 10 GPA | 5 GPA + ½ UN32 |
| 6/12 (drip irrigation) | | 5 GPA | 2.5 GPA + ½ UN32 |
| 7/3 (drip irrigation) | | 5 GPA | 2.5 GPA + ½ UN32 |

The application on May 14 was applied by injecting the HGH and GS into the drip line together. The GS applied as part of the H2H:GS treatment on May 30, June 12, and July 3 were metered by turning on the valves for the GS treatment for ½ the set time of the normal injection event for the field.

Tomatoes were harvested from 20 randomly selected plants from each of the three treatments. Tomatoes were counted and weighed for each plant. 10 tomatoes were selected randomly from each plant for measurement of brix of sugar. (One degree Brix is 1 gram of sucrose in 100 grams of solution and represents the strength of the solution as percentage by weight (% w/w)).

Figure 19:
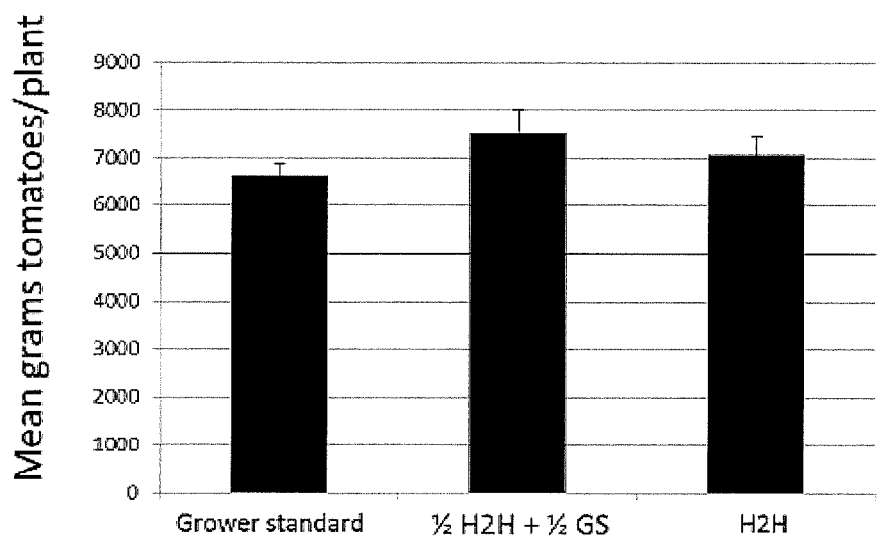
FIG. 19 shows a bar graph of the mean tomato weight per plant (grams of tomatoes per plant) produced by plants treated with GS, H2H:GS or H2H alone. This indicated that the yield of tomatoes may have increased when treatment with GS was replaced by treatment with an emulsified hydrolysate of this invention, while the treatment with a 50:50 mix of GS and the emulsified hydrolysate of this invention increased the yield from about 6600 to about 7500 grams of tomatoes per plant. This study was conducted by an agronomic expert, Dr. Edwin Lewis, Co-Head of Entomology and Nematology at the University of California at Davis.

FIG. 19 shows a bar graph of the mean tomato weight per plant (grams of tomatoes per plant) produced by plants treated with GS, H2H:GS or H2H alone. This indicated that the yield of tomatoes may have increased when treatment with GS was replaced by treatment with an emulsified hydrolysate of this invention, while the treatment with a 50:50 mix of GS and the emulsified hydrolysate of this invention increased the yield from about 6600 to about 7500 grams of tomatoes per plant.

Figure 20:
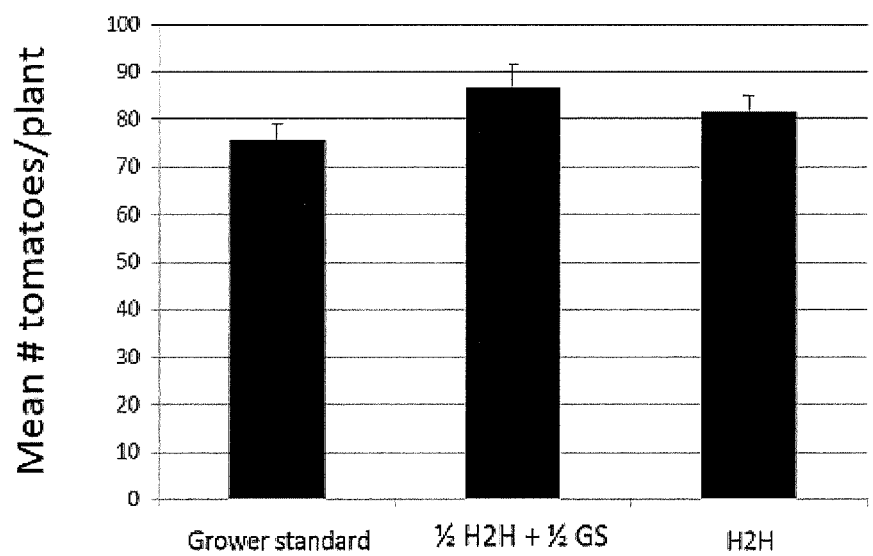
FIG. 20 shows a bar graph of the mean tomato number per plant (mean # tomatoes per plant) produced by plants treated with GS, H2H:GS or H2H alone. This indicated that treatment with an emulsified hydrolysate of this invention or the 50:50 mix increased the number of tomatoes per plant.

FIG. 20 shows a bar graph of the mean tomato number per plant (mean # tomatoes per plant) produced by plants treated with GS, H2H:GS or H2H alone. This indicated that treatment with an emulsified hydrolysate of this invention or the 50:50 mix increased the number of tomatoes per plant.

Figure 21:
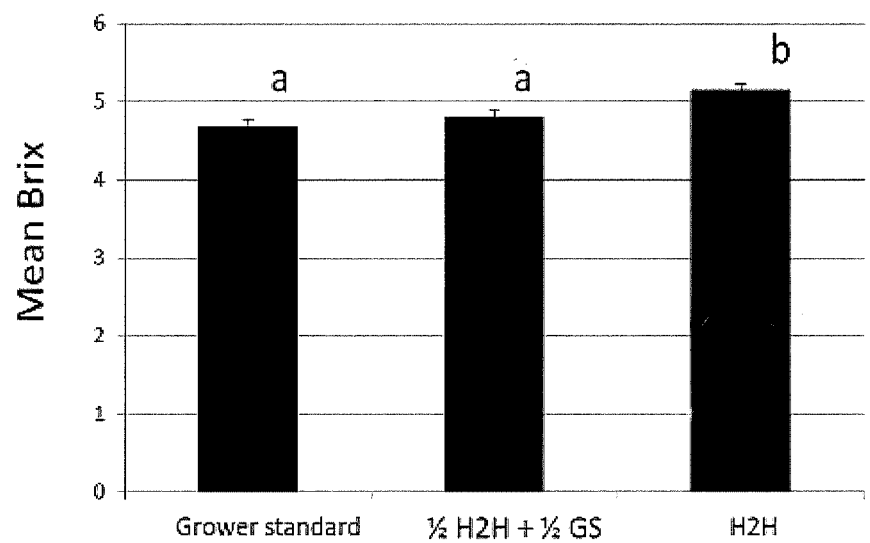
FIG. 21 shows a bar graph of the mean BRIX (BRIX degrees) in the tomatoes produced by plants treated with GS, H2H:GS or H2H alone. The data indicated that treatment with an emulsified hydrolysate of this invention increased the sugar content of the tomatoes to a significant degree.

FIG. 21 shows a bar graph of the mean BRIX (BRIX degrees) in the tomatoes produced by plants treated with GS, H2H:GS or H2H alone. The data indicated that treatment with an emulsified hydrolysate of this invention increased the sugar content of the tomatoes to a significant degree.

Example 9

Increasing Plant Canopy

In another aspect, the compositions of this invention are useful for increasing plant canopy when applied as fertilizers. This helps to reflect less heat and keep soil temperatures lower, reduce water evaporation from the soil, increase capture of sunlight by the plants, and reduce weeds. The canopy of tomato plants treated with H2H was compared to the canopy of tomato plants treated with GS. The plants treated with H2H were treated according to the application schedule shown in Table 7.

TABLE 7

| Product | Rate/Acre | Application Time | Application Method | Number of Application |
|---|---|---|---|---|
| H2H | 10 Gallons | Bloom | Drip | 1 |
| H2H | 10 Gallons | Fruit Set | Drip | 1 |
| H2H | 10 Gallons | 2 Weeks Later | Drip | 1 |
| H2H | 10 Gallons | Verasion (onset of ripening) | Drip | 1 |
| H2H | 10 Gallons | 1 Week Later | Drip | 1 |

The analysis lab results for leaves from plants treated with GS or H2H are shown in Table 8, below.

TABLE 8

| | % N | % P | % K | % Ca | % Mg | % S | % Na | % Cl | B | Zn | Mn | Fe | Cu | NO3—N | PO4—P | % K |
|---|---|---|---|---|---|---|---|---|---|---|---|---|---|---|---|---|
| GS | 4.06 | 0.29 | 1.32 | 2.87 | 0.64 | 0.82 | 0.19 | 1.03 | 52 | 17 | 73 | 165 | 12 | 2024 | 1255 | 3.93 |
| H2H | 4.72 | 0.39 | 1.70 | 2.40 | 0.53 | 0.66 | 0.08 | 0.88 | 43 | 20 | 52 | 167 | 13 | 3899 | 1640 | 5.40 |

This showed that the nutrient status of plants treated with H2H was better than plants treated with GS.

The yield per acre of tomatoes produced by plants treated with a 50:50 mixture of H2H and GS compared to plants treated with GS alone is shown in Table 9.

TABLE 9

| TREATMENT | ACRES | YIELD/ACRE | COLOR | SOLIDS |
|---|---|---|---|---|
| H2H:GS (50:50) | 18 | 83.4 | 24.6 | 5.33 |
| CONTROL (GS) | 21.7 | 74.2 | 24.1 | 5.53 |

The yield results further demonstrated that the yield of tomatoes is increased by treatment with a 50:50 mixture of GS and an emulsified hydrolysate of this invention.

Figure 22:
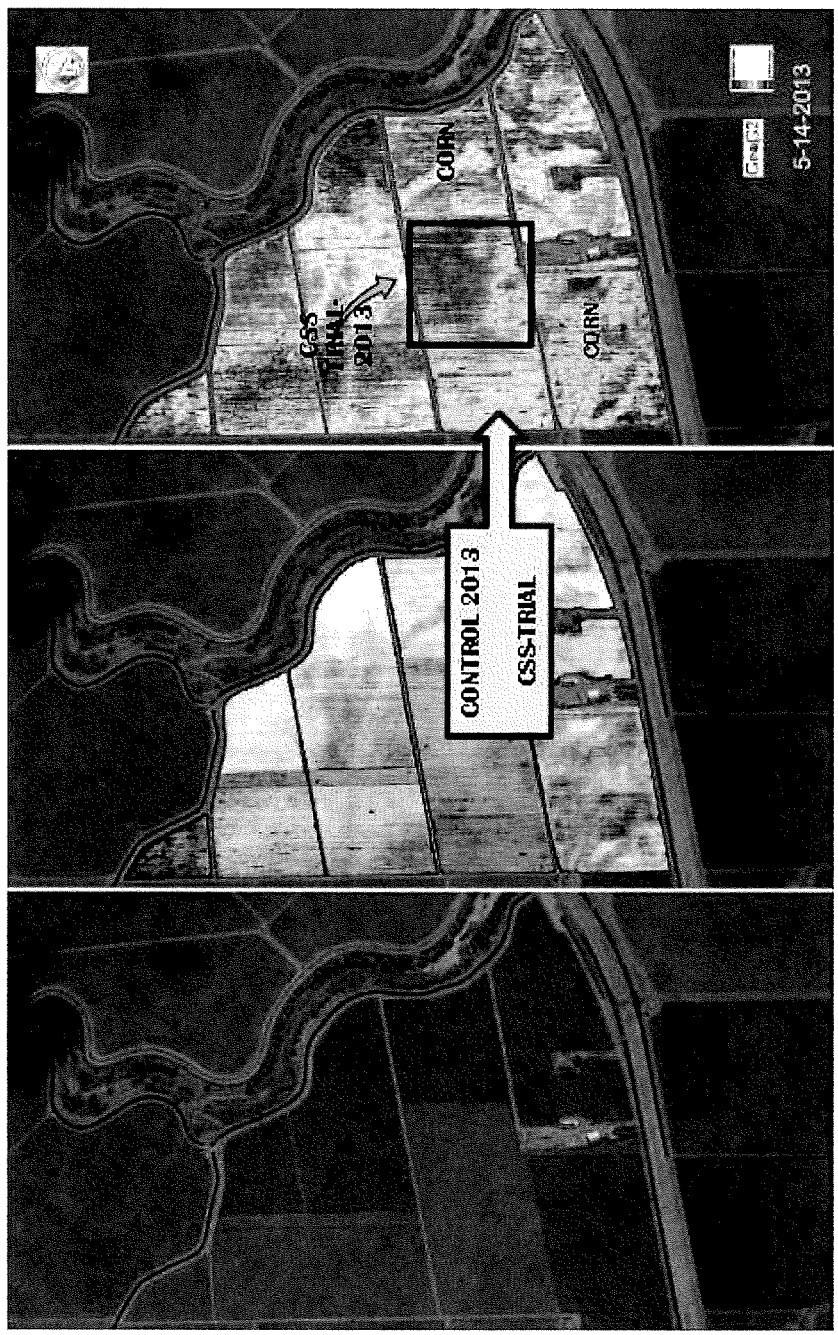
FIG. 22 shows an aerial image of fields planted with tomatoes treated with GS or a 50:50 mixture of GS and H2H, using Normalized Difference Vegetation Index (NDVI) technology. The aerial images are based on chlorophyll content, with green indicating more canopy and more chlorophyll, and brown indicating less canopy and less chlorophyll. The square shows a plot treated with GS:H2H, which has much more green than the plot directly to the left of the square, which is a plot grown with GS only. This study was conducted by an agronomic expert, Dr. Miguel Duarte, the proprietor of Duarte & Associates, Inc. of Fresno, Calif.

FIG. 22 shows an aerial image taken of field plots planted with tomatoes treated with GS or a 50:50 mixture of GS and H2H. The aerial images are based on chlorophyll content, with green indicating more canopy and chlorophyll in H2H treated plants (less heat reflected), and brown indicating less canopy and less chlorophyll. The figure shows that the plants in the plot treated with the 50:50 mixture of GS and an exemplary emulsified hydrolysate of this invention had less reflected heat as a result of faster growth, and significantly larger canopies and more chlorophyll.

Example 10

Making Emulsified Hydrolysate

A pilot-scale process for making an exemplary stabilized hydrolysate of this invention was performed. The stabilized food hydrolysate was made from recycled fresh food waste collected from supermarkets. During this process, the recycled food was heated, mechanically ground, and broken down by enzymes into solution. The hydrolysates contain complex forms of nutrients, including: carbohydrates, proteins, and fats.

Fresh food waste from the produce, meat, fish, bakery, & deli departments was collected by refrigerated trucks within 2 days of being pulled off of the shelf at the supermarket. The collected fresh food waste organics was kept fresh by storage in specialized, insulated containers that are designed to keep the collected food fresh while awaiting pickup. Collected supermarket fresh food was processed within 24 hrs. of arrival at the production facility.

The collected fresh food waste was weighed and recorded separately as lbs. of meat and produce. After the material was weighed, it was emptied into a central hopper and ground into a slurry using a Rotary Knife Grinder with a pump head.

The grinder pumped the fresh food waste particle slurry into a jacketed digestion vessel, where it was continuously mixed. The enzymatic digestion incubation process was carried out in this vessel for a total of 3 hours. Enzymes were introduced into the slurry, and the material was continuously heated, mixed, and further ground to maximize the efficiency of the enzymes acting on the material.

More specifically, a first enzyme combination comprising endocellulase, exocellulase and lipase was added to the fresh food waste slurry with constant mixing, and the temperature was increased to 100° F., for 30 minutes. An in-line high shear grinder in a recirculating line was then turned on. The high shear grinder was a high shear mixer with a disintegrating head (high RPM shearing action). A second enzyme combination comprising pectinase, protease, and α-amylase was then added, and the temperature increased to 130° F. for 1.5 hours. After incubating, the incubated hydrolysate was heated to between 160-170° F. for about 30 minutes to further pasteurize the hydrolysate.

This pasteurized material was then separated using mesh screens. The hydrolysate produced by incubating was first separated using a vibrating 30 mesh screen with an opening of 590 μm. The hydrolysate passing through the first screen was further separated by filtering through a 200 mesh screen with an opening size of 74 μm.

The separated liquid hydrolysate was then emulsified/homogenized using an ultra-high shear grinder which may be a high shear multi stage mixer, to form an emulsified hydrolysate. Eighty percent of the particles in the emulsified hydrolysate had a diameter of 26 μm or less, as determined by laser diffraction. The emulsified hydrolysate was pumped to the stabilization tank for final processing.

The pasteurized hydrolysate or emulsified hydrolysate was stabilized by adding phosphoric acid to a pH of 2.8, and 0.25% potassium sorbate was added to preserve the liquid in its pasteurized state and prevent microbial activity while in storage. This material was then sampled and checked for pH and for the presence food pathogens. Food pathogen screening required a 24 hr. incubation period, so the material was held in the stabilization tank for 24 hrs. until it cleared this check. The hydrolysate was then transferred to a storage tank.

After stabilization, the hydrolysate was also laboratory tested, to ensure that the contents are free of pathogens (like *E. coli* and *salmonella*), heavy metals and other undesirable materials. Individual batches were blended, to assure that the hydrolysate composition was consistent.

Example 11

Reduction of Pathogens

A study was undertaken to assess pathogen reduction during the processes of this invention for converting fresh food waste into hydrolysates useful as biofertilizers. As described below, the thermophilic, pasteurization and acid stabilization processes inactivated all of the pathogens tested, including *E. coli* (O157:H7), *Salmonella typhimurium* LT2, and *Listeria monocytogen* reductions. In this study, the fresh food waste was inoculated with *E. coli, Salmonella typhimurium* LT2, and *Listeria monocytogen*, and the levels of the pathogens present in the emulsified hydrolysates were measured.

Figure 23:
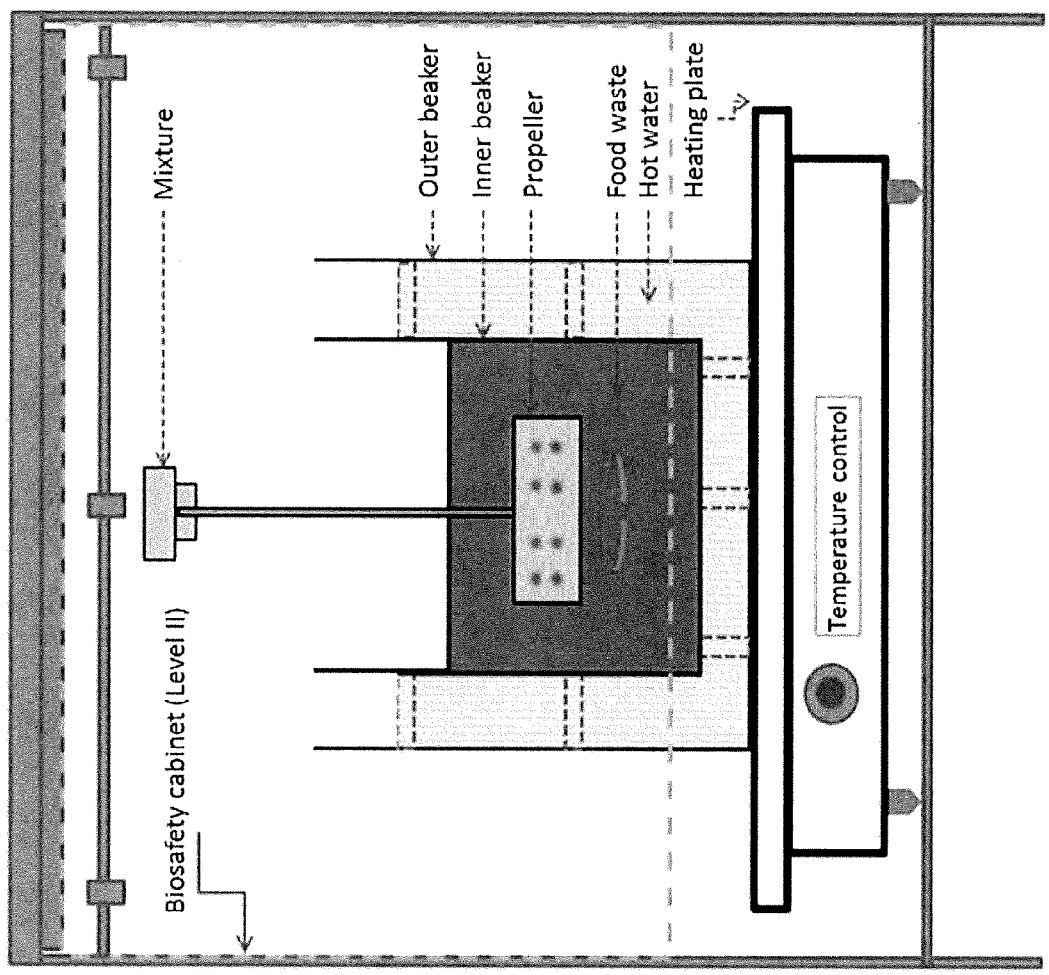
FIG. 23 shows the equipment set up for the pathogen challenge test. This study was conducted by a pathogenic research expert, Dr. Pramod Pandy, Department of Population Health and Reproduction at the University of California at Davis.

FIG. 23 shows a schematic of the experimental setup. To conduct the pathogen challenge, a bench scale production apparatus was designed, and the experiment was conducted inside a biosafety cabinet (level II) to avoid the ambient contamination as well as to comply with the safety regulations. The experiment was performed in three stages: 1) thermophilic stage (55-57° C.); 2) pasteurization stage (75-77° C.); and 3) acidification stage (room temperature (22-25° C.)). To control the temperature of the fresh food waste during the process, the temperature of water jacket (shown in FIG. 2 as the outer beaker) was regulated using a heating plate. The thermophilic treatment was carried out for 150 minutes, while pasteurization was carried out for 30 minutes. After finishing pasteurization, acid treatment (i.e., lowering the pH of food waste to 2.8-3.0) was performed. The acidification process prolonged 120 minutes. The mixing of the pathogen-spiked fresh food waste mixture was performed using an overhead mixture. During the thermophilic enzyme incubation stage and the pasteurization processes the stirring speed was 50 RPM, and during the acid stabilization process the stirring speed was 200 RPM, which ensured uniformity of the hydrolysate and helped to aerating the mixture.

At each stage, including the initial stage of preparing the fresh food waste, the thermophilic stage (after 150 minutes), pasteurization stage (30 minutes after the thermophilic stage), and stabilization stage (120 minutes after the pasteurization stage), samples were collected and analyzed within 30 minutes of sample collection. A pH meter equipped with a pH and temperature probe was used to measure the pH and temperature.

To conduct the test, freshly prepared pathogen inoculums of *E. coli* (O157:H7), *Salmonella*, and *Listeria monocytogenes* were combined in a 500 ml beaker with 200 ml of unstablized hydrolysate filtered to 74 microns. The inoculum pathogen levels were in 9 orders of magnitude (i.e., $1 \times 10^9$ CFU/ml) (described in results and discussion section). After mixing of pathogens into the emulsified hydrolysate, the mixture of pathogen spiked hydrolysate was placed in a beaker inside the hot water jacket (outer beaker) (FIG. 2). The temperature of feedstock reached to 55-57° C. within 10 minutes in thermophilic incubation stage. The temperature was maintained for 150 minutes. After 150 minutes, the temperature of the mixture was raised to 75-77° C. (pasteurization) for 30 minutes. After pasteurization, the heating plate was removed, and within 10 minutes phosphoric acid and potassium sorbate was added to lower the pH between 2.8 and 3.0. Once the pH was lowered to the desired level (i.e., acidification process), the hydrolysate was stirred (with 200 rpm) for 120 minutes. At each stage (initial stage; thermophilic; pasteurization; acidification), feedstock samples were collected, and analyzed using BAM plating methodology, on pre-prepared media plates.

The descriptions of pathogen strains, growth media, and agar media are set forth in Table 10.

TABLE 10

| Pathogens | ATCC# | Growth Media | | Selective Agar Media | | |
|---|---|---|---|---|---|---|
| | | Brand | Mfr. | Brand | Supplement | Mfr. |
| E. coli (O157:H7) | 35150 | Difco LB Broth Miller (Luria-Bertani) | Becton, Dickinson & Co. (Sparks, MD) | BBL MacConckey II Agar with Sorbitol | No | Becton, Dickinson & Co. (Sparks, MD) |
| Salmonella typhinurium LT2 | 700720 | Difco LB Broth Miller (Luria-Bertani) | | Difco XLD Agar | No | Becton, Dickinson & Co. (Sparks, MD) |
| Listeria monocytogen | BAA679D-5 | Difco LB Broth Miller (Luria-Bertani) | | Listeria Identification Agar Base (PALCAM) | Listeria Selective Supplement | Becton, Dickinson & Co. (Sparks, MD) |

Prior to starting the experiment, fresh pathogen culture was grown in 250 ml flasks. 4 ml of fresh culture was palletized in micro-centrifuge at 8000 RPM for 10 minutes. The pallets of each pathogen was mixed with the hydrolysate, and stirred for 10 minutes at room temperature (inside the biosafety cabinet hood). Once the mixture of pathogen and hydrolysate was ready, the initial concentration of each pathogen was measured using the Bacteriological Analytical Manual (BAM) method (available on the FDA website at www.fda.gov).

Elevated levels of pathogens in biofertilizers can cause a public health risk. The production of safe biofertilizers which do not contain pathogens is an advantage of the compositions of this invention. As described herein, the methods of this invention are also useful for pathogen reduction.

The effects of thermophilic (55-57° C.), pasteurization (55-57° C.), and acidification processes (pH of 2.8-3.0) on the reduction of pathogens such as $E\ coli$ (O157:H7), *Salmonella typhimurium* LT2, and *Listeria monocytogen* were evaluated, and shown to be effective to inactivate those pathogens. A bench-scale experiment was performed according to the methods described herein, simulating the processes of this invention. Pathogen inactivation was then determined. As described below, thermophilic, pasteurization, acidification processes were carried out for 150, 30, and 120 minutes, respectively. Stirring at 50 rpm was carried out during the thermophilic and pasteurization steps, while stirring at 200 rpm was performed in the stabilization process.

Pathogens ($\approx 10^9$ CFU/mL) were spiked into unstablized hydrolysate to start the experiment. Results showed that initial pathogen levels ($\approx 10^7$ CFU/mL) in food waste dropped to undetectable levels after the thermophilic, pasteurization, and acid stabilization steps. This demonstrated that the methods of this invention are useful for controlling pathogen levels in biofertilizers, and enhancing the safety of biofertilizers.

3.1 Inactivation of *E coli* (O157:H7)

Figure 24:
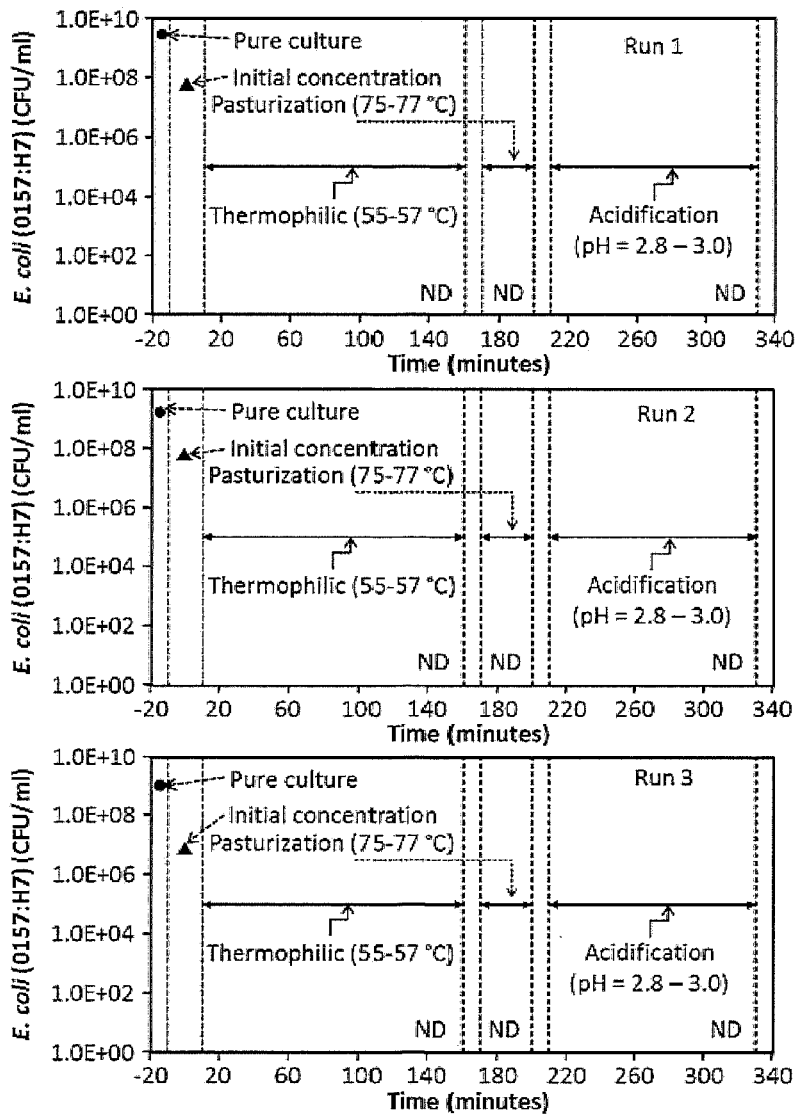
FIG. 24 shows a schematic for *E. coli* (O157:H7) inactivation in thermophilic, pasteurization, and acidification processes. In the figure, the x-axis indicates time (minutes) (i.e., process duration) and the y-axis indicates *E. coli* (O157:H7) levels (CFU/mL, or Colony Forming Units per milliliter). The durations of each process (thermophilic, pasteurization, and acidification) is shown by horizontal lines with both end arrows. Vertical dotted lines indicate time (approximately 10 minutes), which was required for phase change i.e., changing temperatures from ambient to thermophilic and thermophilic to pasteurization, and time required for changing from pasteurization to acidification process. Three experiments (Run 1, Run 2, and Run 3) were performed to assess the pathogen inactivation. The levels of *E. coli* (O157:H7) in growth medium were $2.8 \times 10^9$, $1.7 \times 10^9$, and $1 \times 10^9$ CFU/mL in Run 1, Run 2, and Run 3, respectively (shown as red circles in FIG. 3). ND means that no pathogens were detected at a given stage.

FIG. 24 shows *E. coli* (O157:H7) inactivation in thermophilic, pasteurization, and acidification processes. In the figure, the x-axis indicates time (minutes) (i.e., process duration) and the y-axis indicates *E. coli* (O157:H7) levels (CFU/mL). The durations of each process (thermophilic, pasteurization, and acidification) is shown by horizontal lines with both end arrows. Vertical dotted lines indicate time (approximately 10 minutes), which was required for phage change i.e., changing temperatures from ambient to thermophilic and thermophilic to pasteurization, and time required for changing from pasteurization to acidification process. Three experiments (Run 1, Run 2, and Run 3) were performed to assess the pathogen inactivation. The levels of *E. coli* (O157:H7) in growth medium were $2.8 \times 10^9$, $1.7 \times 10^9$, and $1 \times 10^9$ CFU/mL in Run 1, Run 2, and Run 3, respectively (shown as red circles in FIG. 24). After palletization of *E. coli* (O157:H7), CSS food waste was mixed with the pallets of *E. coli* (O157:H7), which resulted in elevated pathogen levels in food waste. Initial *E. coli* (O157:H7) levels in feedstock (i.e., after mixing pathogen pallets with CSS food waste) were $6.1 \times 10^7$, $1.7 \times 10^7$, and $8.0 \times 10^6$ CFU/mL in Run 1, Run 2, and Run 3, respectively (shown as green triangles in FIG. 3). At the end of thermophilic process (55-57° C. for 150 minutes), *E. coli* (O157:H7) levels were enumerated in feedstock. Similarly at the end of pasteurization (75-77° C.) and acidification processes (2.8-3.0 pH), feedstock samples were analyzed for assessing *E. coli* (O157:H7) levels. Results showed that no *E. coli* (O157:H7) growth occurred in agar plates, when we plated the feedstock samples, which were collected at the end of each process. The results shown in FIG. 24 show that the level of *E. coli* following the thermophilic, pasteurization, and stabilization processes was not detectable (ND).

Inactivation of *Salmonella typhimurium* LT2

Figure 25:
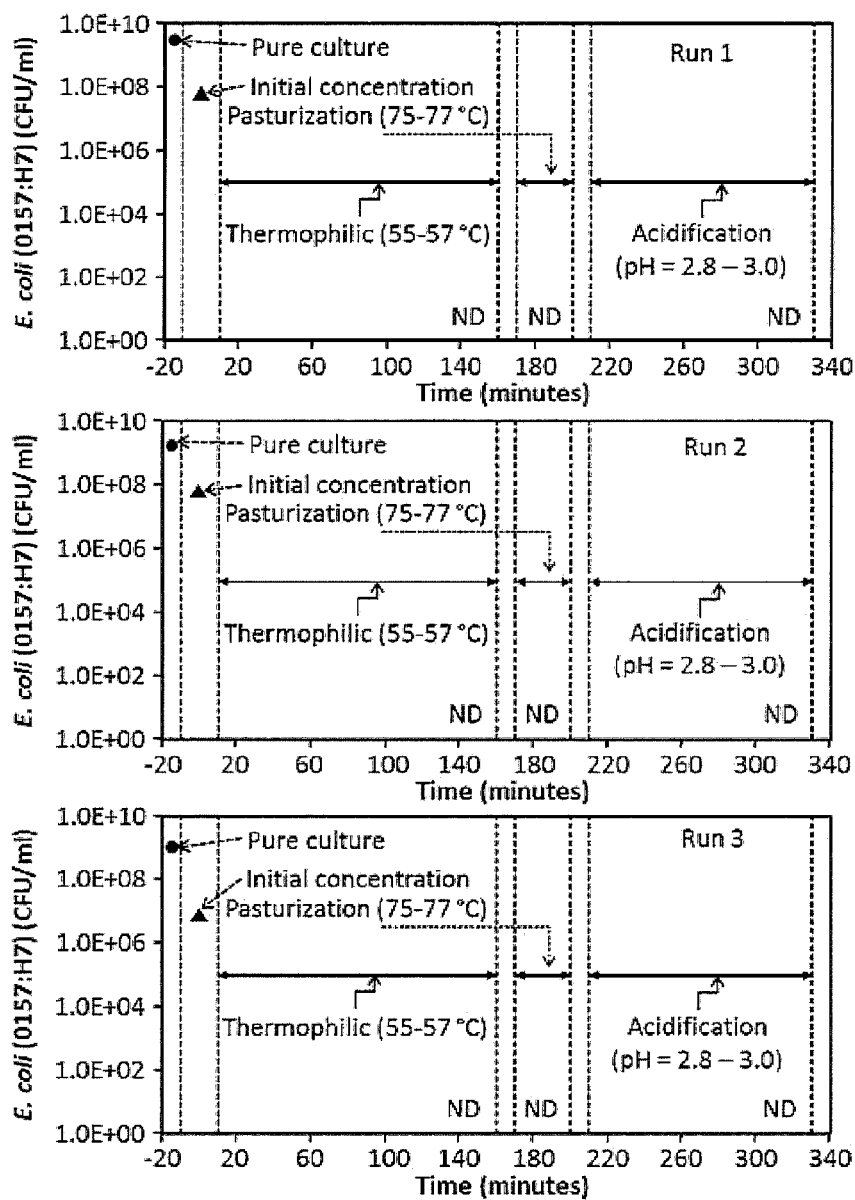
FIG. 25 shows a schematic for *Salmonella typhimurium* LT2 inactivation by the thermophilic, pasteurization, and acidification processes. Similar to FIG. 24, the x-axis indicates time (minutes) and y-axis indicates *Salmonella typhimurium* LT2 levels (CFU/mL). The durations of each process (thermophilic, pasteurization, and acid stabilization) is shown by horizontal lines with both end arrows. The levels of *Salmonella typhimurium* LT2 in growth medium were $4.3 \times 10^9$, $3.1 \times 10^9$, and $5.2 \times 10^9$ CFU/mL in Run 1, Run 2, and Run 3, respectively (shown as red circles in FIG. 25). ND means that no pathogens were detected at a given stage.

FIG. 25 shows *Salmonella typhimurium* LT2 inactivation by the thermophilic, pasteurization, and acidification processes. Similar to FIG. 24, the x-axis indicates time (minutes) and y-axis indicates *Salmonella typhimurium* LT2 levels (CFU/mL). The durations of each process (thermophilic, pasteurization, and acid stabilization) is shown by horizontal lines with both end arrows. The levels of *Salmonella typhimurium* LT2 in growth medium were $4.3 \times 10^9$, $3.1 \times 10^9$, and $5.2 \times 10^9$ CFU/mL in Run 1, Run 2, and Run 3, respectively (shown as red circles in FIG. 25). After palletization of *Salmonella typhimurium* LT2, the hydrolysate was mixed with the pallets of *Salmonella typhimurium* LT2. In initial samples (i.e., feedstock) of Run 1, Run 2, and Run 3, *Salmonella typhimurium* LT2 levels were $7.1 \times 10^7$, $1.1 \times 10^7$, and $2.8 \times 10^7$ CFU/mL, respectively (shown as green triangles in FIG. 4). Similar to *E. coli* (O157:H7) inactivation in the thermophilic, pasteurization, and stabilization steps, *Salmonella typhimurium* LT2 levels were measured in the samples collected at the end of each process. Results of *Salmonella typhimurium* LT2 were negative, and shown in FIG. 4 as ND. No *Salmonella typhimurium* LT2 growth occurred in samples collected at the end of each process.

Inactivation of *Listeria monocytogen*

Figure 26:
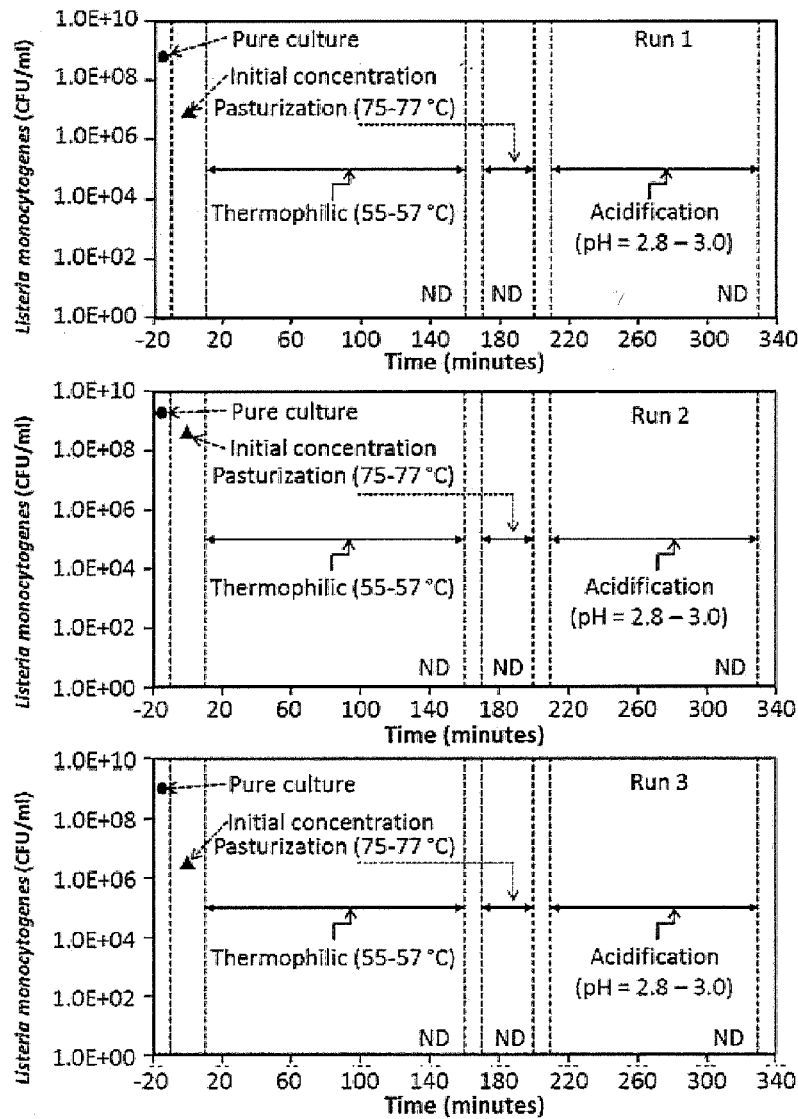
FIG. 26 shows a schematic for the inactivation of *Listeria monocytogen* in a hydrolysate following the thermophilic, pasteurization, and acid stabilization steps.
Figure 28:
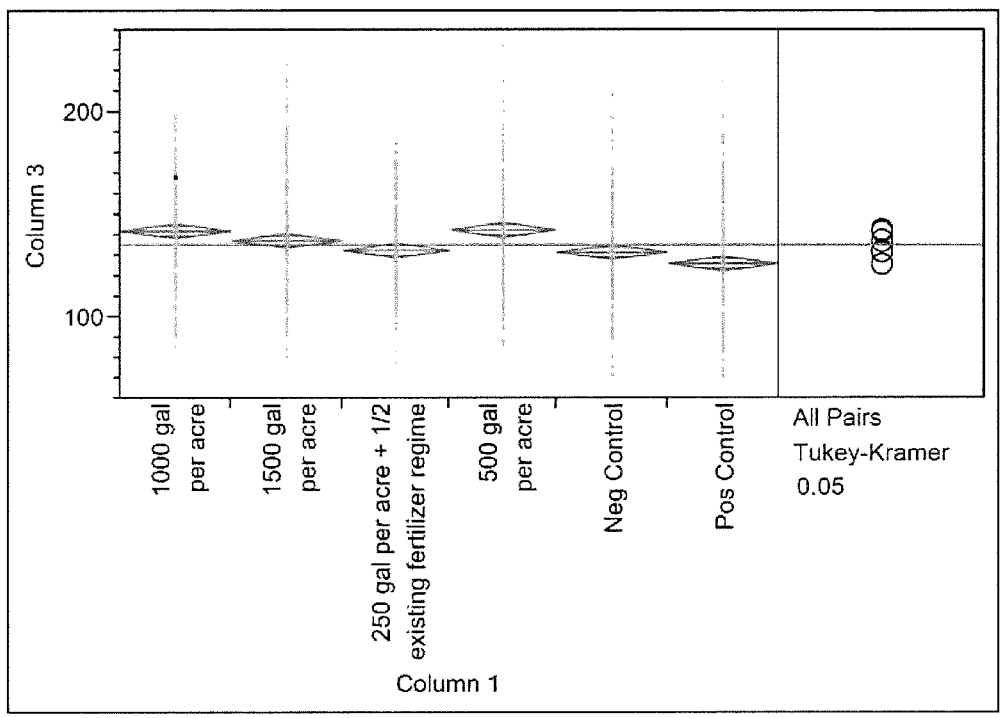
FIG. 28 shows a graph of the data obtained for avocado trees were treated with (1) negative control (no fertilizer treatment); (2) Growers Standard fertilizer (a nitrate fertilizer) (3) an emulsified hydrolysate of this invention (H2H—100%), at 500 gallons per acre, 1000 gallons per acre or 1500 gallons per acre; and (4) at 250 gallons per acre (H2H) plus ½ growers standard (see treatments shown in Column 1), vs. the mean yield.

FIG. 26 shows the inactivation of *Listeria monocytogen* in a hydrolysate following the thermophilic, pasteurization, and acid stabilization steps. In FIG. 26 the y-axis shows *Listeria*

Figure 29:
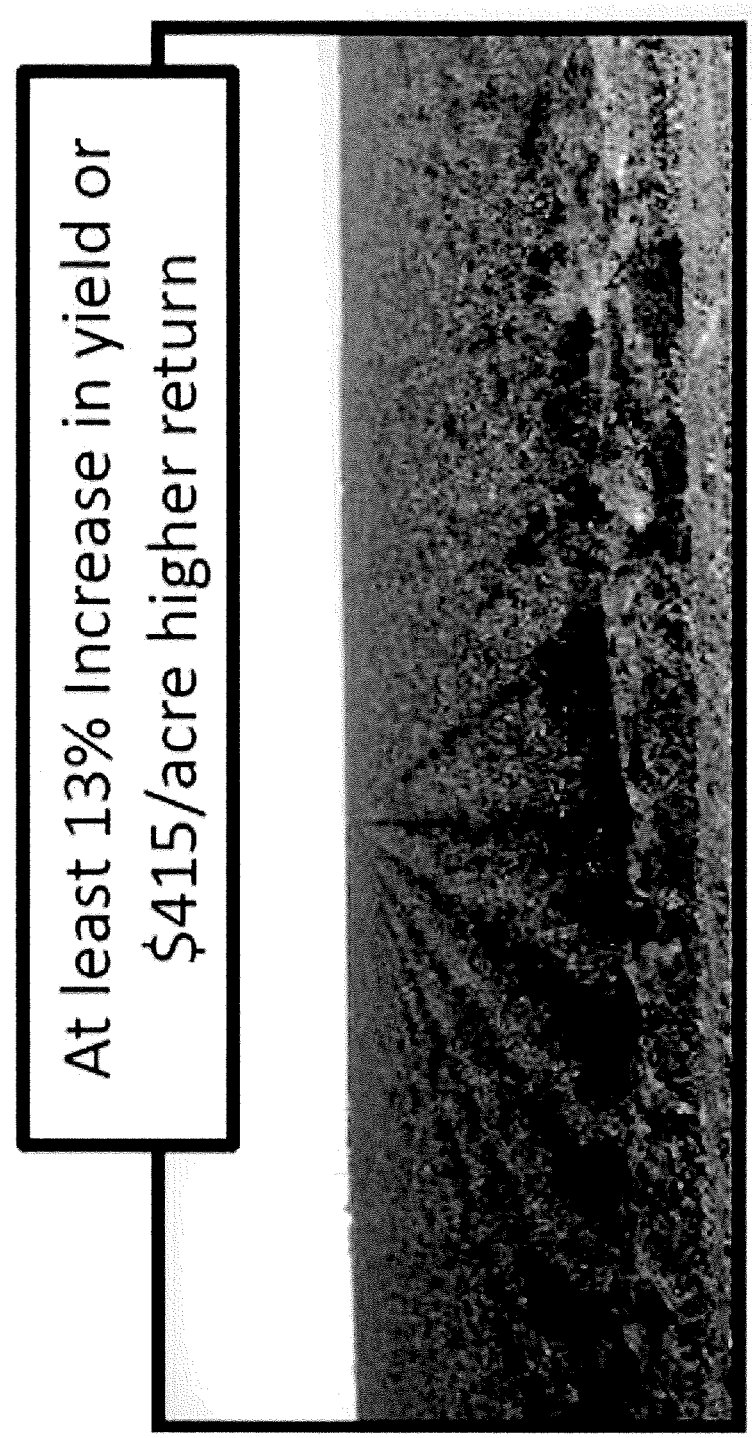
FIG. 29 shows a photograph of a tomato field to which 4 applications of 10 gallons H2H/acre, for a total of 40 gallons/acre were applied.

*monocytogen* levels (CFU/mL) and the x-axis indicates durations of the each process (in minutes). The levels of *Listeria monocytogen* in growth media were $6.0\times10^8$, $2.1\times10^9$, and $1.2\times10^9$ CFU/mL in Run 1, Run 2, and Run 3, respectively (shown as red circles in FIG. 5). Mixing of *Listeria monocytogen* pallets into the hydrolysate resulted *Listeria monocytogen* levels of $5.0\times10^6$, $4.3\times10^8$, and $3.0\times10^6$ CFU/mL in feedstock in Run 1, Run 2, and Run 3, respectively (shown as green triangles in FIG. 26). Similar to *E. coli* (O157:H7) and *Salmonella typhimurium* LT2 inactivations by the thermophilic, pasteurization, and acid stabilization steps, *Listeria monocytogen* levels were measured in the samples collected at the end of each process. Results for *Listeria monocytogen* were also negative, and shown in FIG. 5 as ND. No *Listeria monocytogen* growth occurred in the samples collected at the end of each process.

These results demonstrated that the processes of this invention for converting fresh food waste to hydrolysates control pathogen levels in biofertilizers. In summary, batch experiments were performed to evaluate the effect on the reductions of pathogens such as *E coli* (O157:H7), *Salmonella typhimurium* LT2, and *Listeria monocytogen* when thermophilic (55-57° C.), pasteurization (55-57° C.), and acid stabilization steps (pH of 2.8-3.0) are performed, which simulated those used in the methods of this invention. Each pathogen ($\approx10^{9}$ CFU/mL) was spiked into hydrolysate samples, which resulted pathogen levels of $\approx10^{7}$ CFU/mL. The results indicated that the levels of *E coli* (O157:H7), *Salmonella typhimurium* LT2, and *Listeria monocytogen* dropped to the undetectable levels at the end of the processes employing the thermophilic, pasteurization, and stabilization steps. Accordingly, the methods of this invention are useful in producing nutrient rich hydrolysate fertilizers that are safe for health and for the environment.

Example 12

Increasing Yield of Produce

Another field trial was conducted to study the effect of application of the compositions of this invention, on the yield of avocados. Avocado trees were treated with (1) negative control (no fertilizer treatment); (2) Growers Standard fertilizer (a nitrate fertilizer) (3) an emulsified hydrolysate of this invention (H2H—100%), at 500 gallons per acre, 1000 gallons per acre or 1500 gallons per acre; and (4) at 250 gallons per acre (H2H) plus ½ growers standard. The results are shown in Table 11 and in FIG. 28.

TABLE 11

Means Comparisons for all pairs using Tukey-Kramer HSD

| Treatment | | | | Mean Yield (lbs.) |
|---|---|---|---|---|
| 500 gal per acre | A | | | 142.82206 |
| 1000 gal per acre | A | | | 142.29462 |
| 1500 gal per acre | A | B | | 137.57510 |
| 250 gal per acre + ½ existing fertilizer regime | | B | C | 132.69649 |
| Neg Control | | B | C | 131.83570 |
| Pos Control | | | C | 126.23497 |

Levels not connected by same letter are significantly different, based on Tukey-Kramer HSD (honest significant different) statistical analysis.

These results demonstrate that treatment of avocado trees with 500 gallons per acre and 1000 gallons per acre H2H significantly increases the yield of avocados, as illustrated in FIG. 28.

Example 13

H2H Increases Water Retention and Sustains Yields from Water-Stressed Plants Trial with Reduced Water This example illustrates that H2H can increase water retention and improve crop vigor, quality and productivity even when plants are water stressed.

Tomato plants grown in a controlled filed environment were treated with (1) growers standard fertilizer (GS) and 100% water; (2) a 50:50 blend of H2H and GS, and 100% water; or (3) a 50:50 blend of H2H and GS and 70% water. The protocol included sub-sampling of the crops with six replications. For plants receiving 100% water, the results demonstrated that adding H2H to GS (50:50 GS to H2H) improved crop vigor, quality and productivity compared with plants grown with GS alone, and that the marketable yield increasing from 40.5 to 57.5, or 19% greater fruit with a higher marketable quality. Moreover, for tomato plants stressed by receiving only 70% of normal irrigation water, GS plus H2H yielded 95% of fruit obtained from unstressed tomato plants (100% water) treated with GS, and GS plus H2H further yielded a higher marketability ratio as summarized in Table 12 below.

TABLE 12

| | Total Yield | Marketable Yield | Marketable % Chg |
|---|---|---|---|
| Treatment (Full $H_2O$) | | | |
| Grower Standard | 60.3<br>100% | 40.5<br>(68% utilization) | |
| ½ Grower Standard Plus ½ H2H | 71.7<br>+19% vs GS | 57.5<br>(80% utilization) | +30% vs. GS |
| Treatment (Reduced $H_2O$) | | | |
| Grower Standard 100% $H_2O$ | 60.3<br>100% | 40.5<br>(68% utilization) | |
| Grower Standard 70% $H_2O$ | 40.4<br>(−35%) | 33.4<br>(80% utilization) | |
| Grower Standard Plus H2H overlay 70% $H_2O$ | 57.3<br>(−5%) | 45.6<br>(77% utilization) | +11% vs GS Full $H_2O$<br>+27% vs GS 70% $H_2O$ |

These results demonstrate that the use of H2H maintained marketable crop yield even under conditions of water stress.

Example 14

H2H Increases Yields while Maintaining Crop Quality

A field trial was conducted to determine the effect of H2H treatment on the yield and quality of processing tomatoes. 42.42 acres (140 beds) were treated with 4 applications of 10 gallons H2H/acre, for a total of 40 gallons applied, compared to 40.3 acres (133 beds) of control processing tomatoes. The results summarized in Tables 13 and 14 demonstrate that treatment with H2H increased the yield of saleable processing tomatoes by 13%, with increases of 6%, 14%, 35% and 43% (an average of 24%) in different areas of the field, based on random sampling 10 days prior to harvest. FIG. 29 shows a field with plants treated with H2H.

TABLE 13

Grower Estimate of Yield/Saleable Processing Tomatoes

| | | |
|---|---|---|
| H2H Treated area | 45.2 tons/acre | 13% increase |
| Control (adjacent field) | 40.0 tons/acre | |

TABLE 14

Scientific random sampling performed 10 days prior to harvest

| Total Red Tomato in Pounds | H2H Treated | Control | H2H VS. Control |
|---|---|---|---|
| Area 1 | 43.2 | 30.2 | +43% |
| Area 2 | 29.2 | 21.6 | +35% |
| Area 3 | 34.2 | 32.2 | +6% |
| Area 4 | 24.2 | 21.2 | +14% |
| TOTAL Pounds | 130.8 | 105.2 | +24% |

Example 15

H2H Treatment Provided Exceptional Quality Crops

Figure 30B:
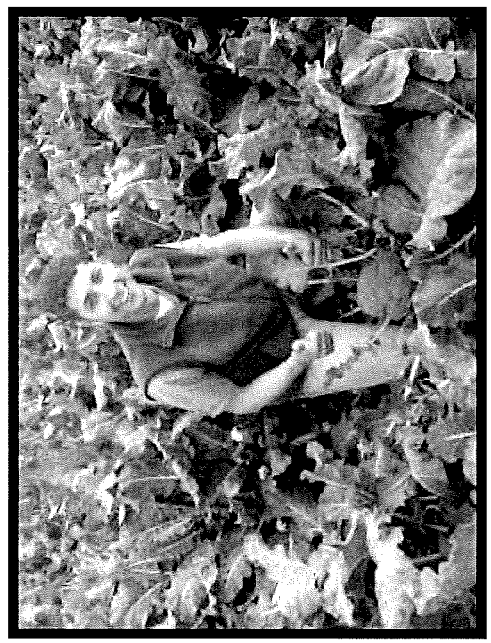
FIG. 30B shows the broccoli field grown with H2H treatment.
Figure 30A:
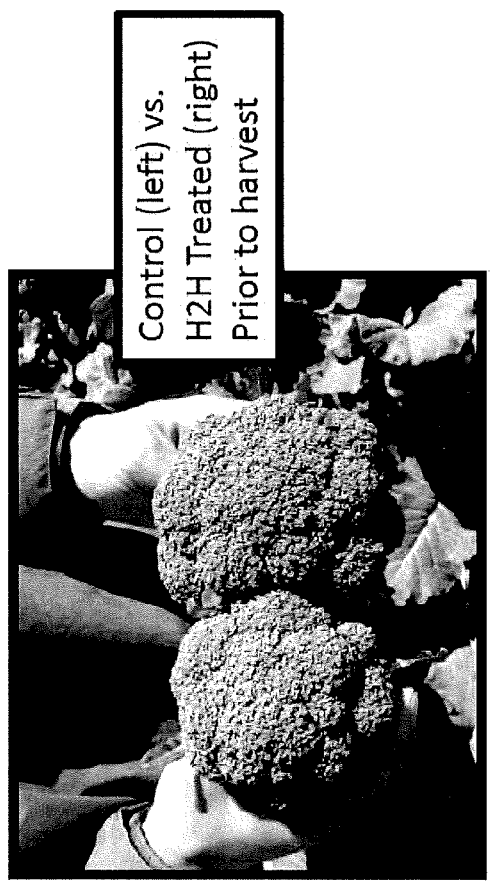
FIG. 30A shows broccoli obtained from a control (GS) plant and an H2H treated plant, prior to harvest.

Broccoli grown using GS was compared with broccoli grown using GS+H2H (50:50), which resulted in a significant reduction in the application of total nitrogen chemical fertilizer application. The crop was rated exceptional in terms of quality, with an estimated yield of around 890 cartons/acre. FIG. 30A shows a broccoli obtained from a H2H treated plant (right) compared to a broccoli obtained from control (GS) treatment prior to harvest. In addition, a soil quick test nitrogen to measure available nitrogen indicated that the nitrogen was higher in the areas treated with GS+H2H compared to control.

A similar protocol was performed for iceberg lettuce. The results summarized in Table 15 demonstrate that a similar yield was obtained per acre for plants treated with H2H (26% of the nitrogen) vs. control plants treated with GS. In addition, the H2H treated fields yielded lettuce with quality as good or better than GS treated fields. (In addition, the results from the yield from the H2H treated plants may have been disproportionally impacted by poor seed-to-soil contact and improper irrigation resulting in poor germination, so the results are not inconsistent with increases in yield obtained by H2H treatment in other experiments).

TABLE 15

Lettuce Trial Results

| | H2H Treated Acres | Control GS Treated Acres |
|---|---|---|
| Acres Treated | 15.35 | 15.37 |
| Fertilization | H2H only | GS |
| Yield tons/acre | 2.109 | 2.095 |
| #'s N/Ton of Produce | 9.41 lbs/Ton | 36.27 lbs/Ton |
| % N/Ton of Produce | 26% | 100% |

Example 16

H2H Treatment for Jalapeno Peppers

Figure 31:
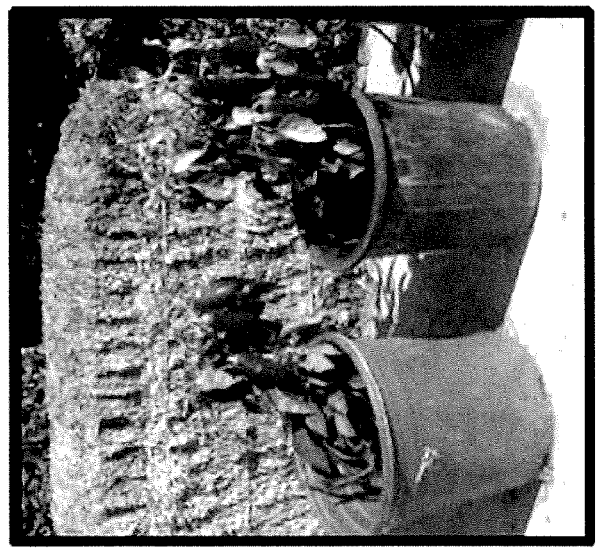
FIG. 31 shows a jalapeno pepper plant grown with GS (left plant) compared to a plant grown with H2H in addition to GS (right plant).

The effect of treatment with H2H in addition to GS compared to treatment with GS alone was compared in a controlled field environment for jalapeno peppers. The protocol used was a block study of 8 replicates. Plants were treated with GS or GS plus an H2H overlay of 65 gal/acre for the season, with H2H applied every three weeks over the growing season. FIG. 31 shows a plant grown with GS alone (left) and with GS+H2H overlay (right), and FIG. 32 shows the yield of peppers obtained from a plant grown with GS alone (left) or with H2H overlay (right).

Consistent with other studies, the addition of H2H at full rate to full rate GS was not optimal for yield. However, when GS was reduced or omitted, and plants were treated with H2H, crop yield generally increased over results obtained using GS.

Treatment with H2H increased soil organic matter from 1.3% for GS treated fields to 1.5% for H2H treated fields.

Figure 32:
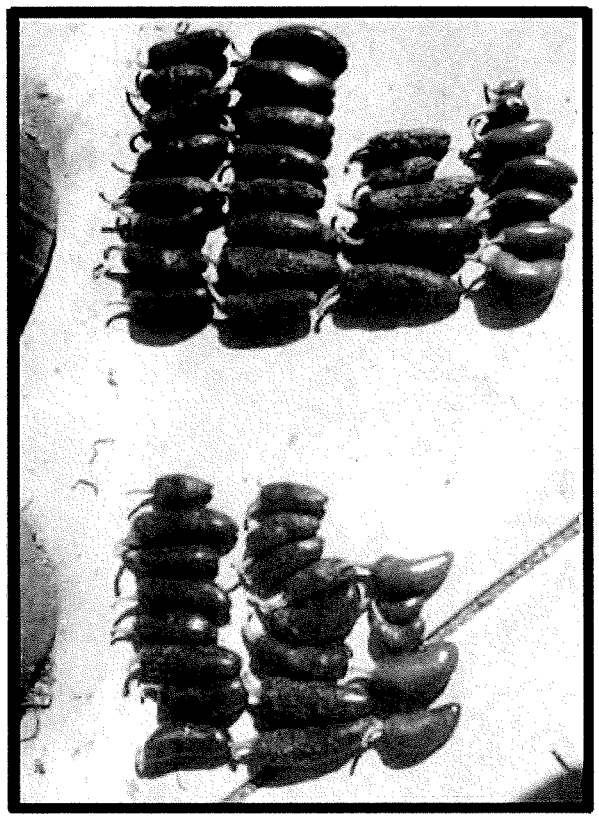
FIG. 32 shows the yield of peppers from a jalapeno pepper plant grown with GS (left) compared to a plant grown with H2H in addition to GS (right).

FIGS. 31 and 32 illustrate plants and peppers obtained for a GS treated plant (left) and an H2H treated plant (right).

Example 17

H2H Treatment Increased Blueberry Yield

A trial was conducted to study the effect of H2H treatment on 1 acre of blueberry plants. In the 10 week trial, H2H was applied every other week for a total of 5 applications. The first application of H2H was applied at 15 gallons/acre with subsequent applications of 10 gallons/acre. H2H was applied over ½ GS treatment. Blueberries were harvested at weeks 8 and 10. Blueberry plants treated with H2H yielded 33% more berries than control bushes grown with GS for both harvests.

Example 18

H2H Treatment Increased Peach Yield

H2H was applied to a peach orchard. The first application of H2H was applied at 15 gallons/acre with subsequent applications of 10 gallons/acre, for a total application of 55 gallons/acre. Compared to control, H2H treatment increased the number of saleable boxes of peaches by 10%, as summarized in Table 16, below.

TABLE 16

| | Control | H2H Treated | % Change |
|---|---|---|---|
| Acres | 2.67 | 4.43 | |
| Total Boxes | 984 | 1,799 | |
| Boxes/acre | 368 | 406 | +10% |

Example 19

H2H Treatment Stimulated Growth of Aeroponics Root Development

Figure 34B:
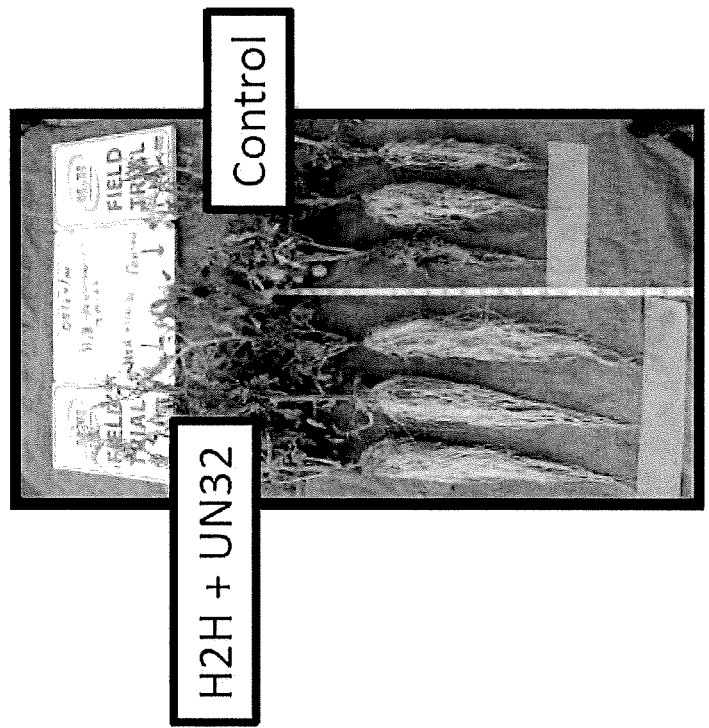
FIG. 34B shows roots from aeroponically grown carrots treated with H2H+UN32 compared to control carrot roots.
Figure 34A:
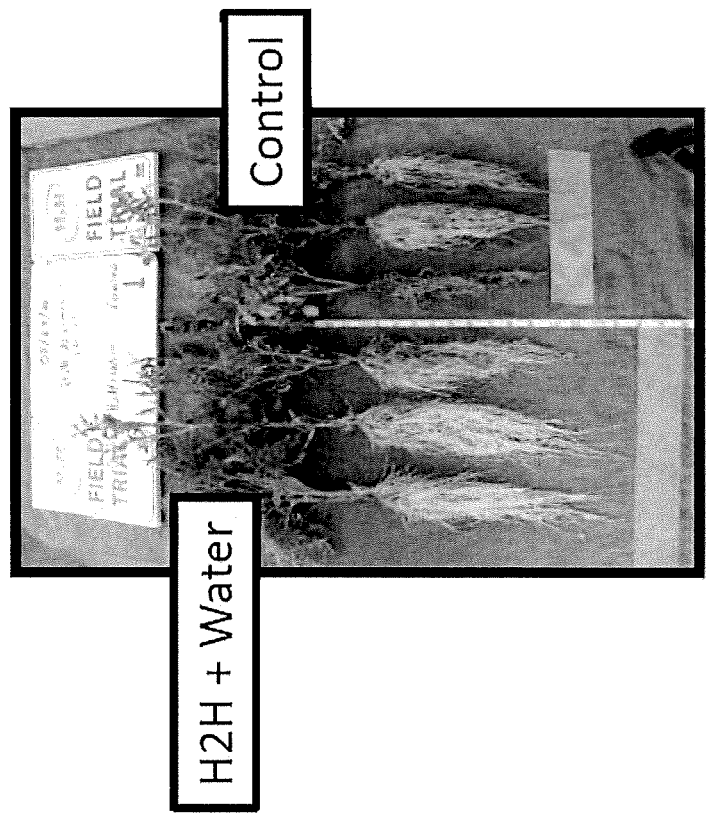
FIG. 34A shows roots from aeroponically grown carrots treated with H2H+water vs. control.
Figure 35:
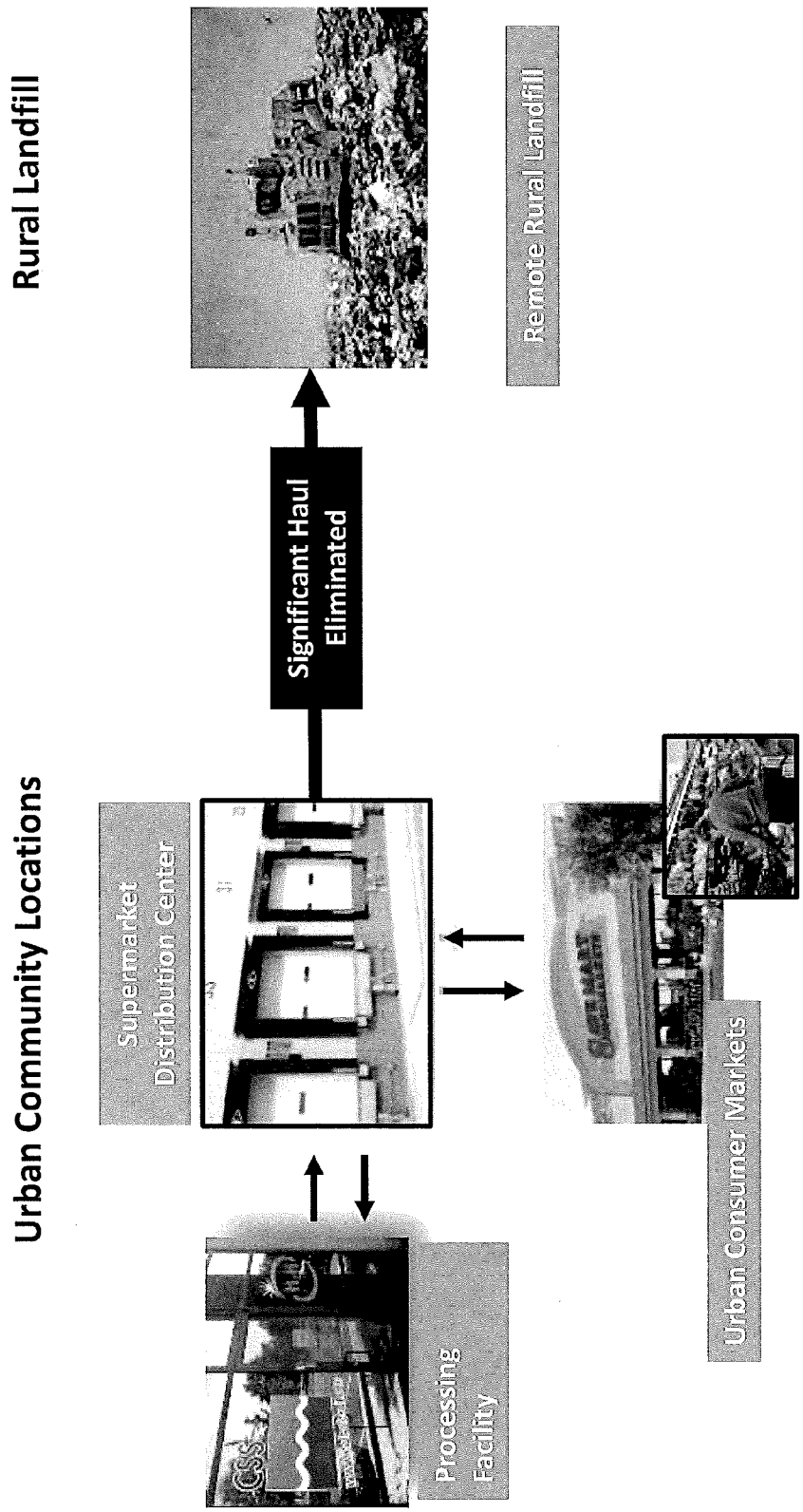
FIG. 35 shows the schematic of the collection system and its inherent transportation cost and/or carbon dioxide emissions saving. The environmental benefits of the invention make urban permitting feasible, to obtain all necessary permits and approvals to construct facilities to utilize the invention at or near the supermarket distribution center, eliminating the waste haul from the distribution center to the remotely located landfill, as is current practice.

The effect of H2H on root growth was evaluated by spraying H2H directly on tomato plant roots for plants hanging within an aeroponic growth fixture. Plant roots were sprayed with equal amounts of H2H for H2H treated plants or with water for control treated plants. A significant bio-stimulant effect was observed for direct root exposure to H2H, as illustrated in FIGS. 34A and 34B.

Example 20

Beneficial Microbe Stimulation

The effect of H2H on beneficial microbe growth was evaluated by brewing 2% beneficial microbes (an inoculum containing 3 spp of *Pseudomonas* (1 ml) with water (44 ml) for the control, or with 36 ml water and 9 ml H2H (9%) for the H2H sample. The mixture was brewed for 24 hours at 35° C., and incubated for 24 hours at 37° C. The results showed that the colony count for the mixture containing 9% H2H was $1.4 \times 10^7$ cfu/ml compared with $2.6 \times 10^3$ cfu/ml. This demonstrated that H2H promotes the growth of beneficial soil microbes.

Example 21

H2H Treatment of Garlic Plants

The effect of H2H application on garlic yield and quality was evaluated. H2H treated plants received 4 applications of 10 gallons H2H/acre, for a total seasonal application of 40 gallons acre. Control plants were grown with GS.

Figure 33A:
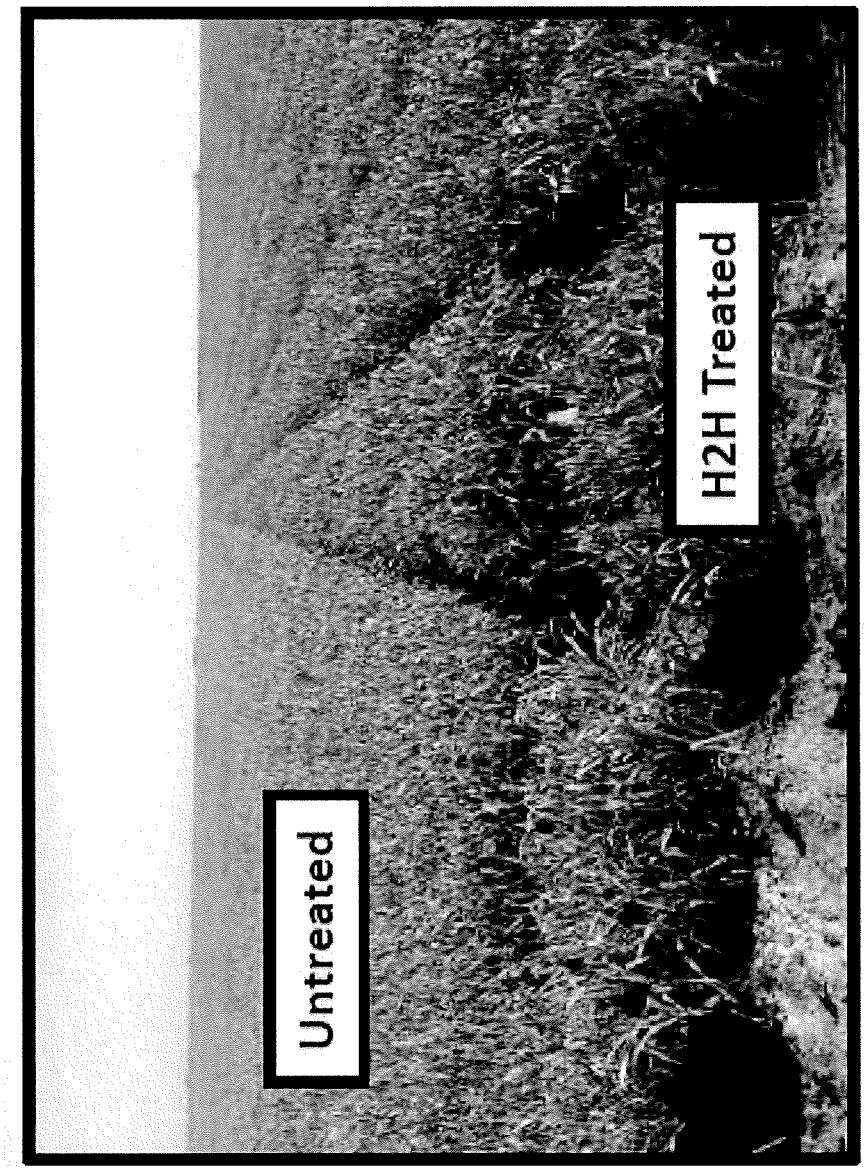
FIG. 33A shows the darker green color of H2H treated garlic plants and garlic plants treated with GS.
Figure 33C:
FIG. 33C shows H2H garlic bulbs from plants treated with H2H (H2 and H3) compared with garlic bulbs from plants treated with GS (C1).
Figure 33B:
FIG. 33B shows garlic bulbs being harvested.

Initial impressions were very favorable, and as shown in FIG. 33A, the garlic plants appeared quite strong prior to harvest, with H2H plants (right) having a darker green color than GS treated acreage (left). Garlic cloves obtained from H2H treated plants (H2 and H3) compared to control (C1) are shown in FIG. 33C. The final harvest figures confirmed that the H2H treated garlic plants yielded in-line with Grower Standard, as summarized in Table 17. This demonstrates that treatment with H2H can sustain yields of garlic compared to GS fertilizer.

TABLE 17

Harvester Calculation of Yield - Garlic

| | |
|---|---|
| H2H Treated area | 9.016 tons/acre |
| Control (adjacent field) | 9.186 tons/acre |

Example 22

H2H Treatment of Organic Raspberry Plants

Organic raspberry plants were grown in rows with (1) no treatment, (2) treatment with GS or (3) with H2H comprising an organic certified acid. The H2H treated rows produced berry quality and size in line with GS treated rows. Harvests over a 4 week period yielded the same box count for H2H treated rows as for GS rows. This demonstrates that treatment with organic H2H can sustain yields of organic raspberry plants compared to GS fertilizer.

The present invention is not limited by the aforementioned embodiments. It will occur to those ordinarily skilled in the art that various modifications may be made to the disclosed embodiments without diverting from the concept of the invention. All such modifications are intended to be within the scope of the present invention.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety. Applicants reserve the right to physically incorporate into this specification any and all materials and information from any such patents, publications, scientific articles, web sites, electronically available information, and other referenced materials or documents.

The written description portion of this patent includes all claims. Furthermore, all claims, including all original claims as well as all claims from any and all priority documents, are hereby incorporated by reference in their entirety into the written description portion of the specification, and Applicants reserve the right to physically incorporate into the written description or any other portion of the application, any and all such claims. Thus, for example, under no circumstances may the patent be interpreted as allegedly not providing a written description for a claim on the assertion that the precise wording of the claim is not set forth in haec verba in written description portion of the patent.

All of the features disclosed in this specification may be combined in any combination. Thus, unless expressly stated otherwise, each feature disclosed is only an example of a generic series of equivalent or similar features.

It is to be understood that while the invention has been described in conjunction with the detailed description thereof, the foregoing description is intended to illustrate and not limit the scope of the invention, which is defined by the scope of the appended claims. Thus, from the foregoing, it will be appreciated that, although specific embodiments of the invention have been described herein for the purpose of illustration, various modifications may be made without deviating from the spirit and scope of the invention. Other aspects, advantages, and modifications are within the scope of the following claims and the present invention is not limited except as by the appended claims.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and that they are not necessarily restricted to the orders of steps indicated herein or in the claims.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention as defined by the appended claims.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

It is also to be understood that as used herein and in the appended claims, the singular forms "a," "an," and "the" include plural reference unless the context clearly dictates otherwise, the term "X and/or Y" means "X" or "Y" or both "X" and "Y", and the letter "s" following a noun designates both the plural and singular forms of that noun. In addition, where features or aspects of the invention are described in terms of Markush groups, it is intended, and those skilled in the art will recognize, that the invention embraces and is also thereby described in terms of any individual member and any subgroup of members of the Markush group, and applicants reserve the right to revise the application or claims to refer specifically to any individual member or any subgroup of members of the Markush group.

Other embodiments are within the following claims. The patent may not be interpreted to be limited to the specific examples or embodiments or methods specifically and/or expressly disclosed herein. Under no circumstances may the patent be interpreted to be limited by any statement made by any Examiner or any other official or employee of a Patent Office unless such statement is specifically and without qualification or reservation expressly adopted in a responsive writing by Applicants.

What is claimed is:

1. A system for processing fresh food waste, the system comprising:
    a rotary blade grinder with a fresh food waste inlet port and an outlet port coupled to a first inlet port of an incubation vessel and for delivering fresh food waste particles to said incubation vessel;
    said incubation vessel including an incubation unit, an agitator, a second inlet port, a mixing device for mixing components received in said first and second inlet ports and a recirculating line coupled to said incubation unit and including an in-line grinder;
    a separation unit including an inlet port coupled to an outlet port of said incubation vessel, a separation device that separates fluid from particulates and having a fluid outlet port and a particulate outlet port;
    a stabilization and mixing vessel having an inlet port coupled to said fluid outlet port;
    an emulsification unit coupled to said stabilization and mixing vessel and including a homogenizing grinder therein; and
    a blending and storage tank and pump;
    wherein the stabilization and mixing vessel uses acid and preservative stabilizers.

2. The system as in claim 1, wherein said separating device comprises a coarse screen and a fine screen.

3. The system as in claim 1, further comprising a further grinder interposed between said rotary blade grinder and said incubation vessel, said further grinder having a further grinder inlet port coupled to said rotary knife grinder and a further grinder outlet port coupled to said incubator vessel inlet port.

4. The system as in claim 1, wherein said stabilization and mixing vessel includes at least a second stabilizer unit inlet port for receiving an acid.

5. The system as in claim 1, wherein said in-line grinder is a high shear mixer with a disintegrating head.

6. The system as in claim 1, wherein said rotary blade grinder includes blades that rotate against a screen plate or a plate that includes holes.

7. The system as in claim 1, wherein said mixing device is a ribbon blender or a paddle mixer.

8. The system as in claim 1, wherein said separating device comprises a coarse screen and a fine screen.

9. The system as in claim 3, wherein said further grinder comprises a low RPM, high torque grinder.

10. The system as in claim 9, wherein said low RPM, high torque grinder includes a speed of about 1200-1700 RPM and a torque of about 5000-7000 foot-lbs.

* * * * *